US012670151B2

(12) United States Patent
Kshirsagar et al.

(10) Patent No.: US 12,670,151 B2
(45) Date of Patent: Jun. 30, 2026

(54) GENERATIVE LANGUAGE MODEL DYNAMIC INPUT DISAMBIGUATION IN A DATABASE SYSTEM

(71) Applicant: Salesforce, Inc., San Francisco, CA (US)

(72) Inventors: Atul Chandrakant Kshirsagar, San Ramon, CA (US); Prithvi Krishnan Padmanabhan, San Ramon, CA (US); Rajasekar Elango, San Francisco, CA (US); Bharat Suri, San Francisco, CA (US); Shipra Gupta, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/817,986

(22) Filed: Aug. 28, 2024

(65) Prior Publication Data

US 2025/0272280 A1     Aug. 28, 2025

Related U.S. Application Data

(63) Continuation-in-part of application No. 18/750,469, filed on Jun. 21, 2024.

(Continued)

(51) Int. Cl.
*G06F 16/242* (2019.01)
*G06F 16/25* (2019.01)
*G06F 40/205* (2020.01)

(52) U.S. Cl.
CPC ........ *G06F 16/243* (2019.01); *G06F 16/2428* (2019.01); *G06F 16/252* (2019.01); *G06F 40/205* (2020.01)

(58) Field of Classification Search
CPC .. G06F 16/243; G06F 16/2428; G06F 16/252; G06F 40/205
See application file for complete search history.

(56) References Cited

U.S. PATENT DOCUMENTS 5,655,081 A     8/1997   Bonnell
7,756,890 B2    7/2010   Carter
(Continued)

FOREIGN PATENT DOCUMENTS

AU     2019345039 A1    4/2021
AU     2019345040 A1    4/2021
(Continued)

OTHER PUBLICATIONS

International Application Serial No. PCT/US24/34339, Search Report and written Opinion mailed Sep. 24, 2024 (pp. 1-15).

(Continued)

*Primary Examiner* — Yuk Ting Choi
(74) *Attorney, Agent, or Firm* — Polygon IP, LLP

(57) ABSTRACT

A computing services environment may include a database system storing database records for client organizations accessing computing services including a conversational chat interface, an application server providing access to the conversational chat interface, and an orchestration service configured to execute an orchestration process based on a natural language request message received via the conversational chat interface. An information enrichment and disambiguation process may be executed to determine candidate values corresponding to a text portion of the natural language request message. Novel clarification text requesting clarification of the candidate information may be determined and transmitted via the conversational chat interface. Updated information may be determined based on the candidate information and clarification input received via the conversational chat interface. Novel response text respon- (Continued)

sive to the natural language request message may be determined based on the updated information.

20 Claims, 32 Drawing Sheets

Related U.S. Application Data

(60) Provisional application No. 63/665,995, filed on Jun. 28, 2024, provisional application No. 63/665,466, filed on Jun. 28, 2024, provisional application No. 63/665,857, filed on Jun. 28, 2024, provisional application No. 63/665,455, filed on Jun. 28, 2024, provisional application No. 63/558,653, filed on Feb. 28, 2024, provisional application No. 63/558,580, filed on Feb. 27, 2024, provisional application No. 63/558,557, filed on Feb. 27, 2024, provisional application No. 63/558,641, filed on Feb. 27, 2024.

(56)                References Cited

U.S. PATENT DOCUMENTS

| | | | |
|---|---|---|---|
| 7,779,039 | B2 | 8/2010 | Weissman |
| 9,197,513 | B2 | 11/2015 | Vasudev |
| 9,215,096 | B2 | 12/2015 | Vasudev |
| 9,235,846 | B2 | 1/2016 | Petschulat |
| 9,240,016 | B2 | 1/2016 | Cronin |
| 9,247,051 | B2 | 1/2016 | Li |
| 9,336,533 | B2 | 5/2016 | Cronin |
| 9,342,836 | B2 | 5/2016 | Cronin |
| 9,349,132 | B2 | 5/2016 | Cronin |
| 9,367,853 | B2 | 6/2016 | Cronin |
| 9,390,428 | B2 | 7/2016 | Rehman |
| 9,454,767 | B2 | 9/2016 | Cronin |
| 9,535,573 | B2 | 1/2017 | Ramsey |
| 9,690,815 | B2 | 6/2017 | Cronin |
| 9,753,962 | B2 | 9/2017 | Petschulat |
| 9,762,520 | B2 | 9/2017 | Wang |
| 9,883,033 | B2 | 1/2018 | Li |
| 9,898,743 | B2 | 2/2018 | Bessler |
| 10,044,660 | B2 | 8/2018 | Vasudev |
| 10,164,928 | B2 | 12/2018 | Wang |
| 10,296,289 | B2 | 5/2019 | Chen |
| 10,402,174 | B2 | 9/2019 | Varadarajan |
| 10,496,657 | B2 | 12/2019 | Van Osten |
| 10,509,633 | B2 | 12/2019 | Varadarajan |
| 10,514,896 | B2 | 12/2019 | Varadarajan |
| 10,514,935 | B2 | 12/2019 | Chen |
| 10,540,149 | B2 | 1/2020 | Varadarajan |
| 10,552,464 | B2 | 2/2020 | Roustant |
| 10,572,882 | B2 | 2/2020 | Li |
| 10,585,564 | B2 | 3/2020 | Vasudev |
| 10,585,657 | B2 | 3/2020 | Padmanabhan |
| 10,585,906 | B2 | 3/2020 | Van Osten |
| 10,607,165 | B2 | 3/2020 | Punera |
| 10,671,283 | B2 | 6/2020 | Vasudev |
| 10,701,054 | B2 | 6/2020 | Padmanabhan |
| 10,776,083 | B2 | 9/2020 | Olsson |
| 10,817,652 | B2 | 10/2020 | Dmytrenko |
| 10,826,852 | B2 | 11/2020 | Jin |
| 10,846,068 | B2 | 11/2020 | Varadarajan |
| 10,860,557 | B2 | 12/2020 | Eberl |
| 10,880,251 | B2 | 12/2020 | Wang |
| 10,915,827 | B2 | 2/2021 | Muramoto |
| 10,963,541 | B2 | 3/2021 | Cronin |
| 10,970,486 | B2 | 4/2021 | Machado |
| 11,003,317 | B2 | 5/2021 | Jacobson |
| 11,038,771 | B2 | 6/2021 | Padmanabhan |
| 11,082,226 | B2 | 8/2021 | Hildebrand et al. |
| 11,113,459 | B1 | 9/2021 | Olsson |
| 11,128,465 | B2 | 9/2021 | Hildebrand et al. |
| 11,144,335 | B2 | 10/2021 | Padmanabhan et al. |
| 11,157,484 | B2 | 10/2021 | Padmanabhan et al. |
| 11,170,322 | B2 | 11/2021 | Jia |
| 11,194,957 | B2 | 12/2021 | Vasudev |
| 11,227,261 | B2 | 1/2022 | Wang |
| 11,244,313 | B2 | 2/2022 | Padmanabhan et al. |
| 11,288,280 | B2 | 3/2022 | Padmanabhan et al. |
| 11,301,766 | B2 | 4/2022 | Muramoto |
| 11,308,067 | B2 | 4/2022 | Nielsen |
| 11,314,790 | B2 | 4/2022 | Chang |
| 11,366,821 | B2 | 6/2022 | Salomon |
| 11,372,635 | B2 | 6/2022 | Padmanabhan et al. |
| 11,379,671 | B2 | 7/2022 | Alexander |
| 11,392,828 | B2 | 7/2022 | Velasco |
| 11,425,084 | B2 | 8/2022 | Zhang |
| 11,431,486 | B2 | 8/2022 | Padmanabhan |
| 11,431,663 | B2 | 8/2022 | Zhang |
| 11,431,693 | B2 | 8/2022 | Padmanabhan |
| 11,431,696 | B2 | 8/2022 | Padmanabhan |
| 11,451,530 | B2 | 9/2022 | Padmanabhan |
| 11,468,406 | B2 | 10/2022 | Padmanabhan |
| 11,469,886 | B2 | 10/2022 | Padmanabhan |
| 11,475,207 | B2 | 10/2022 | Xie |
| 11,481,636 | B2 | 10/2022 | Ramachandran |
| 11,488,176 | B2 | 11/2022 | Padmanabhan et al. |
| 11,509,608 | B2 | 11/2022 | Greenberg |
| 11,537,283 | B2 | 12/2022 | Gonzalez |
| 11,537,899 | B2 | 12/2022 | Ramachandran |
| 11,544,762 | B2 | 1/2023 | Mao |
| 11,556,595 | B2 | 1/2023 | Burke |
| 11,568,437 | B2 | 1/2023 | Padmanabhan |
| 11,580,179 | B2 | 2/2023 | Xiu |
| 11,588,803 | B2 | 2/2023 | Padmanabhan et al. |
| 11,611,560 | B2 | 3/2023 | Padmanabhan |
| 11,636,098 | B2 | 4/2023 | Padmanabhan |
| 11,727,937 | B2 | 8/2023 | Dai |
| 11,770,445 | B2 | 9/2023 | Padmanabhan |
| 11,783,024 | B2 | 10/2023 | Padmanabhan |
| 11,803,537 | B2 | 10/2023 | Padmanabhan |
| 11,810,031 | B2 | 11/2023 | Dhaliwal et al. |
| 11,836,450 | B2 | 12/2023 | Kale |
| 11,861,321 | B1 | 1/2024 | O'Kelly |
| 11,893,002 | B2 | 2/2024 | Padmanabhan |
| 11,928,426 | B1 | 3/2024 | Gutzeit |
| D1,023,041 | S | 4/2024 | Dhaliwal |
| D1,024,089 | S | 4/2024 | Dhaliwal |
| 11,954,183 | B2 | 4/2024 | Padmanabhan et al. |
| 12,001,801 | B2 | 6/2024 | Wang |
| 12,039,263 | B1 | 7/2024 | Mondlock |
| 12,051,008 | B2 | 7/2024 | Hu |
| 12,111,827 | B2 | 10/2024 | Kshirsagar |
| 12,130,848 | B1 | 10/2024 | Koneru |
| 12,143,345 | B2 | 11/2024 | Greenberg |
| 12,197,317 | B2 | 1/2025 | Pentyala |
| 12,411,462 | B1 | 9/2025 | Riachi |
| 2010/0205189 | A1* | 8/2010 | Ebrahimi ............... G06F 21/62 707/804 |
| 2012/0036147 | A1 | 2/2012 | Borst |
| 2012/0110464 | A1 | 5/2012 | Chen |
| 2013/0031144 | A1 | 1/2013 | Elango et al. |
| 2013/0055147 | A1 | 2/2013 | Vasudev |
| 2014/0068512 | A1 | 3/2014 | Wong |
| 2014/0082517 | A1 | 3/2014 | Vasudev |
| 2014/0280065 | A1 | 9/2014 | Cronin |
| 2015/0278718 | A1 | 10/2015 | Evans |
| 2016/0291808 | A1 | 10/2016 | Wang |
| 2016/0294757 | A1 | 10/2016 | Wang |
| 2016/0379009 | A1 | 12/2016 | Lee |
| 2018/0052573 | A1 | 2/2018 | Comertoglu |
| 2018/0253319 | A1 | 9/2018 | Evans |
| 2018/0253654 | A1 | 9/2018 | Van Osten |
| 2018/0314740 | A1 | 11/2018 | Van Osten |
| 2019/0057100 | A1 | 2/2019 | Burghoffer |
| 2019/0197402 | A1 | 6/2019 | Kovács |
| 2019/0205403 | A1 | 7/2019 | Hussain |
| 2019/0222540 | A1 | 7/2019 | Relangi |
| 2019/0236559 | A1 | 8/2019 | Padmanabhan |
| 2019/0236562 | A1 | 8/2019 | Padmanabhan |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |

(56)                  References Cited

U.S. PATENT DOCUMENTS

| | | |
|---|---|---|
| 2019/0303445 A1 | 10/2019 | Padmanabhan |
| 2019/0349477 A1 | 11/2019 | Kotak |
| 2019/0362016 A1 | 11/2019 | Xie |
| 2019/0362017 A1 | 11/2019 | Salomon |
| 2019/0362018 A1 | 11/2019 | Salomon |
| 2019/0377806 A1 | 12/2019 | Padmanabhan et al. |
| 2020/0042939 A1 | 2/2020 | Padmanabhan |
| 2020/0065320 A1 | 2/2020 | Lee |
| 2020/0089672 A1 | 3/2020 | Velisetti et al. |
| 2020/0090033 A1 | 3/2020 | Ramachandran |
| 2020/0090034 A1 | 3/2020 | Ramachandran |
| 2020/0097141 A1 | 3/2020 | Jacobson |
| 2020/0097544 A1 | 3/2020 | Alexander |
| 2020/0097577 A1 | 3/2020 | Nielsen |
| 2020/0104359 A1 | 4/2020 | Patel |
| 2020/0104408 A1 | 4/2020 | Salomon |
| 2020/0117481 A1 | 4/2020 | Chen |
| 2020/0134656 A1 | 4/2020 | Padmanabhan |
| 2020/0167051 A1 | 5/2020 | Vasudev |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0349142 A1 | 11/2020 | Padmanabhan |
| 2020/0349564 A1 | 11/2020 | Padmanabhan et al. |
| 2020/0371995 A1 | 11/2020 | Padmanabhan |
| 2021/0067471 A1 | 3/2021 | Taylor |
| 2021/0149921 A1 | 5/2021 | Alexander |
| 2021/0149949 A1 | 5/2021 | Alexander |
| 2021/0150340 A1 | 5/2021 | Liu |
| 2021/0150365 A1 | 5/2021 | Ramachandran |
| 2021/0152536 A1 | 5/2021 | Padmanabhan et al. |
| 2021/0182423 A1 | 6/2021 | Padmanabhan |
| 2021/0182773 A1 | 6/2021 | Padmanabhan |
| 2021/0208856 A1 | 7/2021 | Olsson |
| 2021/0209305 A1 | 7/2021 | Machado |
| 2021/0226774 A1 | 7/2021 | Padmanabhan |
| 2021/0240498 A1 | 8/2021 | Padmanabhan et al. |
| 2021/0243193 A1 | 8/2021 | Padmanabhan |
| 2021/0287246 A1 | 9/2021 | Zhang |
| 2021/0342329 A1 | 11/2021 | Padmanabhan |
| 2021/0373878 A1 | 12/2021 | Padmanabhan et al. |
| 2021/0374759 A1 | 12/2021 | Padmanabhan et al. |
| 2021/0382909 A1 | 12/2021 | Addala |
| 2021/0397604 A1 | 12/2021 | Padmanabhan |
| 2021/0398524 A1* | 12/2021 | Gao ........................ G06F 40/35 |
| | | 707/804 |
| 2022/0006705 A1 | 1/2022 | Padmanabhan |
| 2022/0027356 A1 | 1/2022 | Padmanabhan et al. |
| 2022/0114238 A1 | 4/2022 | Padmanabhan et al. |
| 2022/0207407 A1 | 6/2022 | Zhang |
| 2022/0244988 A1 | 8/2022 | Zhang |
| 2022/0245349 A1 | 8/2022 | Pentyala |
| 2022/0245560 A1 | 8/2022 | Dhaliwal et al. |
| 2022/0248165 A1 | 8/2022 | Dhaliwal et al. |
| 2022/0293094 A1 | 9/2022 | Mao |
| 2022/0318669 A1 | 10/2022 | Alexander |
| 2022/0335043 A1 | 10/2022 | Zheng |
| 2022/0358462 A1 | 11/2022 | Oldfield et al. |
| 2023/0004860 A1 | 1/2023 | Hu |
| 2023/0021529 A1 | 1/2023 | Bhattacherjee |
| 2023/0038714 A1 | 2/2023 | Padmanabhan et al. |
| 2023/0080808 A1 | 3/2023 | Padmanabhan |
| 2023/0080927 A1 | 3/2023 | Padmanabhan |
| 2023/0085481 A1 | 3/2023 | Padmanabhan |
| 2023/0086302 A1 | 3/2023 | Bhagavath |
| 2023/0089596 A1 | 3/2023 | Huffman et al. |
| 2023/0103896 A1 | 4/2023 | Addala |
| 2023/0161607 A1 | 5/2023 | Chen |
| 2023/0237190 A1 | 7/2023 | Padmanabhan |

| | | |
|---|---|---|
| 2023/0237499 A1 | 7/2023 | Padmanabhan |
| 2023/0245038 A1 | 8/2023 | Padmanabhan |
| 2023/0247019 A1 | 8/2023 | Kshirsagar et al. |
| 2023/0274095 A1 | 8/2023 | Amol |
| 2023/0333901 A1 | 10/2023 | Kale |
| 2023/0342734 A1 | 10/2023 | Padmanabhan |
| 2023/0367766 A1 | 11/2023 | Padmanabhan et al. |
| 2023/0367776 A1 | 11/2023 | Padmanabhan et al. |
| 2023/0368185 A1 | 11/2023 | Padmanabhan et al. |
| 2023/0368191 A1 | 11/2023 | Padmanabhan et al. |
| 2023/0368291 A1 | 11/2023 | Padmanabhan |
| 2023/0394481 A1 | 12/2023 | Padmanabhan |
| 2023/0396445 A1 | 12/2023 | Padmanabhan |
| 2024/0037503 A1 | 2/2024 | Padmanabhan |
| 2024/0046115 A1 | 2/2024 | Hu |
| 2024/0062010 A1 | 2/2024 | Kale |
| 2024/0095220 A1 | 3/2024 | Isaacs |
| 2024/0095240 A1 | 3/2024 | Kshirsagar et al. |
| 2024/0143629 A1 | 5/2024 | Kesarwani |
| 2024/0143945 A1 | 5/2024 | Mehrotra |
| 2024/0144328 A1 | 5/2024 | Zhang |
| 2024/0177143 A1 | 5/2024 | Brandeleer |
| 2024/0220466 A1 | 7/2024 | Barak |
| 2024/0242022 A1 | 7/2024 | Yee |
| 2024/0242037 A1 | 7/2024 | Heller |
| 2024/0256581 A1 | 8/2024 | Jiang |
| 2024/0257168 A1 | 8/2024 | Zhang |
| 2024/0281487 A1 | 8/2024 | Bathwal |
| 2024/0282298 A1 | 8/2024 | Koneru |
| 2024/0291779 A1 | 8/2024 | Catalano |
| 2024/0296316 A1 | 9/2024 | Singh |
| 2024/0296425 A1 | 9/2024 | Rosenkranz |
| 2024/0296443 A1 | 9/2024 | Padmanabhan |
| 2024/0303443 A1 | 9/2024 | Cheng |
| 2024/0303473 A1 | 9/2024 | Cheng |
| 2024/0311559 A1* | 9/2024 | Sengupta ......... G06Q 10/06393 |
| | | 707/804 |
| 2024/0330579 A1 | 10/2024 | Saxena |
| 2024/0346036 A1 | 10/2024 | Brown |
| 2024/0346162 A1 | 10/2024 | Luitjens |
| 2024/0403566 A1 | 12/2024 | Sengupta |
| 2024/0403792 A1 | 12/2024 | Goutal |
| 2024/0411991 A1 | 12/2024 | Pentyala |
| 2024/0411992 A1 | 12/2024 | Pentyala |
| 2024/0412040 A1 | 12/2024 | Radmilac |
| 2024/0412059 A1 | 12/2024 | Radhakrishnan |
| 2024/0427764 A1 | 12/2024 | Kshirsagar |
| 2025/0005050 A1* | 1/2025 | Krishnan .............. G06F 16/243 |
| | | 707/804 |
| 2025/0005299 A1 | 1/2025 | Krishnan |
| 2025/0061279 A1 | 2/2025 | Delevie |
| 2025/0068668 A1 | 2/2025 | Grbic |
| 2025/0077916 A1 | 3/2025 | Ali |
| 2025/0086309 A1 | 3/2025 | Harinath |
| 2025/0086467 A1 | 3/2025 | Yee |
| 2025/0094717 A1 | 3/2025 | Kanuga |
| 2025/0094728 A1* | 3/2025 | Ouyang ................ G06F 40/284 |
| | | 707/804 |
| 2025/0103962 A1 | 3/2025 | Turley |
| 2025/0232029 A1 | 7/2025 | Gasperowicz |
| 2025/0272280 A1* | 8/2025 | Kshirsagar .......... G06F 16/2428 |
| | | 707/804 |
| 2025/0358240 A1 | 11/2025 | Bhat |
| 2025/0358492 A1 | 11/2025 | Goyal |
| 2025/0371317 A1 | 12/2025 | Thompson, III |

FOREIGN PATENT DOCUMENTS

| | | |
|---|---|---|
| AU | 2023214371 A1 | 8/2023 |
| AU | 2023216803 A1 | 9/2023 |
| CA | 2904526 | 9/2014 |
| CN | 105229633 | 1/2016 |
| CN | 110309119 | 10/2019 |
| CN | 111919417 A | 11/2020 |
| CN | 112703502 | 4/2021 |
| CN | 113039568 A | 6/2021 |
| CN | 113056760 A | 6/2021 |
| CN | 113168622 B | 7/2021 |

(56) References Cited

FOREIGN PATENT DOCUMENTS

| | | | |
|---|---|---|---|
| CN | 114175037 | A | 3/2022 |
| CN | 114365133 | A | 4/2022 |
| CN | 114817284 | A | 7/2022 |
| CN | 116226344 | | 6/2023 |
| EP | 2973004 | | 1/2016 |
| EP | 3304456 | | 4/2018 |
| EP | 3747153 | A1 | 12/2020 |
| EP | 3776255 | A1 | 2/2021 |
| EP | 3814977 | | 5/2021 |
| EP | 3853792 | A1 | 7/2021 |
| EP | 3853793 | A1 | 7/2021 |
| EP | 3853794 | A1 | 7/2021 |
| EP | 3853994 | | 7/2021 |
| EP | 3973431 | A1 | 3/2022 |
| EP | 4007985 | A1 | 6/2022 |
| JP | 6412550 | | 10/2018 |
| JP | 6608500 | | 11/2019 |
| JP | 2021512416 | A | 5/2021 |
| JP | 7069401 | | 5/2022 |
| JP | 7147054 | B2 | 10/2022 |
| JP | 2023029895 | A | 3/2023 |
| JP | 7268140 | B2 | 5/2023 |
| JP | 7341225 | B2 | 9/2023 |
| JP | 7434557 | B2 | 2/2024 |
| JP | 7451565 | B2 | 3/2024 |
| WO | 2014143208 | | 9/2014 |
| WO | 2016190943 | | 12/2016 |
| WO | 2019152750 | A1 | 8/2019 |
| WO | 2020060770 | | 3/2020 |
| WO | 2021084510 | A1 | 5/2021 |
| WO | 2022159196 | | 7/2022 |
| WO | 2023040109 | | 3/2023 |
| WO | 2024254197 | | 12/2024 |
| WO | 2025006247 | | 1/2025 |
| WO | 2025058993 | | 3/2025 |

OTHER PUBLICATIONS

Office Action (Final Rejection) dated Dec. 3, 2025 for U.S. Appl. No. 18/750,490 (pp. 1-45).

Office Action (Non-Final Rejection) dated Nov. 17, 2025 for U.S. Appl. No. 18/398,001 (pp. 1-25).

Office action dated Jan. 9, 2026 for U.S. Appl. No. 19/053,760 (pp. 1-29).

Office Action dated Mar. 20, 2025 for U.S. Appl. No. 18/750,490 (pp. 1-38).

Office Action dated Oct. 1, 2025 for U.S. Appl. No. 19/037,325 (pp. 1-11).

Office Action dated Oct. 22, 2025 for U.S. Appl. No. 19/037,328 (pp. 1-12).

Office Action dated Dec. 5, 2025 for U.S. Appl. No. 19/037,327 (pp. 1-47).

Wu Tongshuang et al: AI Chains: Transparent and Controllable Human-AI Interaction by Chaining Large Language Model Prompts 11, 2021 (pp. 1-21).

* cited by examiner

Figure 7:
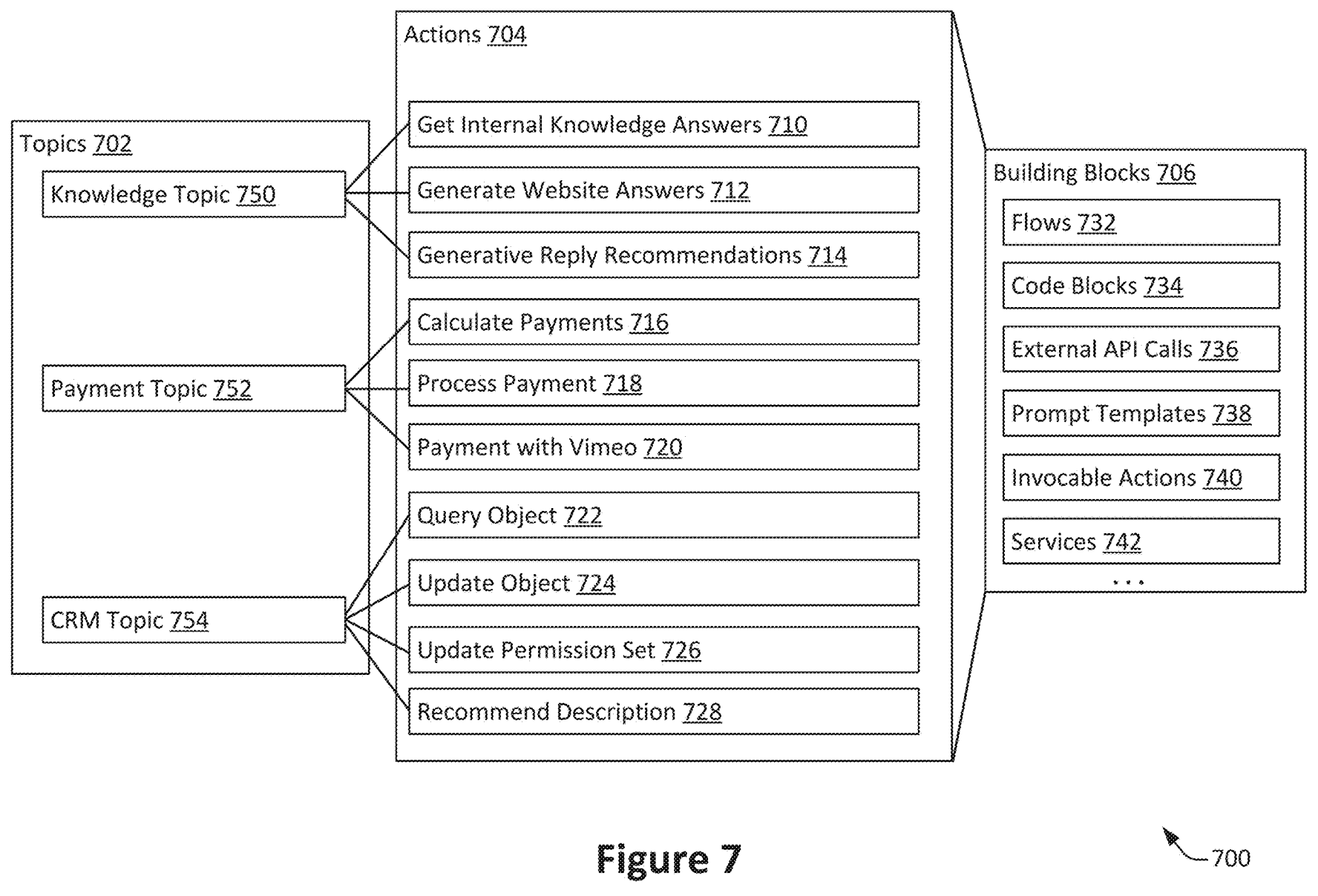

Actions 704

- Get Internal Knowledge Answers 710
- Generate Website Answers 712
- Generative Reply Recommendations 714
- Calculate Payments 716
- Process Payment 718
- Payment with Vimeo 720
- Query Object 722
- Update Object 724
- Update Permission Set 726
- Recommend Description 728

Building Blocks 706

- Flows 732
- Code Blocks 734
- External API Calls 736
- Prompt Templates 738
- Invocable Actions 740
- Services 742

Topics 702

- Knowledge Topic 750
- Payment Topic 752
- CRM Topic 754

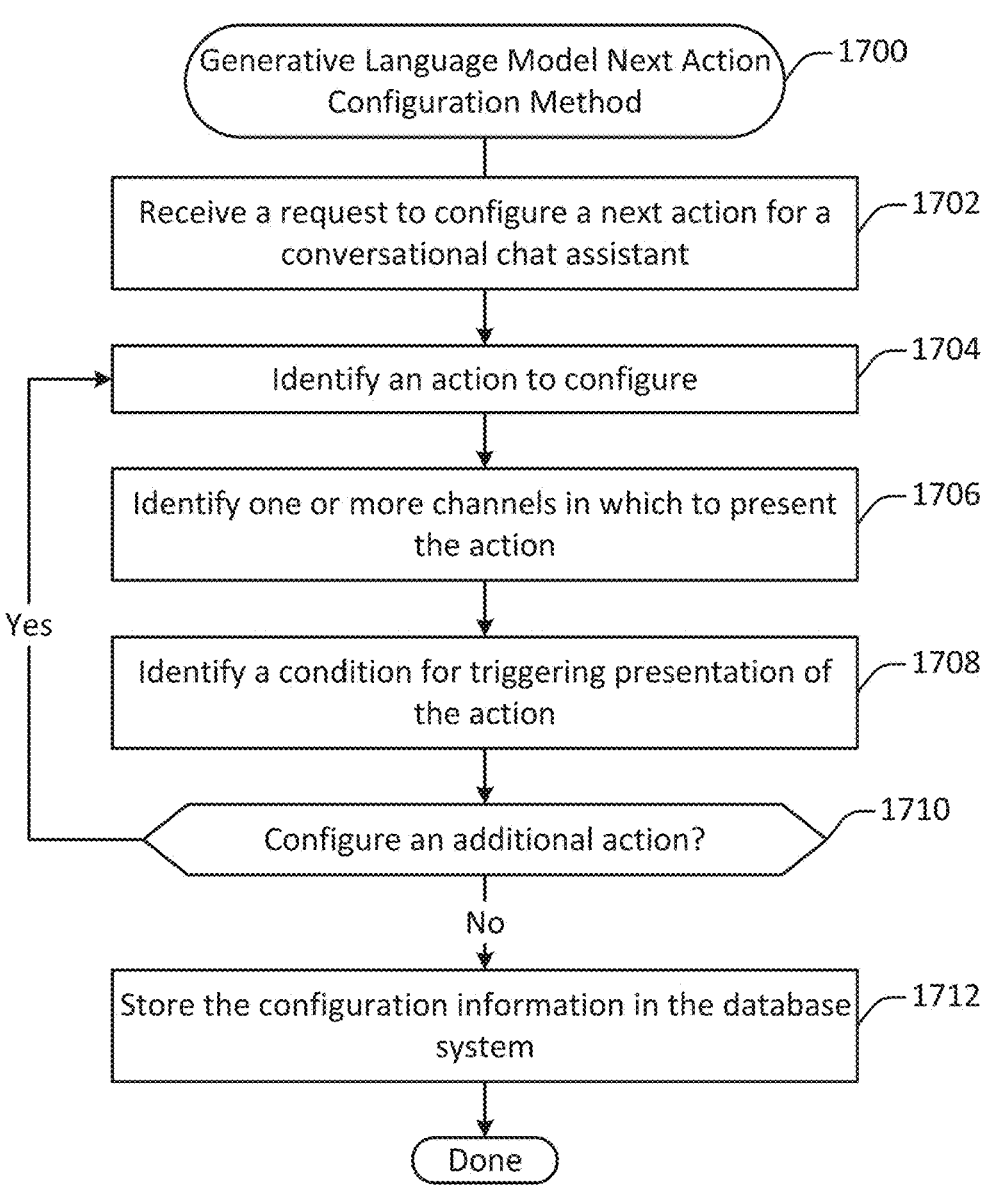

Generative Language Model Next Action Configuration Method ⟋1700

Receive a request to configure a next action for a conversational chat assistant ⟋1702

Identify an action to configure ⟋1704

Identify one or more channels in which to present the action ⟋1706

Identify a condition for triggering presentation of the action ⟋1708

Configure an additional action? ⟋1710

Yes

No

Store the configuration information in the database system ⟋1712

Done

Figure 17

Figure 19:
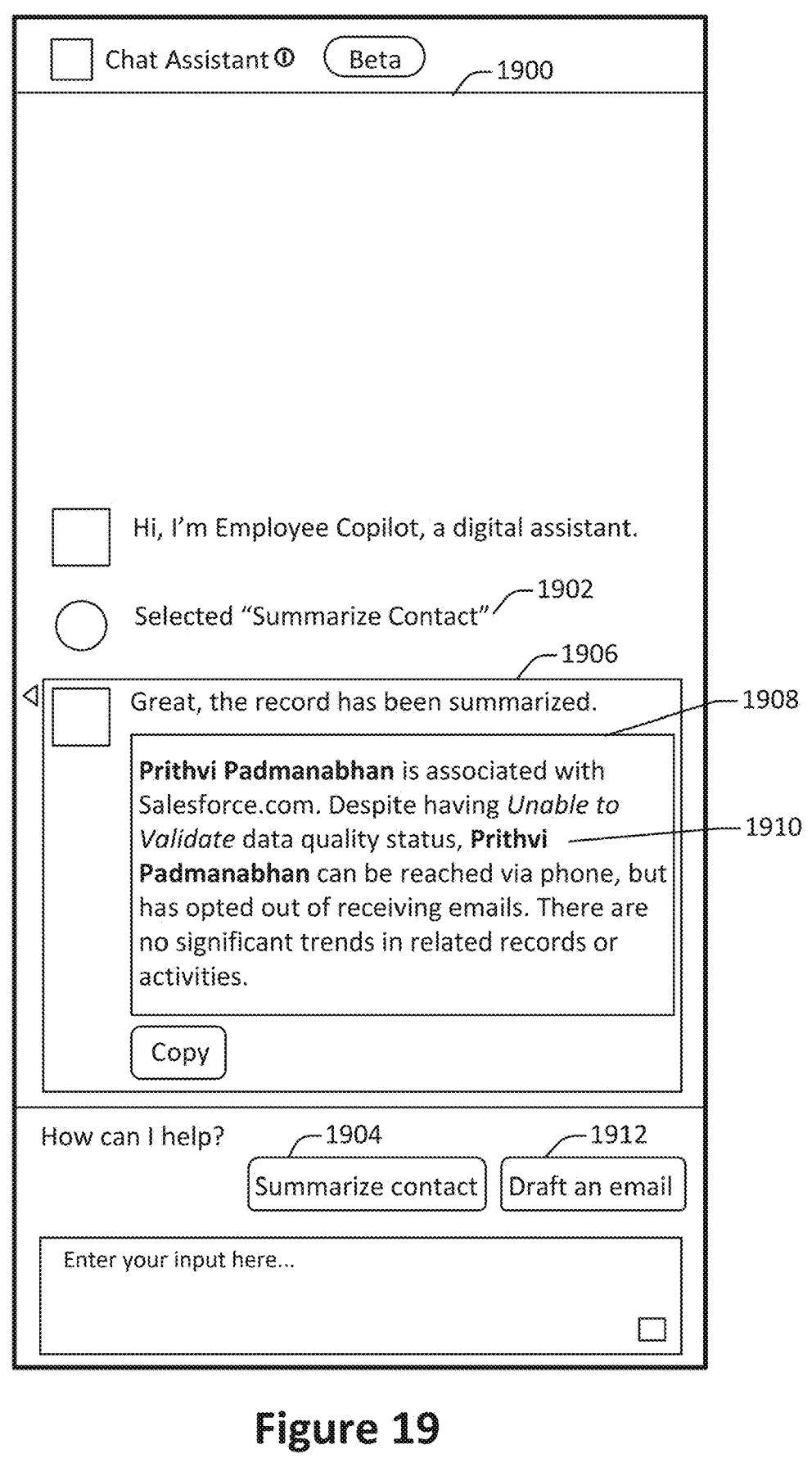

☐ Chat Assistant ⓘ ( Beta ) ⎯1900

Hi, I'm Employee Copilot, a digital assistant.

Selected "Summarize Contact" ⎯1902

Great, the record has been summarized. ⎯1906 ⎯1908

Prithvi Padmanabhan is associated with Salesforce.com. Despite having *Unable to Validate* data quality status, Prithvi Padmanabhan can be reached via phone, but has opted out of receiving emails. There are no significant trends in related records or activities. ⎯1910

Copy

How can I help? ⎯1904 ⎯1912

Summarize contact    Draft an email

Enter your input here...

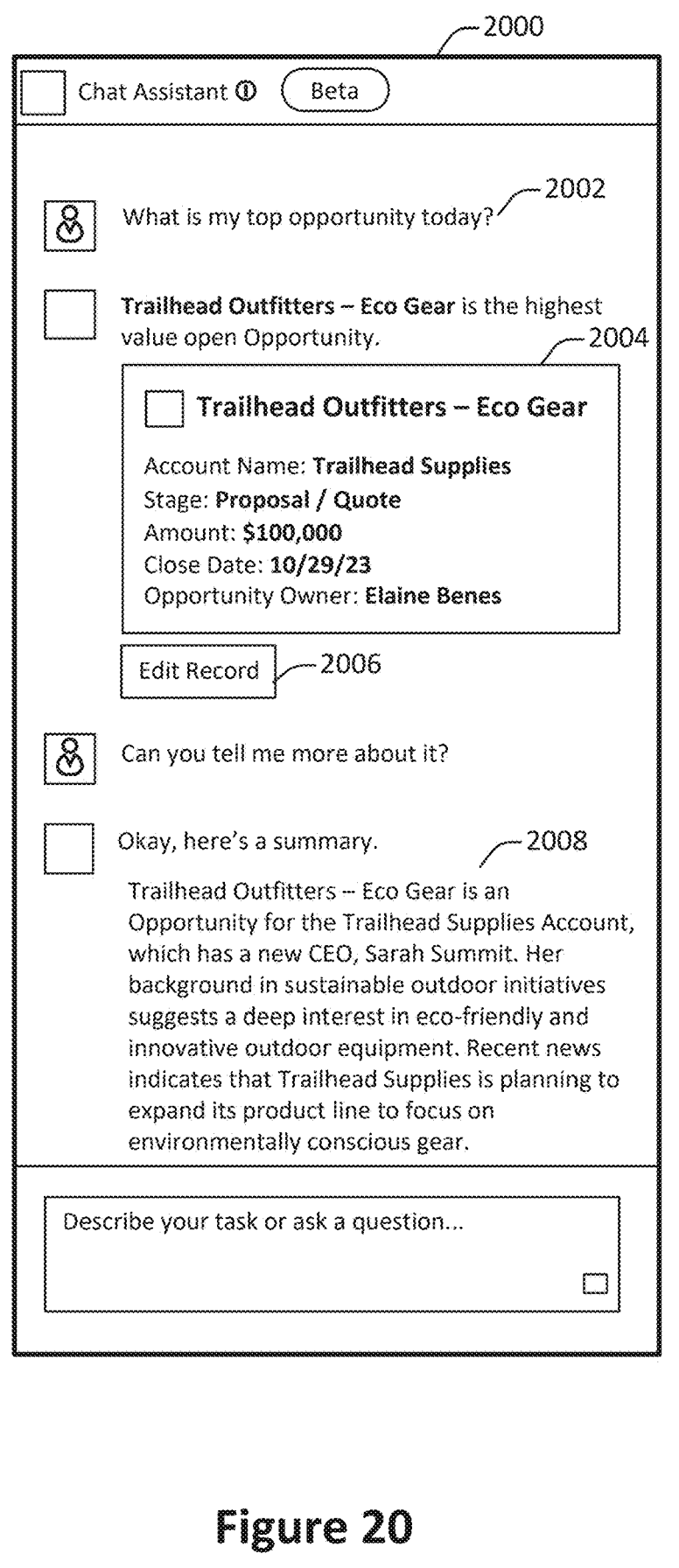

Chat Assistant ⓘ （Beta）

What is my top opportunity today? —2002

Trailhead Outfitters – Eco Gear is the highest value open Opportunity. —2004

Trailhead Outfitters – Eco Gear

Account Name: Trailhead Supplies
Stage: Proposal / Quote
Amount: $100,000
Close Date: 10/29/23
Opportunity Owner: Elaine Benes

Edit Record —2006

Can you tell me more about it?

Okay, here's a summary. —2008

Trailhead Outfitters – Eco Gear is an Opportunity for the Trailhead Supplies Account, which has a new CEO, Sarah Summit. Her background in sustainable outdoor initiatives suggests a deep interest in eco-friendly and innovative outdoor equipment. Recent news indicates that Trailhead Supplies is planning to expand its product line to focus on environmentally conscious gear.

Describe your task or ask a question…

Figure 20

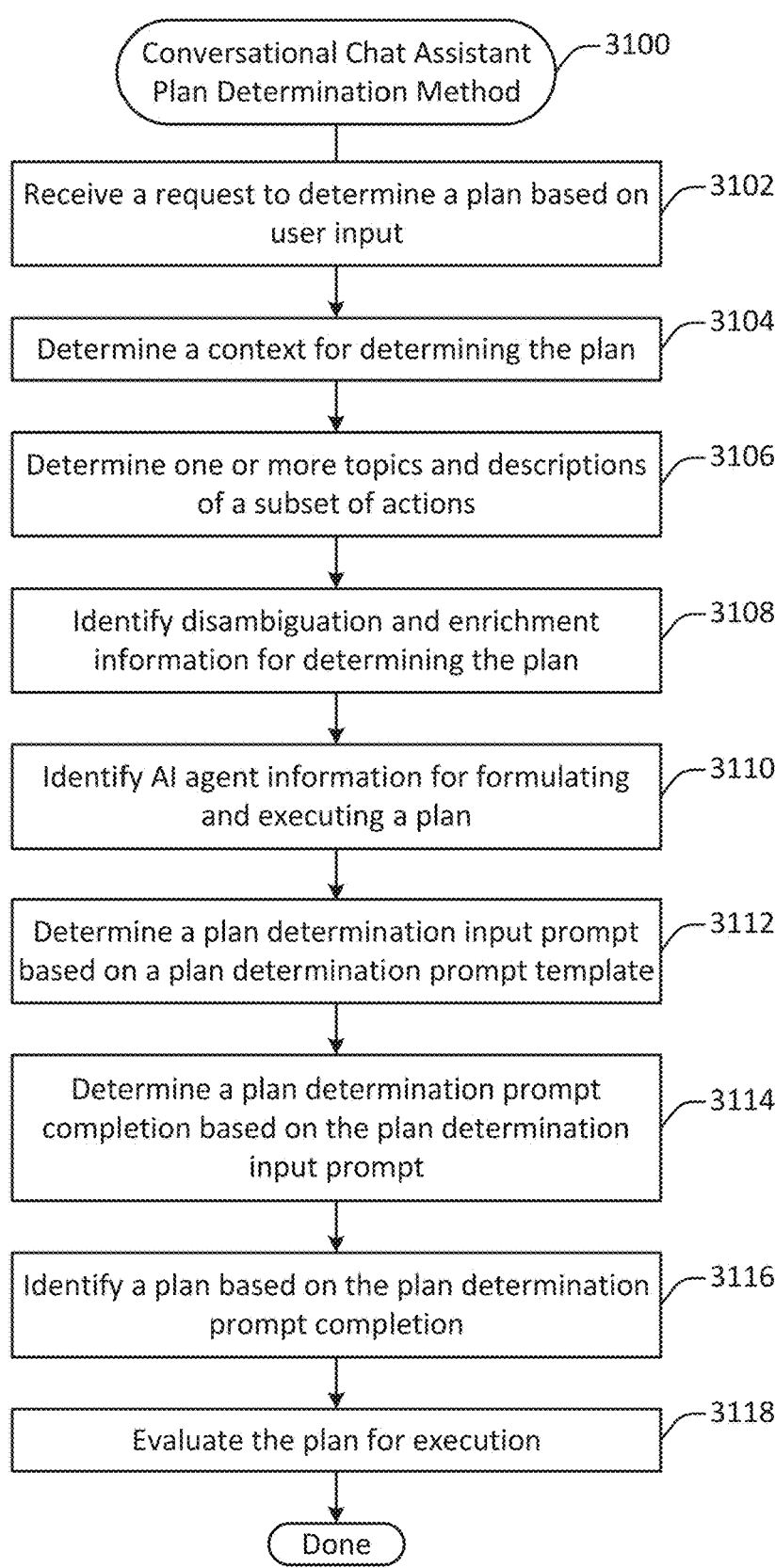

Conversational Chat Assistant Plan Determination Method —3100

Receive a request to determine a plan based on user input —3102

Determine a context for determining the plan —3104

Determine one or more topics and descriptions of a subset of actions —3106

Identify disambiguation and enrichment information for determining the plan —3108

Identify AI agent information for formulating and executing a plan —3110

Determine a plan determination input prompt based on a plan determination prompt template —3112

Determine a plan determination prompt completion based on the plan determination input prompt —3114

Identify a plan based on the plan determination prompt completion —3116

Evaluate the plan for execution —3118

Done

Figure 31

GENERATIVE LANGUAGE MODEL DYNAMIC INPUT DISAMBIGUATION IN A DATABASE SYSTEM

CROSS-REFERENCE TO RELATED APPLICATIONS

This application claims priority to U.S. patent application Ser. No. 18/750,469 by Kshirsagar et al., titled "Systems And Methods For Generative Language Model Database System Integration Architecture", filed on Jun. 21, 2024, which claims the benefit under 35 U.S.C. § 119 (e) of U.S. Provisional Patent Application 63/558,557 by Padmanabhan, titled "GENERATIVE LANGUAGE MODEL DATABASE SYSTEM INTEGRATION ARCHITECTURE", filed on Feb. 27, 2024, and to U.S. Provisional Patent Application 63/558,580 by Padmanabhan, titled "GENERATIVE LANGUAGE MODEL DATABASE SYSTEM INTEGRATION INTERFACE CONFIGURATION", filed on Feb. 27, 2024, and to U.S. Provisional Patent Application 63/558,641 by Padmanabhan, titled "GENERATIVE LANGUAGE MODEL DATABASE SYSTEM ACTION CONFIGURA-TION AND EXECUTION", filed on Feb. 27, 2024, and to U.S. Provisional Patent Application 63/558,653 by Padmanabhan, titled "GENERATIVE LANGUAGE MODEL DATABASE SYSTEM ACTION CUSTOMIZATION AND EXECUTION", filed on Feb. 28, 2024, all of which are incorporated herein by reference in their entirety and for all purposes. This application also claims the benefit under 35 U.S.C. § 119 (e) of U.S. Provisional Patent Application 63/665,455 by Kshirsagar et al., titled "Systems and Methods for Generative Language Model Database System Dynamic Reasoning Engine Selection and Execution", filed on Jun. 28, 2024, and to U.S. Provisional Patent Application 63/665,857 by Kshirsagar et al., titled "Systems and Methods for Generative Language Model Database System Dynamic Enrichment And Disambiguation", filed on Jun. 28, 2024, and to U.S. Provisional Patent Application 63/665,466 by Kshirsagar et al., titled "Systems and Methods for Generative Language Model Database System Interactive Action Plan Determination", filed on Jun. 28, 2024, and to U.S. Provisional Patent Application 63/665,995 by Kshirsagar et al., titled "Systems and Methods for Generative Language Model Database System Retrieval Augmented Generation for Context Retention", filed on Jun. 28, 2024, all of which are incorporated herein by reference in their entirety and for all purposes.

FIELD OF TECHNOLOGY

This patent application relates generally to database systems, and more specifically to the integration of database systems with generative language models.

BACKGROUND

"Cloud computing" services provide shared resources, applications, and information to computers and other devices upon request. In cloud computing environments, services can be provided via a computing services environment by one or more servers accessible over the Internet rather than installing software locally on in-house computer systems. Users can interact with cloud computing services to undertake a wide range of tasks.

More recently, generative language models have been developed that allow the generation of novel text. However, systems for managing interactions between cloud computing environments and generative language models are limited. Accordingly, improved systems and methods are needed in order to incorporate generative language models into the cloud-based infrastructure commonly employed for accessing computing services.

BRIEF DESCRIPTION OF THE DRAWINGS

The included drawings are for illustrative purposes and serve only to provide examples of possible structures and operations for the disclosed inventive systems, apparatus, methods, and computer program products for generative language model database system integration. These drawings in no way limit any changes in form and detail that may be made by one skilled in the art without departing from the spirit and scope of the disclosed implementations.

FIG. 7 illustrates a metadata diagram showing relationships between elements for configuring actions, provided in accordance with one or more embodiments.

FIG. 15 and FIG. 16 illustrate examples of user interfaces for configuring and testing various elements of a conversational chat assistant, generated in accordance with one or more embodiments.

FIG. 17 illustrates a method for configuring a next action for a conversational chat assistant, performed in accordance with one or more embodiments.

FIG. 19 illustrates a user interface provided in the context of a communication session with a conversational chat assistant, generated in accordance with one or more embodiments.

FIG. 20 illustrates a conversational chat interface provided in the context of a communication session with a conversational chat assistant, generated in accordance with one or more embodiments.

FIG. 31 illustrates a method of determining a plan, performed in accordance with one or more embodiments.

DETAILED DESCRIPTION

Introduction

Figure 1:
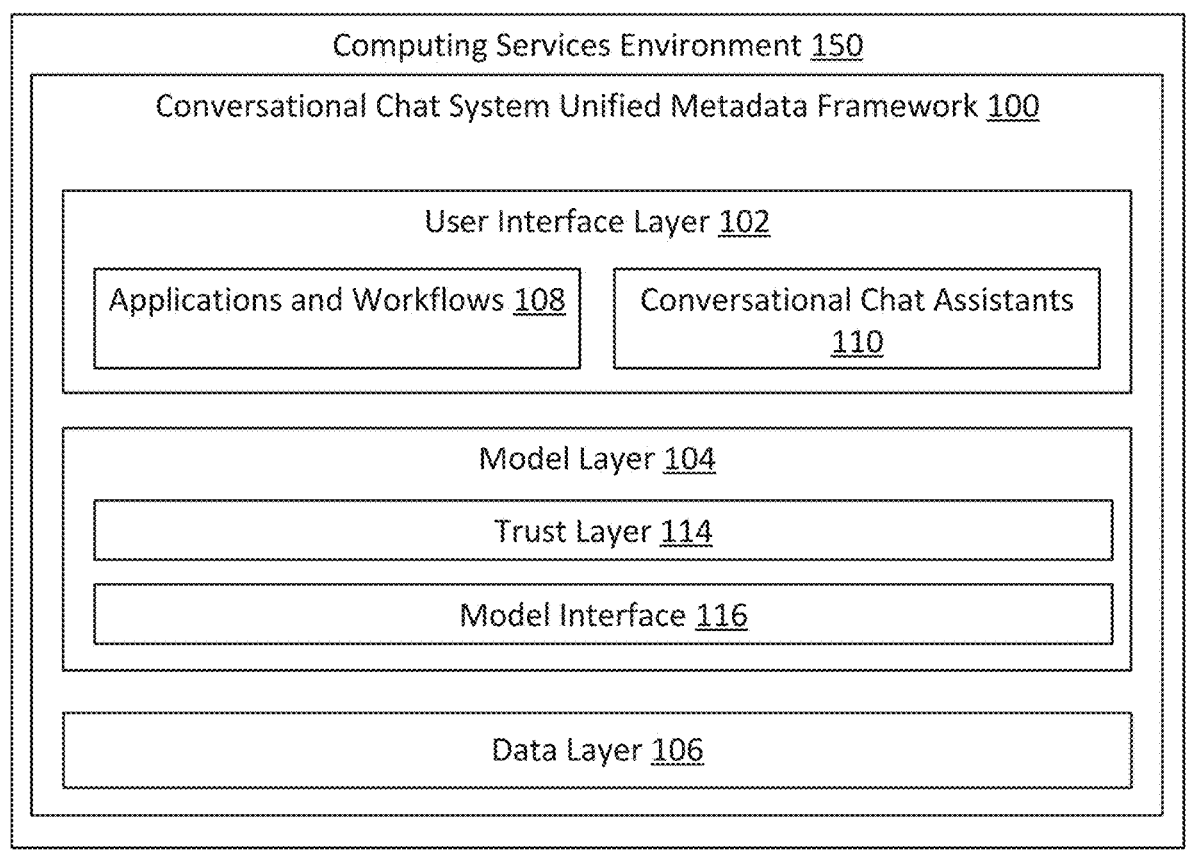
FIG. 1 illustrates a computing services environment that includes a unified metadata framework for specifying aspects of the conversational chat system.

Techniques and mechanisms described herein provide for a computing services environment equipped with a conversational chat system capable of providing customized conversational chat assistants. According to various embodiments, a conversational chat assistant may be configured to perform operations such as receiving text-based user input, retrieving information from a database system, storing information to a database system, defining and executing workflows and actions within a computing services environment, interacting with one or more generative language models, determining text-based output, and facilitating communication with a client machine via any of various communication channels.

According to various embodiments, a conversational chat assistant configured in the context of the conversational chat system may be used in the context of workflows for business tasks such as sales, service, marketing, and commerce to complete tasks using intelligent actions. The conversational chat assistant may be equipped with a built-in trust layer to generate natural language responses grounded in data, such as customer relations management data, data external to a computing services environment, and/or other types of data. The conversational chat assistant may be customized with actions that employ user-specified and/or standardized flows, code, prompts, and/or application procedure interfaces.

In some embodiments, users may interact with a conversational chat assistant using natural language provided via a user interface. Alternatively, or additionally, the conversational chat assistant may dynamically generate action buttons for performing complex actions with a click. In some configurations, the conversational chat assistant may be integrated natively into existing applications provided via a computing services environment used to access web applications such as customer relations management applications.

In some embodiments, the conversational chat system may provide multi-channel communication functionality for a conversational chat assistant, for instance providing access to communication via tools such as Facebook Messenger, WhatsApp, SMS, mobile, web, WeChat, Slack, Microsoft Teams, custom communication channels, and/or other communication channels.

In some embodiments, a computer services environment may provide access to web applications and/or applications integrated into other user interfaces such as those associated with a communication channel, browser plugin, native mobile application, or other interface. In this way, a customer organization may access a conversational chat assistant configured via the conversational chat system through any of a variety of channels. Moreover, the conversational chat system may support a common onboarding process that supports a set of common best practices when configuring a new (e.g., organization-specific) conversational chat assistant. Additionally, both agents and customers of the customer organization may be provided with a unified platform for accessing the conversational chat assistant.

In some embodiments, techniques and mechanisms described herein support a multi-agent, multi-planner framework. Agents and planner frameworks may be associated with metadata entries. The metadata entries may include descriptions of the agents and planner frameworks that may be provided to a generative language model. The generative language model may then evaluate a request to generate a plan to execute a user's intent in light of the metadata descriptions. The generative language model may select an agent and planner framework for executing the plan, and indicate the selection by generating novel text that includes an identifier that uniquely identifies the agent and planner framework.

In some embodiments, techniques and mechanisms described herein support the generation of a human-readable description of a plan. For example, consider a situation in which a human agent generates a request to send a customer an email about an offer. The orchestration service may determine a plan that includes operations such as: (1) a check to determine if the request is within a valid period for the offer, (2) a check to determine whether the customer is eligible for the offer, (3) a database query to determine as to whether the customer merits an additional promotional discount, and (4) a prompt to is draft the email. Such actions may each be associated with metadata used to describe the actions and facilitate selection of the actions by the generative language model. The generative language model may use this same metadata to generate a natural language description of the plan by describing the actions that have been selected for inclusion in the plan based on the metadata.

In some embodiments, a human-readable plan may be reviewed by a human. The human may elect to provide additional user input, which the system may use to revise the plan. For instance, keeping with the example above, the human may provide input such as "Forgo the check regarding the additional promotional discount." The computing services environment may then send an updated plan determination prompt to the generative language model to update the plan based on the user's input. In this way, a human may revise the plan, potentially with multiple iterations of feedback.

In some embodiments, techniques and mechanisms described herein support human-interactive disambiguation and enrichment. In some cases, a human may provide input that references information that turns out to be ambiguous. For example, the human may provide input that could refer to more than one database record, database record type, or real-world information (e.g., the U.S. state "Georgia" or the country "Georgia"). The system may recognize such ambiguity and generate natural language text asking the human user to clarify the user's intent. User input provided in response to the request may then cause the system to retrieve additional information and/or update a plan to reflect the clarification. In this way, a human may aid the system in resolving ambiguities, potentially with multiple iterations of feedback.

Conversational Chat Architecture

FIG. 1 illustrates a computing services environment 150 that includes a unified metadata framework 100 for specifying aspects of the conversational chat system. According to various embodiments, the computing services environment 150 may include various elements and components other than the unified metadata framework 100. Such elements are discussed throughout the application as filed, for instance with respect to FIG. 2, FIG. 9, FIG. 10A, and FIG. 10B. However, for the purpose of illustration, FIG. 1 focuses on the unified metadata framework 100.

According to various embodiments, the unified metadata framework 100 may facilitate interaction between various elements of the computing services environment 150 and a conversational chat system. The unified metadata framework 100 includes a user interface layer 102, a model layer 104, and a data layer 106.

In some embodiments, the user interface layer 102 facilitates the specification of various applications and workflows 108. Such applications and workflows may include operations performed within and/or outside of the computing services environment 150. For example, applications and workflows may be specific to types of services provided via the computing services environment 150, such as sales, service, marketing, commerce, data analysis, and the like. As another example, applications and workflows may include domain-specific operations, such as those specific to healthcare, finance, or other industries.

In some embodiments, the user interface layer 102 facilitates the specification of conversational chat assistants 110. For example, the computing service environment 150 may provide one or more standard conversational chat assistants that may be accessed through user interfaces provided via the computing services environment 150 or via other communication channels such as email, SMS, or external chat services. As another example, a conversational chat assistant may be customized by, for instance, an organization accessing computing services via the computing services environment 150.

In some embodiments, the conversational chat assistant may perform operations such as receiving user input, executing one or more applications, workflows, actions, or operations within the computing services environment 150, and/or interacting with a database system, generative language model, other artificial intelligence models, and/or other system accessible via the computing services environment 150.

According to various embodiments, the model layer 104 provides for secure interaction with one or more artificial intelligence models. The model layer 104 includes a a trust layer 114, and a model interface 116.

According to various embodiments, the trust layer 114 is configured to perform operations such as masking personally identifying information, securely retrieving data, detecting toxic language generated by a generative language model, and defending prompt completions against injection attacks and other attacks. Thus, the trust layer may provide additional protections for various actions performed in the context of various applications, workflows, and conversational chat assistants. Additional details related to the trust layer are discussed throughout the application, for instance with respect to FIG. 3.

In some implementations, the data layer 106 provides access to data sources, which may be located inside or outside of the computing services environment 150. Examples of such data sources may include, but are not limited to: structured data sources, unstructured data sources, data lakes, vector databases, relational databases, unified user profiles, data-based actions, data warehouses, and data lakehouses.

Figure 2:
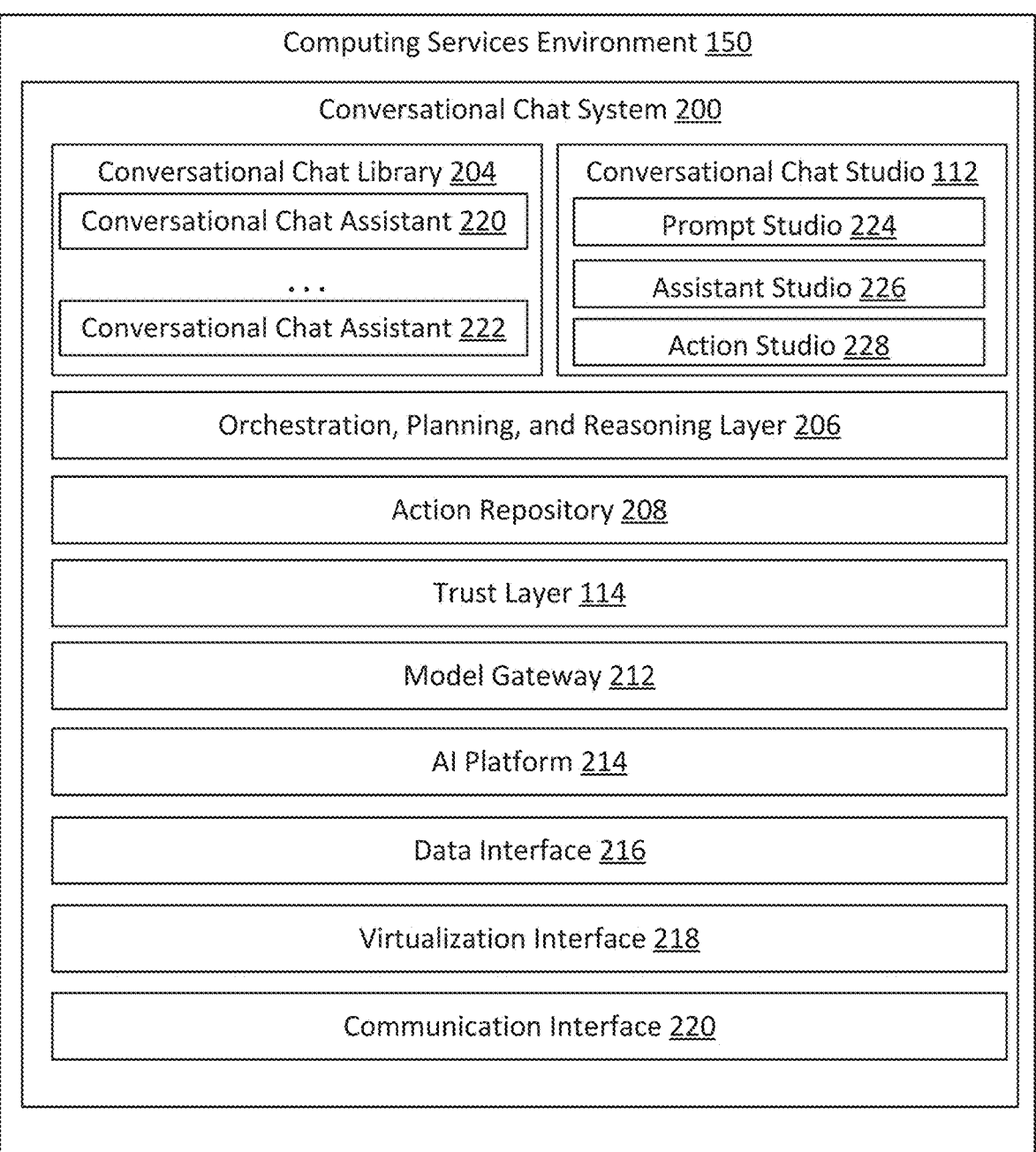
FIG. 2 illustrates an overview of the conversational chat system architecture, configured in accordance with one or more embodiments.

FIG. 2 illustrates an overview of the conversational chat system architecture 200, configured in accordance with one or more embodiments. The conversational chat system architecture 200 includes a conversational chat library 204, a conversational chat studio 112, an orchestration, planning, and reasoning layer 206, an action repository 208, the trust layer 114, a model gateway 212, an AI platform 214, a data interface 216, a virtualization interface 218, and a communication interface 220. FIG. 2 is provided as a high-level illustration of the functioning of various components within the conversational chat system architecture 200. Additional details regarding the operation of these various components are provided throughout the application.

In some embodiments, a conversational chat assistant may be used to perform one or more tasks within the computing services environment 150. For example, a conversational chat assistant may interactively converse with a user in natural language. As another example, a conversational chat assistant may interact with one or more artificial intelligence models, including one or more generative language models. As yet another example, a conversational chat assistant may retrieve information from a database system, store information to a database system, transmit one or more messages, and/or take other actions within the computing services environment 150.

In some embodiments, the conversational chat studio 112 allows for the construction and customization of various aspects of the conversational chat system. The conversational chat studio 112 may include elements such as a user interface, metadata information, monitoring, governance, and/or search tools for building conversational chat assistants 110. For example, the conversational chat studio 112 may provide support for constructing one or more prompts, actions, applications, workflows, or the like.

The conversational chat studio 112 includes a prompt studio 224, an assistant studio 226, and an action studio 228. According to various embodiments, the conversational chat studio 112 provides functionality for the configuration of assistants, actions, and prompts to support conversational chat system customized for a customer organization. For example, a user may build, test, and integrate prompts, actions, and/or conversational chat assistants into one or more applications provided by or interoperating with the computing services environment 150 to support the performance of various tasks for an organization.

Conversational chat assistants 220 through 222 may be stored in the conversational chat library 204. One or more conversational chat assistants may be configured in a standardized format for use by various organizations and individuals. Additionally, one or more conversational chat assistants may be customized for particular industries, organizations, individuals, applications, and/or other contexts.

At 206, an orchestration, planning, and reasoning layer provides for the execution of a conversational chat assistant to interpret, decompose, and implement actions based on user inputs. For example, a user instruction such as "draft an email summarizing this record" may be analyzed to identify an overall intent. The user instruction may also be decomposed into actions such as "summarize a record" and "draft an email using the summary". The decomposition and overall intent may be used to orchestrate and execute a plan, which may involve identifying the focal record, determining and completing one or more prompts to determine the summary, and determining and completing one or more prompts to draft an email using the summary. Additional details regarding the formulation and execution of such a plan are discussed throughout the application, for instance with respect to FIG. 4.

According to various embodiments, the action repository 208 may include one or more actions that are preconfigured to perform tasks within the computing services environment 150. For instance, an action repository may include actions such as "summarize a record" or "draft an email." A conversational chat assistant may identify and execute such actions in order to implement a user's intent.

In some embodiments, one or more of the actions may be specific to a particular domain. For instance, one or more actions in the health or finance domains may include particular constraints, such as instructions provided to a generative language model, to provide for compliance with relevant laws and regulations.

In some embodiments, one or more of the actions may be configurable and/or user-defined. For instance, a user associated with an organization accessing computing services via the computing services environment 150 may provide code and/or other action definition information specifying an action to be performed. The defined action may then be incorporated into an orchestration or workflow.

The model gateway 212 provides access to one or more generative language models or other artificial intelligence models. In some embodiments, a conversational chat assistant may be supported by a range of different generative language models. For example, a customer organization may be able to use standardized models provided by model providers such as Open AI, Microsoft Azure, Gemini, or the like. As another example, the model gateway 212 may also support customized models, for instance models customized and/or hosted by a customer organization. As yet another example, the model gateway 212 may provide access to models hosted by the computing service environment itself.

In some embodiments, the customer organization may configure a conversational chat assistant to employ different models for different aspects of a conversational chat assistant. For example, the customer organization may use one model (e.g., Gemini) for a function such as "summarize record", and another model (e.g., Open AI) for a function such as "draft email".

In some embodiments, the model gateway 212 may provide a feedback framework for receiving user feedback. The user feedback may be stored in the database and may be used for a variety of purposes, such as finetuning a conversational chat assistant and/or one or more of the underlying generative language models.

The AI platform 214 may provide support for generative language models hosted by the service provider of the computing services environment 150 and/or one or more partner or customer organizations. For example, the customer organization may provide their own LLM, such as a hosted LLM. As another example, the customer may employ a customer-tuned version of a standard model, such as the customer's version of a model provided by Azure or Gemini. As still another example, a conversational chat assistant may employ a standard generative language model hosted by the service provider of the computing services environment.

The data interface 216 provides access to one or more of a variety of data sources. According to various embodiments, a conversational chat assistant may access one or more data sources to support the conversational chat operations. For example, a conversational chat assistant may access third party data sources such as Google Cloud, Google BigQuery, Amazon S3, or Microsoft Azure. As another example, a conversational chat assistant may access one or more data sources from inside the computing services environment, such as customer relations management data. As still another example, a conversational chat assistant may access data from other sources, such as legacy systems, external apps, mobile sources, web sources, software development kids, and/or application procedure interfaces. Examples of data interfaces may include, but are not limited to: data lakehouses, real-time data services, zero-ETL data services, united profiles, data actions, data connectors, relational database systems, and any other interfaces for accessing structured, unstructured, or semi-structured data sources.

At 218, a virtualization platform provides for the ability to deploy one or more aspects of the platform provided via the computing services environment in one or more virtual environments. For example, data residency requirements may be enforced, ensuring that data resides in a particular location. As another example, communications may be encrypted end-to-end. As still another example, one or more regulatory requirements may be enforced.

The communication interface 220 facilitates communication with one or more client machines via any of various communication channels. For example, depending on the system configuration, a client machine may communicate with a conversational chat assistant via a web interface, a messaging application, email, voice, SMS messages, and/or any other suitable communication channel.

Figure 3:
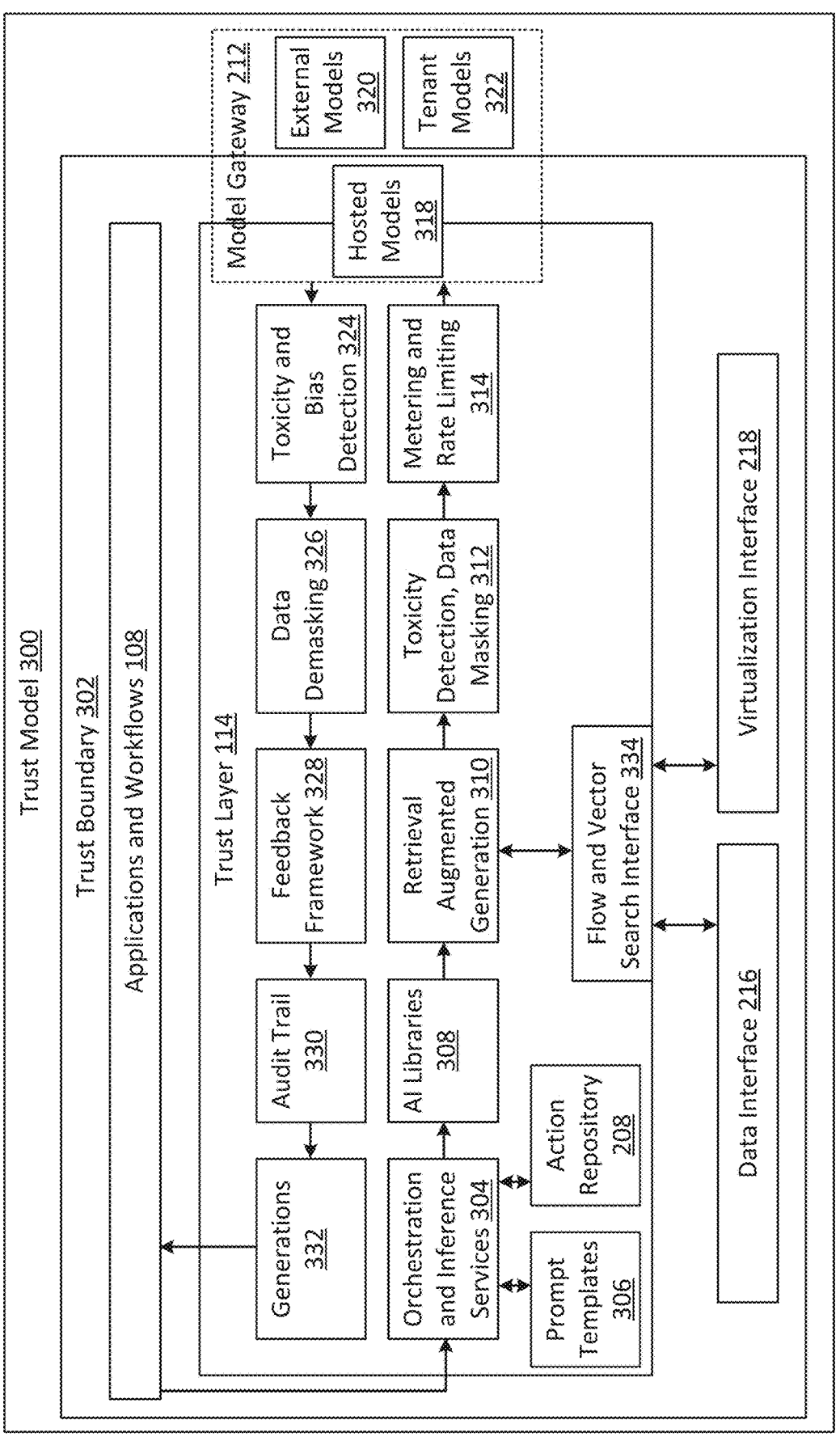
FIG. 3 illustrates a trust model for the conversational chat system, configured in accordance with one or more embodiments.

FIG. 3 illustrates a trust model 300 for the conversational chat system, configured in accordance with one or more embodiments. The trust model 300 includes a trust boundary 302. Inside the trust boundary 302 are the applications and workflows 108, the trust layer 114, the data interface 216, and the virtualization interface 218.

In some embodiments, the trust boundary 302 may separate internal from external services. Inside the trust boundary, at 206, a trust layer may provide for the execution of various trust related operations. Outside the trust boundary, one or more external services or models may operate in an untrusted zone or a zone of shared trust.

The trust layer 114 includes one or more orchestration and inference services 304, one or more artificial intelligence libraries 308, one or more retrieval augmented generation services 310, one or more inbound toxicity detection and/or data masking services 312, one or more metering and rate limiting services 314, one or more outbound toxicity and bias detection services 324, one or more data demasking services 326, a feedback framework 328, an audit trail service 330, generations 332, prompt templates 306, and a one or more flow and/or vector search services 334.

For the purpose of illustration, the trust model 300 is shown with arrows illustrating a simple flow that may employ various components. In practice, however, the trust layer 114 may be used to perform various types of complex operations that may operate outside the linear flow illustrated in the trust model 300. However, the simple flow shown in FIG. 3 may be used to understand the operation and interaction of the various elements included in the trust layer 114.

For the purpose of illustration, consider a request generated by one or more applications and workflows 108. For instance, the request may be natural language text input provided by a user, an operation instruction triggered by an action performed in the context of an application, or some other type of request. Such a request may be sent to the orchestration and inference services 304.

According to various embodiments, the orchestration and inference services 304 may analyze the request to determine an intent, execute one or more actions, generate novel text, interact with the database system, receive and/or transmit one or more messages, and/or perform other types of operations. In service of performing these operations, the orchestration and inference services 304 may access one or more prompt templates 306, one or more actions stored in the action repository 208, and/or other preconfigured definitions or templates.

The orchestration and inference services 304 may transmit information to one or more artificial intelligence libraries 308, which may trigger the retrieval of information via the one or more retrieval augmented generation services 310. The one or more retrieval augmented generation services 310 may retrieve information from inside and/or outside of the computing services environment via the data interface 216 and/or the virtualization interface 218 through the flow and/or vector search interface 334. Retrieved information may be added to a prompt template or used to perform an action.

Prompts and other requests to artificial intelligence models may be processed via one or more toxicity detection and/or data masking services 312. Toxicity detection services, bias detection services, and/or other such evaluators may seek to determine whether a request is likely to generate text or other output deemed biased, offensive, or otherwise unacceptable or impermissible. Data masking may replace some information, such as personally identifying information, with blanks, unique identifiers, or other such values.

Requests may be further processed via one or more metering and/or rate limiting services 314. Metering and/or rate limiting services 314 may help to ensure that requests to models do not exceed a designated rate. For instance, one or more requests may be queued to ensure that a request rate for a designated model, user, organization, or other context does not exceed a designated threshold.

Requests to models may be sent via the model gateway 212. According to various embodiments, the model gateway may be used to access one or more hosted models 318 hosted by the computing services environment 150, one or more tenant models 322 hosted by a customer organization, and/or one or more external models 320 hosted by a third-party service provider. Depending on the configuration, different models may reside inside of the trust layer, outside of the trust layer, and/or in an intermediate zone such as a shared trust environment.

Responses from models, such as prompt completions generated by a generative language model, may be evaluated for toxicity and bias by one or more toxicity and/or bias detection services at 324. Such evaluation may help to ensure that the system does not perform operations or return text that includes impermissible, objectionable, offensive content.

Data demasking may be performed at 326. For instance, personally identifying information in an input prompt to a generative language model may be replaced with randomly generated unique identifiers by one or more data masking services 312. Then, when the generative language model returns a prompt completion that includes one or more of the randomly generated unique identifiers, the identifiers may be replaced with the personally identifying information. In this way, the system may generate text and/or take other actions that include or reflect personally identifying information, while at the same time not exposing such information to services outside the trust model such as externally hosted generative language models.

Feedback regarding actions, text generated by large language models, and/or other such operations may be determined and stored via the feedback framework 328. Such information may be used to train models, guide subsequent actions, and/or otherwise refine the operations of a conversational chat assistant.

The audit trail service 330 may aggregate and store information used to provide a record of actions taken by the system in the course of providing a conversational chat assistant. Such information may be stored in a database system accessible via the computing services environment 150.

Text and other output generated as part of the processing of requests from the requests and workflows 108 may be returned to the applications and workflows 108 as generations at 332. Generations 332 may include, but are not limited to: text to be presented in a chat interface, instructions regarding actions to be performed in the context of providing an application or workflow, or other such information.

Conversational Chat Assistant Operational Overview

Figure 4:
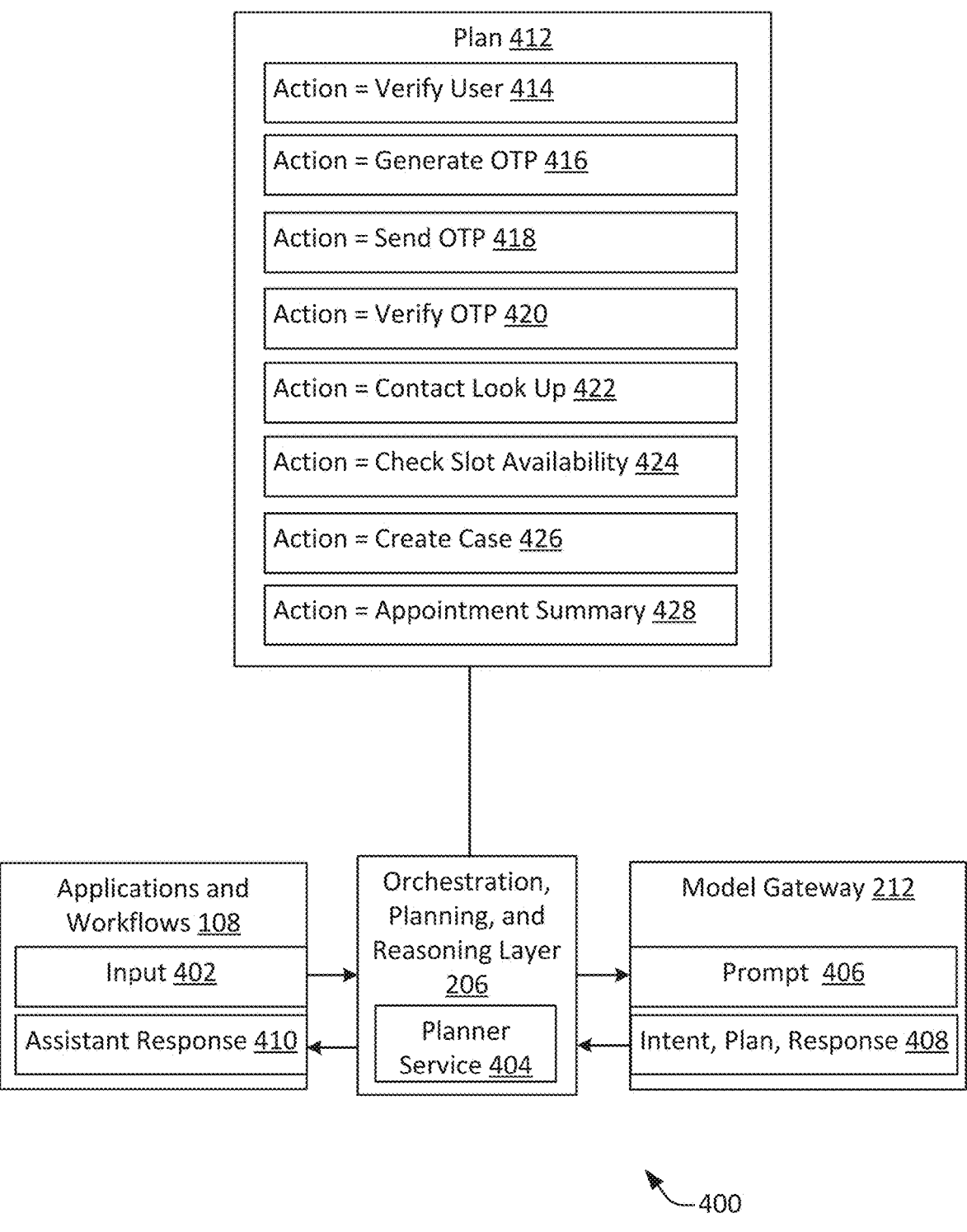
FIG. 4 illustrates an example of a flow, performed in accordance with one or more embodiments.

FIG. 4 illustrates an example of a flow 400, performed in accordance with one or more embodiments. The flow 400 is presented to illustrate how interaction with a conversational chat assistant provided via the conversational chat system architecture 200 may be determined and executed.

Input 402 is received via one or more of the applications and workflows 108. In the flow 400 shown in FIG. 4, the input 402 includes a request to book an appointment provided by a user as natural language input via a chat interface. However, different types of input may be provided in other flows. For example, the input may be a request to initiate a workflow within the computing services environment 150. As another example, the input may be generated by an application rather than a user. As yet another example, the input may be a request to interact with a database object within the computing services environment 150.

The input 402 is received by a planner service in the orchestration, planning, and reasoning layer 206. The planner service may evaluate the input to determine one or more operations to perform. In the case of natural language input, the planner service 404 may analyze the natural language input to determine an intent reflected in natural language. For instance, the planner service 404 may determine and transmit an input prompt 406 to a generative language model via the model gateway 212. The generative language model may then determine a prompt completion which is returned to the planner service 404 as a response 408.

In some embodiments, the response 408 may identify one or more actions to perform within the computing services environment. Such actions may be identified by the generative language model by selecting from descriptions of actions included in the input prompt. For instance, the input prompt may include a menu of actions that may potentially be performed in the course of responding to the input 402, and the generative language model may determine a selection of those actions to be performed.

In some embodiments, the initial response returned at 408 may identify a topic. The planner service 404 may use the topic to identify a subset of actions that potentially may be executed to fulfill the intent reflected in the input 402. Descriptions of the subset of actions may then be provided to a generative language model along with the initial input. Based on the input and the descriptions of the subset of actions, the generative language model may select one or more of the subset of actions to formulate a plan. The plan may identify the selected actions, for instance via unique identifiers, for execution by the computing services environment 150.

In the example flow 400 shown in FIG. 4, the actions to be performed to respond to the user request to book an appointment are shown in the plan 412. These actions include verifying the user at 414, generating a one-time password at 416, sending the one-time password at 418, verifying the one-time password at 420, looking up a contact at 422, checking for appointment slot availability at 424, creating a case at 426, and determining a summary of the appointment at 428.

In some embodiments, executing one or more of the actions included in the plan 412 may involve determining additional input prompts to transmit to the model gateway 212. For instance, determining an appointment summary at 428 may involve creating an input prompt that includes a natural language instruction to determine a summary, as well as information about the appointment that a generative language model may use to create the summary.

In some embodiments, executing one or more of the actions included in the plan 412 may involve actions taken by the computing services environment 150 that do not directly involve a generative language model or the model gateway 212. For instance, the computing services environment 150 may communicate with a client machine to send a one-time password at 418, look up a contact for the user in a database at 422, communicate with an external system to check for slot availability at 424, and/or perform other such operations that do not necessarily involve generating novel text via a generative language model.

Figure 5:
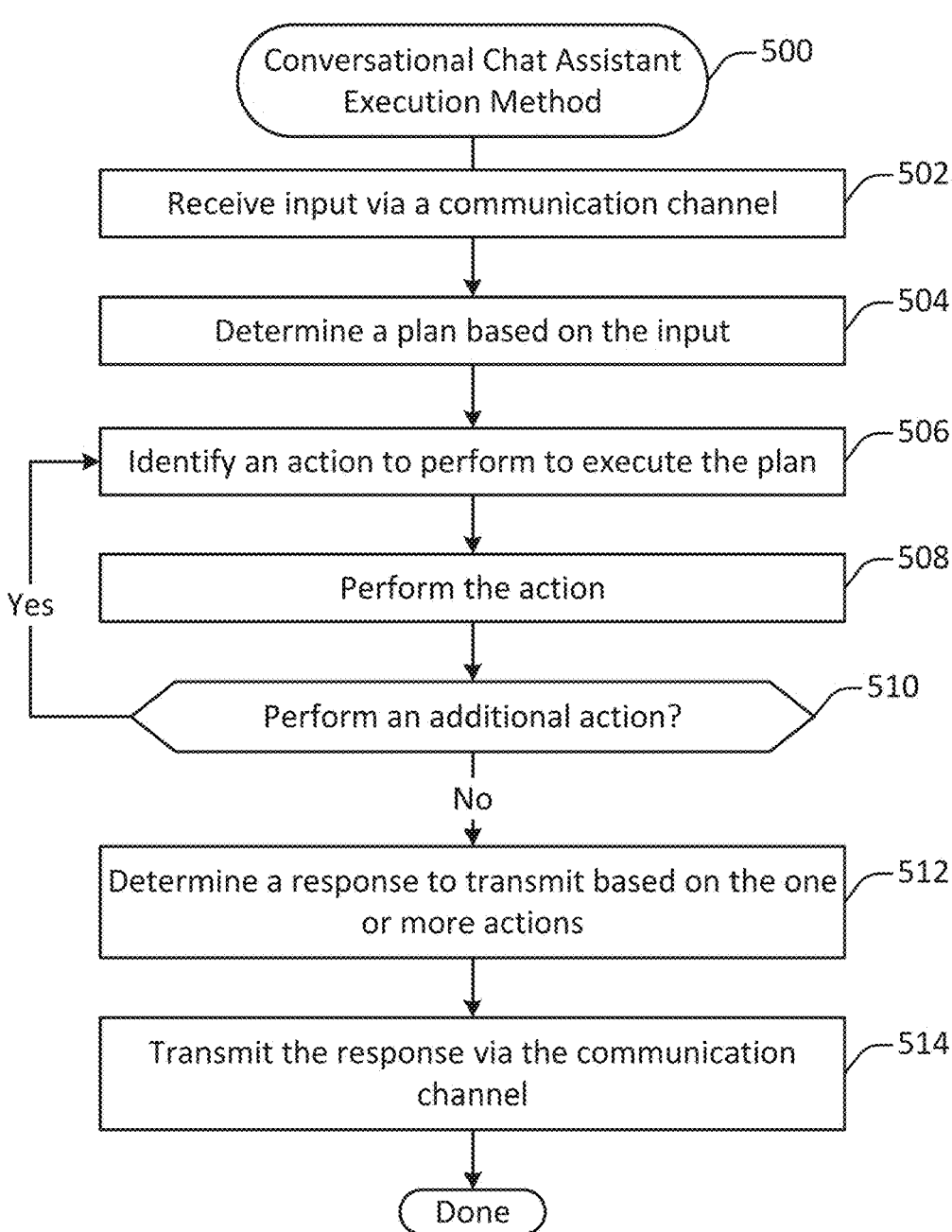
FIG. 5 illustrates a conversational chat assistant execution method, performed in accordance with one or more embodiments.

FIG. 5 illustrates a conversational chat assistant execution method 500, performed in accordance with one or more embodiments. In some embodiments, the method 500 may be performed to execute a conversational chat assistant configured in accordance with the conversational chat system architecture 200 shown in FIG. 2.

Input is received via a communication channel at 502. In some embodiments, the input may include natural language text. Alternatively, or additionally, the input may include other types of information, such as a selection of an action to perform based on a button provided in a chat interface, a request sent by an application or workflow, or another such input indicator. In general, the term "button" as used herein may refer to a virtual button displayed in a graphical user interface presented on a display screen.

In some embodiments, the communication channel may be a conversational chat interface. For instance, a conversational chat interface may be provided via a web application, mobile application, or other such service. Alternatively, the communication channel may be a messaging service such as email, SMS, Slack, WhatsApp, or any other suitable service for sending and receiving messages.

A plan to execute the user's intent as reflected in the input is determined at 504. In some embodiments, the user input may include an explicit selection of a workflow, action, or other predefined operations. For instance, the input may include a selection of a button corresponding to an action and presented in a conversational chat interface. In such a situation, the action or actions to be performed may be selected from the predefined operations.

In some embodiments, the user input may be provided via natural language. In such a situation, the user's intent may be less clear and may be determined based on one or more interactions with a generative language model. For instance, natural language text included in the input may be used to determine an intent identification input prompt. The intent identification input prompt may include the input text, a natural language request executable by a generative language model, and/or other types of information. For instance, the intent identification input prompt may include a description of actions capable of being performed via the conversational chat assistant. The generative language model may then generate novel text that includes one or more identifiers corresponding with the actions to be performed based an analysis of the intent in the input text by the generative language model. Additional details regarding a method for determining the user's intent are discussed with respect to the method 600 shown in FIG. 6.

An action to perform to execute the plan is identified at 506. Initially, the application to execute may be the first action in the plan. Subsequently, one or more additional actions may be performed, for instance as discussed with respect to the plan 412 shown in FIG. 4.

The action is performed at 508. According to various embodiments, performing the action may involve executing one or more operations such as sending a message, receiving a message, retrieving data, storing data, generating text via a generative language model, processing or evaluating text, executing an artificial intelligence model other than a generative language model, and/or performing any other suitable operations capable of being performed via the computing services environment 150.

A determination is made at 510 as to whether to perform an additional action. According to various embodiments, actions may be performed in sequence or in parallel. Additional actions may continue to be performed until all actions identified as being indicated by the received input have been performed.

Upon determining not to perform additional actions, a response to transmit is determined at 512 based on the one or more actions. The response is transmitted via the communication channel at 514.

In some embodiments, the response may include natural language output. For instance, the system may generate a textual summary of actions to be performed, a textual response to a query included in the input, a request for additional information, or the like.

In some embodiments, the response may include data. For instance, data responsive to a user query retrieved from the database system, determined by the computing services environment 150, or identified via some other method may be included.

In some embodiments, the response may include an instruction to an application or workflow. For example, the response may include an indication of suggested next action to be presented in a conversational chat interface for possible selection by a user via user input. As another example, the response may include an indication of an operation to be performed by the application or workflow.

Figure 6:
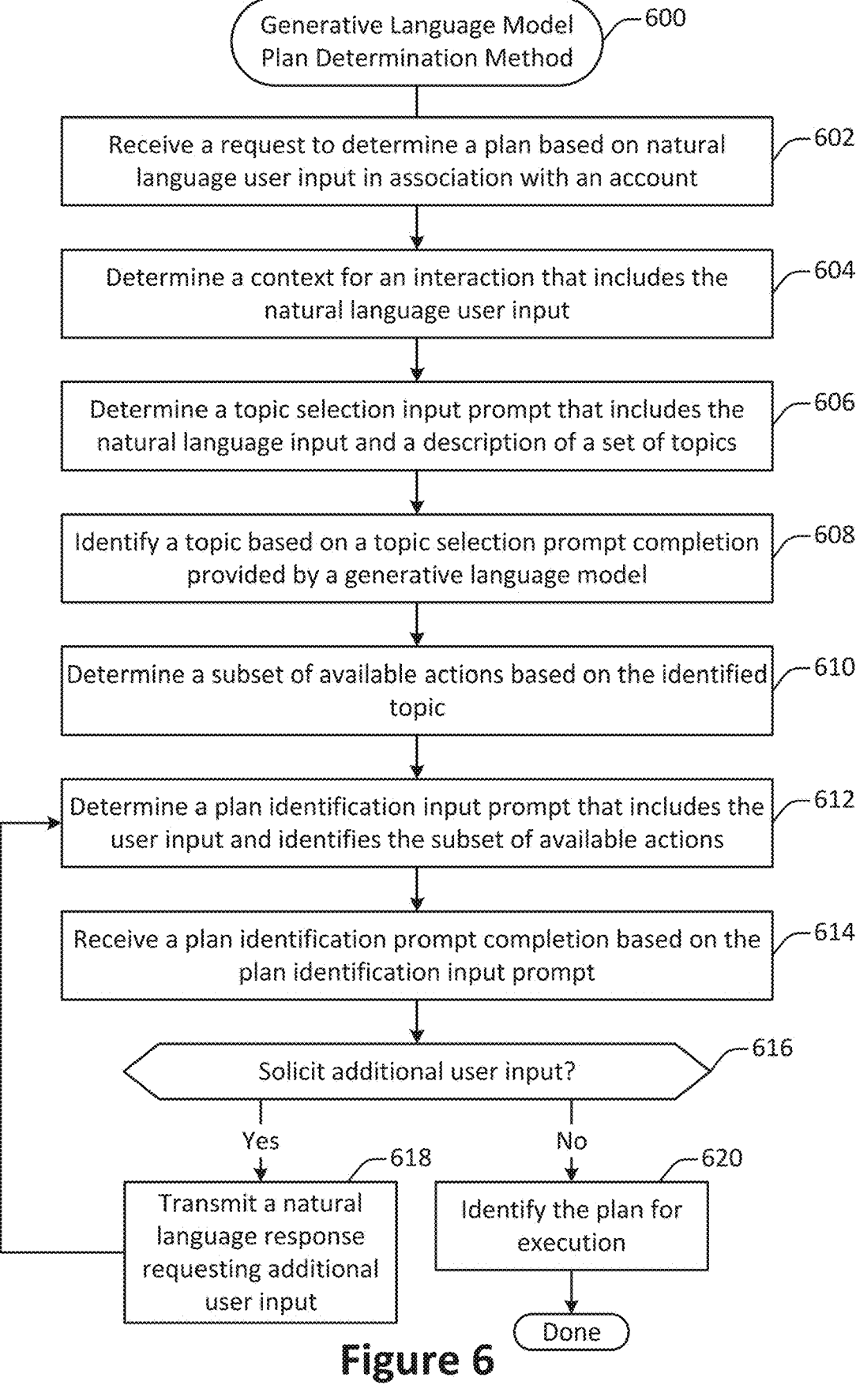
FIG. 6 illustrates a method for determining a plan via a generative language model, performed in accordance with one or more embodiments.

FIG. 6 illustrates a method 600 for determining a plan via a generative language model, performed in accordance with one or more embodiments. The method 600 may be performed at a computing services environment such as the computing services environment 150 shown in FIG. 1.

A request to determine a plan based on natural language input in association with an account is received at 602. In some embodiments, the request may be generated as discussed with respect to the operation 504 shown in FIG. 4. For instance, the request may be generated based on natural language input such as "Update the opportunity to be $70,000", "Book an appointment for me," "Find the contact for Acme", or any other type of input.

In some embodiments, the user input may be received in association with an account at the database system. The account may be associated with an individual user. Alternatively, or additionally, the account may be associated with an organization such as an organization accessing computing services via the computing services environment.

A context for an interaction that includes the natural language user input is determined at 604. In some embodiments, the context may include any or all of a variety of information. For example, the context may include one or more identifiers for a user account, an organization account, or any other account within the computing services environment 150. As another example, the context may include one or more previous natural language inputs or other inputs provided by the user. As another example, the context may include one or more natural language outputs or other operations performed by the computing services environment 150 in the course of the interaction. As yet another example, the context may include metadata characterizing the end user, the organization with which the user is interacting, and/or other suitable characteristics. As still another example, the context may include situational data such as a user location, a database record being accessed, a date and time, the weather in a particular location, or any other type of information potentially relevant to the interaction.

In some embodiments, information included and/or determined based on the context determined at 604 may be used to guide the determination of the plan. For instance, a user account may be provided with access only to particular database objects, actions, topics, and/or other elements of the computing services environment 150. Such information may be used, for instance, to guide the determination of the subset of available actions at 610, the determination of a topic at 606 and 608, and/or the identification of a plan at 620.

A topic selection input prompt is determined at 606. The topic selection input prompt includes some or all of the natural language user input and a description of a set of topics. The topic selection input prompt may instruct the generative language model to select from the set of topics for the purpose of identifying prospective actions to perform to fulfill the intent reflected in the user's input.

According to various embodiments, the particular topics that may be selectable may depend upon the context. For example, the computing services environment 150 may provide a set of default topics, such as database system interaction, service-related operations, sales-related operations, and the like. As another example, one or more topics may be tailored to specific industries, organizations, individuals, or other contexts.

The topic is identified at 608 based on a topic selection prompt completion provided by a generative language model. For instance, the generative language model may generate novel text that includes an identifier corresponding to the topic that the generative language model identifies as being most closely related to the user's intent. The identifier may be extracted from the topic selection prompt completion by the computing services environment 150.

In some embodiments, the generative language model may identify more than one topic. For instance, the generative language model may identify the user's intent as being related to sales operations and payment processing topics.

A subset of available actions is determined at 610 based on the identified topic. In some embodiments, an action may be any operation or combination of operations capable of being performed via the computing services environment 150. For instance, an action may include a prompt completed by a generative language model, one or more database operations, an API request, or another type of operation.

For illustration, FIG. 7 shows a metadata diagram 700 identifying relationships between elements for configuring actions, provided in accordance with one or more embodiments. The metadata diagram 700 includes relationships between topics 702, actions 704, and building blocks 706.

The building blocks 706 include granular operations that may be performed within the computing services environment 70. Examples of building blocks 706 include, but are not limited to, workflows 732, code blocks 734, external API calls 736, prompts determined based on prompt templates 738, other invocable actions 740, and invocable services 742.

Examples of actions are shown at 704. As discussed herein, an action is a logical grouping of operations that optionally includes an input and/or output. Examples of actions include, but are not limited to, getting internal knowledge answers 710, getting website answers 712, generating reply recommendations 714, calculating payments 714, calculating payments 716, processing payments 718, making a payment with Vimeo 720, querying a database object 722, updating a database object 724, updating a permission set 726, and recommending a description 728.

One or more building blocks 706 may be grouped together to form an action, examples of which are shown at 704. As one example, the process payment action 718 may include one or more inputs (e.g., the amount of payment received), one or more outputs (e.g., a summary of the payment processing operation performed), one or more flows 732 for processing the payment, and one or more code blocks 732 executable at different stages of the flow.

A set of topics is shown at 702. The topics 702 include a knowledge topic 750, a payment topic 752, and a customer relations management topic 754. In practice, the conversational chat system architecture 200 may include various numbers and types of topics, actions, and building blocks.

According to various embodiments, the topics 702 may serve as logical groupings of actions. Such groupings may be used to identify a set of actions for which to include descriptions when communicating with a generative language model. For instance, when the user's intent as reflected in user input is to perform an operation related to payment, descriptions of actions associated with the payment topic 752, such as the calculate payment action 716, the process payment action 718, and the payment with Vimeo action 720, may be retrieved and incorporated into an input prompt sent to a generative language model. The generative language model may then complete the prompt by generating novel text that includes identifiers corresponding to one or more of the actions. The computing services environment 70 may then execute the actions corresponding to the identifiers to provide a response to the user.

Returning to FIG. 6, the subset of actions identified may be those linked to the identified topic, as shown in FIG. 7. At 612, a plan identification prompt that includes the user input and identifies the subset of available actions is determined. In some embodiments, the plan identification prompt may list the subset of available actions for selection by the generative language model as part of generating a plan to execute the user's intent.

An example of a prompt template that may be used to determine an intent and/or an orchestration plan as discussed with respect to operation 612 and elsewhere herein is as follows. In the following prompt template, portions such as "{{$history}}" represent fillable portions that can be dynamically replaced with relevant content at runtime to determine an input prompt from the prompt template. For example, "[HISTORY]" may be replaced with natural language input and/or output included in a chat interface. As another example, {{$available_functions}} may include a list of operations that may be performed in response to the input.

```
<message role="System"><![CDATA[
Create an XML plan utilizing the [AVAILABLE FUNCTIONS] based on the user's latest
goal as stated in the [HISTORY]. Ensure that the USER GOAL is clearly understood from
the last exchange in the [HISTORY]. Use the context provided by the [HISTORY] to
discern the intent behind previous assistant responses before formulating the plan.
As part of creating the plan also make sure you also include identifying the user's intent
as expressed in the USER GOAL. Examine the [HISTORY] carefully to understand the
conversation flow and the intent behind the assistant's responses.
Review the [AVAILABLE FUNCTIONS] thoroughly. Your ability to engage in conversation
is constrained to these functions. Use this information to generate a valid plan as well
as both the category and the intent.
[INTENT INSTRUCTIONS]
Determine the USER INPUT and classify it into one of the following categories:
---
- new: If the user introduces a new subject that aligns with the [AVAILABLE
FUNCTIONS], create a DISTINCT, RELEVANT, and SIGNIFICANT 3-word intent label for
the USER INPUT.
- previous: If the USER INPUT is a continuation of or a response to a prior ASSISTANT
message in the chat history, apply the same intent that was used previously.
- smallTalk: If the user is attempting to engage in casual conversation unrelated to the
[AVAILABLE FUNCTIONS], classify the USER INPUT as smallTalk and skip the planning
step.
For each intent category, use the 'type' input to indicate the type of intent (choosing
from new, previous, smallTalk) and the 'name' input to provide appropriate details and
represent it under <intent/>.
If the category is small talk, then there is no need to create a plan and skip the function
sequence step.
[END INTENT INSTRUCTIONS]
[SYSTEM FUNCTIONS]
---
- completeAssignment: "Run this command in the end when the Assignment is
completed using AVAILABLE FUNCTIONS below."
inputs:
properties:
- answer: The answer or result of the assigned task. Please provide user-friendly result
with insights.
type: string
required:
- answer
- askUser: "Run when assistant need to get input from the user. This function can accept
only one input from the user."
inputs:
properties:
- question: The question to the user.
type: string
required:
- question
[END SYSTEM FUNCTIONS]
[AVAILABLE FUNCTIONS]
{{$available_functions}}
[END AVAILABLE FUNCTIONS]
[TYPE DEFINITION]
{{$type_definitions}}
[END TYPE DEFINITION]
```

Today is: {{$today}}
[LOCALE]
{{$locale}}
[END LOCALE]
[FUNCTION POLICIES]
1. For Copilot_v1.EmployeeCopilot_IdentifyRecordByName function you are allowed
to use Salesforce Object Api Names from this given list ONLY: {{$object_api_names}}.
Skip Object API Name when you are not confident.
[END FUNCTION POLICIES]
[FUNCTION INSTRUCTIONS]
CRUCIAL:
To call a function, follow these steps:
1. A function has one or more named parameters and a single 'output' which are all
strings. Parameter values should be xml escaped.
2. To save an 'output' from a <function>, to pass into a future <function>, use
<fn.{FullyQualifiedFunctionName} ... output="<UNIQUE_VARIABLE_KEY>"/>
3. To save an 'output' from a <function>, to return as part of a plan result, use
<fn.{FullyQualifiedFunctionName} ... result="<UNIQUE_RESULT_KEY>"/>
4. Use a '$' to reference a context variable in a parameter, e.g. when 'INPUT='world''
the parameter 'Hello $INPUT' will evaluate to 'Hello world'.
5. Functions do not have access to the context variables of other functions. Do not
attempt to use context variables as arrays or objects. Instead, use available functions
to extract specific elements or properties from context variables.
6. Make sure that all REQUIRED parameters for function are populated from previous
function output or history or user input.
DO NOT DO THIS, THE PARAMETER VALUE IS NOT XML ESCAPED:
<fn.Name4 input="$SOME_PREVIOUS_OUTPUT" parameter_name="some value with
a <!-- 'comment' in it -- >"/>
DO NOT DO THIS, THE PARAMETER VALUE IS ATTEMPTING TO USE A CONTEXT
VARIABLE AS AN ARRAY/OBJECT:
<fn.CallFunction input="$OTHER_OUTPUT[1]"/>
Here is a valid example of how to call a function "_Function_.Name" with a single input
and save its output:
<fn._Function_.Name input="this is my input" output="SOME_KEY"/>
Here is a valid example of how to call a function "FunctionName2" with a single input
and return its output as part of the plan result:
<fn.FunctionName2 input="Hello $INPUT" result="FINAL_ANSWER"/>
Here is a valid example of how to call a function "Name3" with multiple inputs:
<fn.Name3 input="$SOME_PREVIOUS_OUTPUT" parameter_name="some value with
a <!-- 'comment' in it-->"/>
[END FUNCTION INSTRUCTIONS]
[PLAN INSTRUCTIONS]
CRUCIAL:
To create a plan, follow these steps:
0. The plan should be as short as possible.
1. From a USER GOAL create a <plan> as a series of functions.
2. Use [HISTORY] to get the context for <goal>. [HISTORY] is conversation history
between you and the user. User might have provided information as part of the history.
Use that when creating <plan>.
3. If present, use [EXISTING PLAN] as reference when creating a new plan. Update the
existing plan as appropriate based on [HISTORY]
4. If [PLAN ERROR] has errors it means that you previously generated an incorrect plan,
and you are NOW being asked to RECREATE the plan by FIXING the errors specified in
the [PLAN ERROR].
5. A plan has 'INPUT' available in context variables by default.
6. Before using any function in a plan, check that it is present in the [AVAILABLE
FUNCTIONS] list. If it is not, do not use it.
7. Only use functions that are required for the given USER GOAL.
8. Append an "END" XML comment at the end of the plan after the final closing </plan>
tag.
9. Always output valid XML that can be parsed by an XML parser.
10. Always use at least one AVAILABLE FUNCTION.
11. If a plan cannot be created with the [AVAILABLE FUNCTIONS], return <plan />.
12. Use the [TYPE DEFINITION] section to get the type definitions for the [AVAILABLE
FUNCTIONS] input and output properties. All references to the output of the function
MUST be referenced as $<UNIQUE_VARIABLE_KEY>.< property_name> where
'property_name' represents the fully qualified name of the function property. For eg if
the function output with a property named 'output', then the reference to that
property will be $<UNIQUE_VARIABLE_KEY>.output.
13. Use the [FUNCTION POLICIES] section to enforce any prerequisites.
[END PLAN INSTRUCTIONS]
CRUCIAL:
When generating the output, you must evaluate the outcome of the execution in
relation to the provided [HISTORY] and the USER GOAL. It is imperative that you follow
all guidelines outlined in the [INTENT INSTRUCTIONS], [PLAN INSTRUCTIONS], and
[FUNCTION INSTRUCTIONS].
Your output must be formatted exclusively in the XML structure shown below. Do not
include any additional text or elements outside of this structure. Do not provide
[INTENT] and [PLAN] only xml should be provided.

-continued

```
'''xml
<intent type="Specify one: new, previous, smallTalk" name="Provide a concise intent
label according to the requirements for the chosen category" />
<plan>
<fn.{FullyQualifiedFunctionName} ... />
<fn.{FullyQualifiedFunctionName} ... />
<fn.{FullyQualifiedFunctionName} ... />
<!-- Continue to add function calls as necessary -->
</plan>
'''

Remember, the output must contain only the <plan> XML element and its contents as
specified. No other text or elements should be included in the output.
Begin!
]]></message>
<message role="User"><![CDATA[
[HISTORY]
{{$history}}
- role: USER
message:
text: {{$input}}
[END HISTORY]
[EXISTING PLAN]
{{$existing_plan}}
[END EXISTING PLAN]
[PLAN ERROR]
{{$plan_error}}
[END PLAN ERROR]
]]></message>
```

A plan identification prompt completion is received at 614 based on the plan identification input prompt. The plan identification input prompt may include novel text generated by the generative language model in response to receiving the plan identification input prompt.

A determination is made at 616 as to whether to select additional input. In some embodiments, upon determining that the plan identification prompt completion includes information sufficient for identifying a plan for execution, the plan may be identified at 620. For example, the plan identification prompt completion may include a plan for execution. For instance, the plan identification prompt completion may include a set of identifiers corresponding to a selected one or more actions of the subset of actions determined at 610.

In some embodiments, the selected one or more actions may be arranged in a linear fashion. For instance, the selected one or more actions may be identified in a sequence for execution by the computing services environment 150 to execute the user's intent.

In some embodiments, the selected one or more actions may be arranged in a branching, parallel, or otherwise non-linear fashion. For example, the outcome of one action may influence which of two or more possible subsequent actions are performed. As another example, multiple actions may be performed at the same time or in any suitable order.

In some embodiments, upon determining instead that the plan identification prompt completion does not include information sufficient for identifying a complete plan for execution, a natural language response requesting additional user input may be transmitted at 616.

As an example of when additional user input may be indicated, consider a situation in which a user provides natural language input stating "Update the opportunity to be $70,000". In response to this input, the computing services environment 150 may identify "database interaction" as a suitable topic. However, in response to a request to determine a plan to execute the user's intent, the generative language model may observe that the action to update an opportunity object requires as input an identifier for an opportunity object but that the opportunity object to update is not apparent. In such a situation, the generative language model may return a clarification question rather than a plan for execution. For instance, the generative language model may return natural language input such as "Which opportunity object would you like me to update?".

Figure 8:
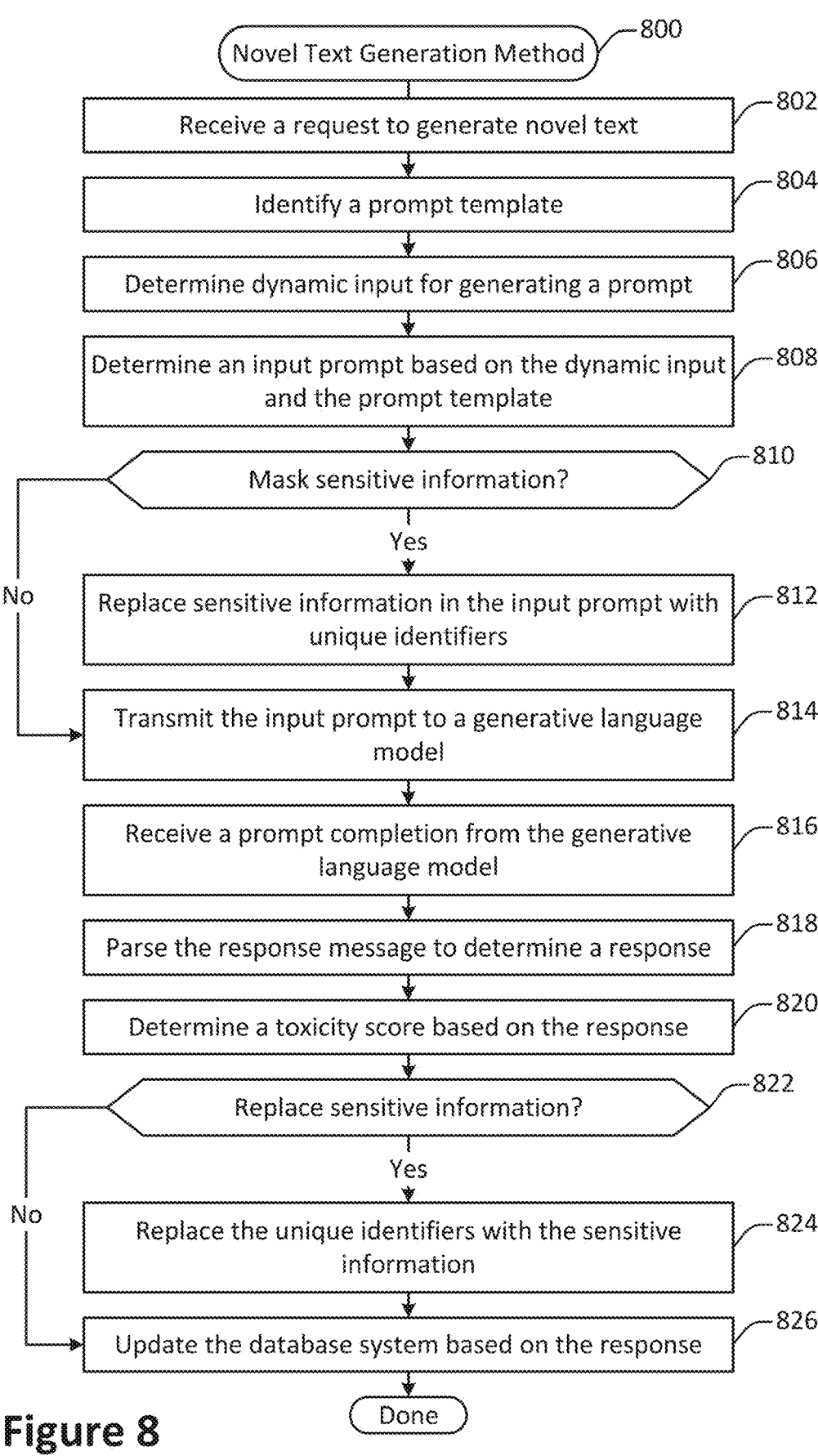
FIG. 8 illustrates a method for generating novel text, performed in accordance with one or more embodiments.

FIG. 8 illustrates a method 800 for generating novel text, performed in accordance with one or more embodiments. The method 800 may be performed at the computing services environment 150. The method 800 may be performed in order to complete a prompt in the course of executing an orchestration plan such as a plan determined as discussed with respect to FIG. 4.

According to various embodiments, an orchestration plan may include one or more operations to perform to execute the intent. For example, a contact record summarization orchestration may include a first operation to perform a vector search of a database system to identify a contact record for Alexandra, and a second operation to determine and complete a generative language model prompt summarizing the information included in the contact record.

In particular embodiments, the method 800 may be executed multiple times to determine a natural language response. For example, an initial natural language instruction to "Summarize Alexandra's record" may prompt a clarifying natural language response stating that: "Alexandra has both a contact and an account record. Would you like me to summarize Alexandra's contact record or Alexandra's account record?" The method 800 may then be executed again to produce the summary based on a clarifying response provided by the user.

According to various embodiments, customer organizations can specify the type of orchestration being performed. For example, an orchestration may be a stepwise process in which a sequence of steps is executed in order, potentially with branches and/or dependencies. As another example, an orchestration may be a set of operations performed in parallel or all at once. As still another example, an orchestration may be a complex interrelated set of operations organized in a graph structure, the execution of which is interdependent. Standard orchestrations may be used, or a customer organization can provide its own orchestrations. Further, an orchestration may trigger other orchestrations, and/or be used to resolve which of a set of orchestrations to execute.

In some embodiments, natural language may be used to generate prompts. For example, a customer organization may specify the content of prompts to use in a prompt builder, either manually or by describing a prompt in natural language.

A request to execute a prompt is received at 802. In some embodiments, the request may be generated by a conversational chat assistant. For example, the request may be generated in the course of executing an action included in a plan. For instance, the action may involve drafting an email, determining a summary of a record, or generating novel text in any of various types of situations.

A prompt template is identified at 804. According to various embodiments, the particular prompt template identified at 804 may depend in significant part on the context. For instance, the prompt template may be identified based on the request received at 802, which may identify an action configured in accordance with techniques and mechanisms discussed herein. For example, an action to generate a summary of a database record may include as input a database record identifier and may be associated with a prompt template for summarizing the information. The prompt template for summarizing the database record may include fillable fields corresponding with fields associated with the database record, as well as natural language instructions to be executed by the generative language model to generate novel text summarizing the record.

Dynamic input for generating an input prompt is determined at 806. In some embodiments, some or all of the dynamic input information may be retrieved from the database system. For instance, a record identifier may be used to query the database system to retrieve fields corresponding with a database object. Alternatively, or additionally, some or all of the dynamic input information may be retrieved from a different data source, such as via an external API.

In some embodiments, some or all of the dynamic input information may be determined based on an interaction with a conversational chat assistant. For instance, some or all of natural language input provided by an end user and/or natural language output generated in response by a conversational chat assistant may be identified for inclusion in the prompt. In this way, the generative language model may be provided with the natural language context associated with the request to generate novel natural language.

An input prompt is determined at 808 based on the dynamic input and the prompt template. In some embodiments, determining the dynamic input may involve replacing one or more fillable portions of the prompt template with some or all of the dynamic input information determined as discussed with respect to the operation 806.

A determination is made at 810 as to whether to mask sensitive information. In some embodiments, the determination may be made at least in part based on configuration information. For example, some types of database fields, action inputs, or other information may be identified as including personally identifying information.

Upon determining to mask sensitive information, sensitive information in the prompt is identified and replaced with unique identifiers at 812. In some embodiments, sensitive information may be identified as such by the database system, for instance when it is retrieved from the database. Alternatively, or additionally, sensitive information may be identified dynamically, for instance by analyzing the prompt to identify information such as names, addresses, identifiers, and other such information.

In some embodiments, the use of a unique identifier may allow sensitive information to be replaced when the completion is received from the generative language model. For example, a name may be replaced with an identifier such as "NAME OF PERSON 35324". As another example, an address may be replaced with a more general description of a place, such as "LOCATION ID 53342 CITY, STATE, COUNTRY", with the street and building number omitted. As yet another example, a database record identifier may be replaced with a substitute identifier.

The input prompt is transmitted to a generative language model for execution at 814. In some embodiments, the input prompt may be sent to the generative language model via the model gateway 212. The particular generative language model to which the prompt is sent may be dynamically determined. For instance, different generative language models may have different characteristics. Accordingly, the input prompt may include elements tailored to the specific generative language model to which the input prompt is sent.

A prompt completion is received from the generative language model at 816. According to various embodiments, the prompt completion may include novel text determined by the generative language model based on the raw prompt. The prompt completion may be received in a response message via the model gateway 212 shown in FIG. 2.

The response message is parsed at 818 to determine a response. In some embodiments, parsing the response message may include extracting the novel text from the response message and optionally performing one or more post-processing operations on the novel text. For instance, the novel text may be placed within a response template or combined with information retrieved from the database system.

A toxicity score is determined at 820 based on the response. In some embodiments, the toxicity score may evaluate the novel text determined by the generative language model via a toxicity model configured to evaluate text toxicity. The toxicity model may identify text characteristics such as sentiment, negativity, hate speech, harmful information, and/or stridency, for instance based on the presence of inflammatory words or phrases, punctuation patterns, and other indicators.

In some embodiments, information about bias may be determined instead of, or in addition to, a toxicity score. Bias detection may involve evaluating generated text to determine, for instance, whether it favors a particular point of view.

A determination is made at 822 as to whether to replace sensitive information in the completion. The determination may be made based on whether sensitive information was masked at operations 810 and 812. Upon determining to replace sensitive information, the unique identifiers added to the prompt at 812 may be replaced with the corresponding sensitive information at 824.

The database system is updated based on the response at 826. According to various embodiments, updating the database system may involve storing, removing, or updating one or more records in the database system. For instance, the response may include novel text to include in a database system record. Alternatively, or additionally, updating the database system may involve transmitting a response to a client machine, an application server, or another recipient. The response may include some or all of the novel text. As still another possibility, updating the database system may involve sending an email or other such message including some or all of the novel text.

In some embodiments, updating the database system may involve storing and/or transmitting the toxicity score. For example, the toxicity score may be presented in a graphical user interface of a web application in which the novel text determined by the generative language model is shown.

In some embodiments, a prompt template may be associated with a prompt class. For example, a system prompt template may be configured and executed by the computing services environment provider. As another example, a user prompt template may be configured and executed by a user of the database system. As yet another example, a conversational chat assistant prompt template may be configured and executed in the context of a messaging interaction.

In some embodiments, some elements discussed with respect to the method 800 shown in FIG. 8 may be determined based at least in part on a security level associated with a prompt template. For example, a system prompt template may have no need for checks related to injection attacks. However, protections against injection attacks may be required for an assistant prompt template or a user prompt template. For example, a system prompt template may have no need for checks related to toxicity, bias, and the like. However, protections against toxicity and bias may be optionally specified as configuration parameters for an assistant prompt template or a user prompt template.

Computing Services Environment Architecture

Figure 9:
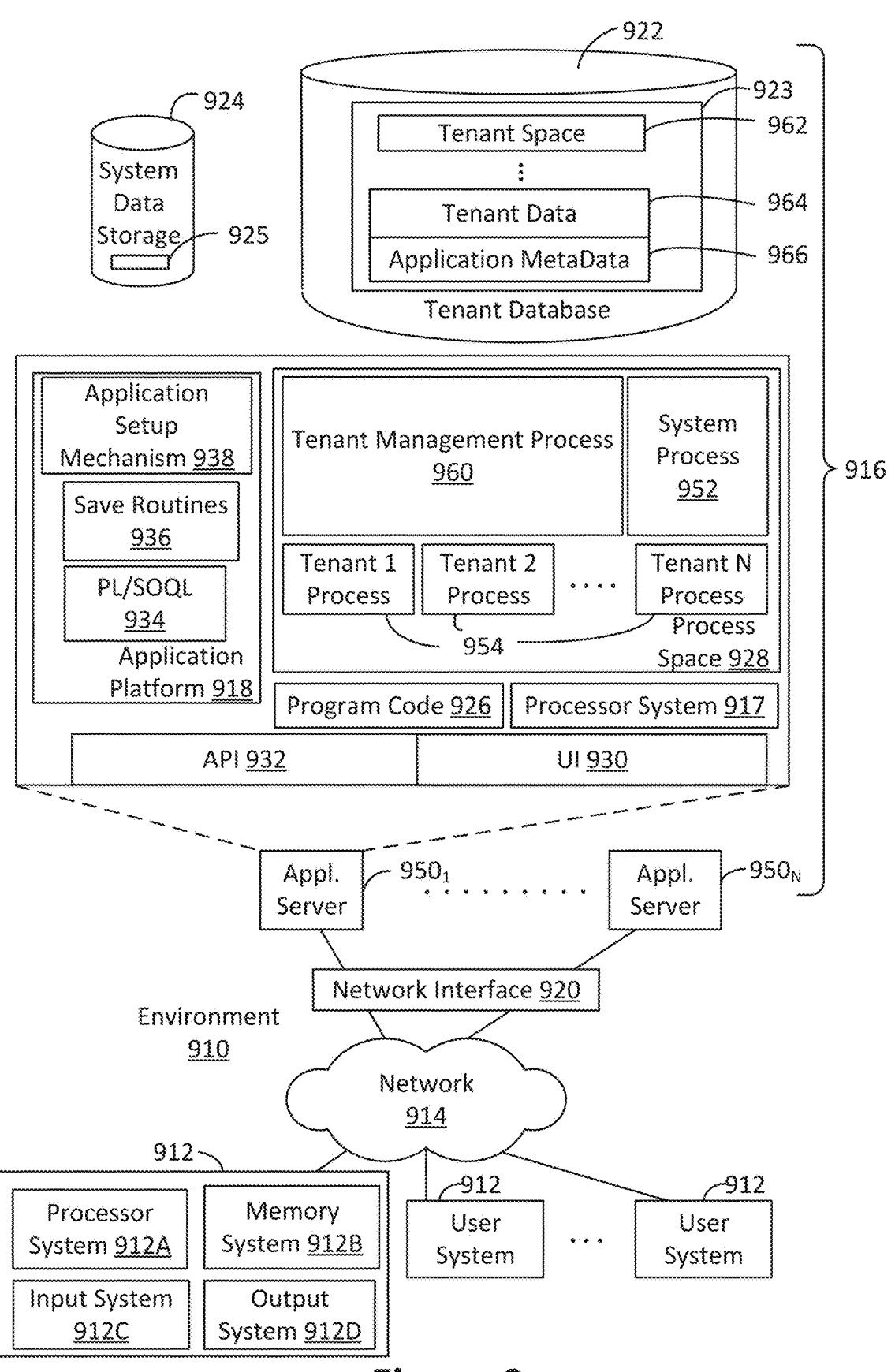
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 918 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 9,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement a web-based generative language model system. For example, in some implementations, system 916 may include application servers configured to implement and execute generative language model software applications. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 912D. A user system 912 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permissions" of the particular user system 912. As discussed herein, permissions generally govern access to computing resources such as data objects, components, and other entities of a computing system, such as a generative language model platform, a social networking system, and/or a CRM database system. "Permission sets" generally refer to groups of permissions that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 9,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 10A, 10B:
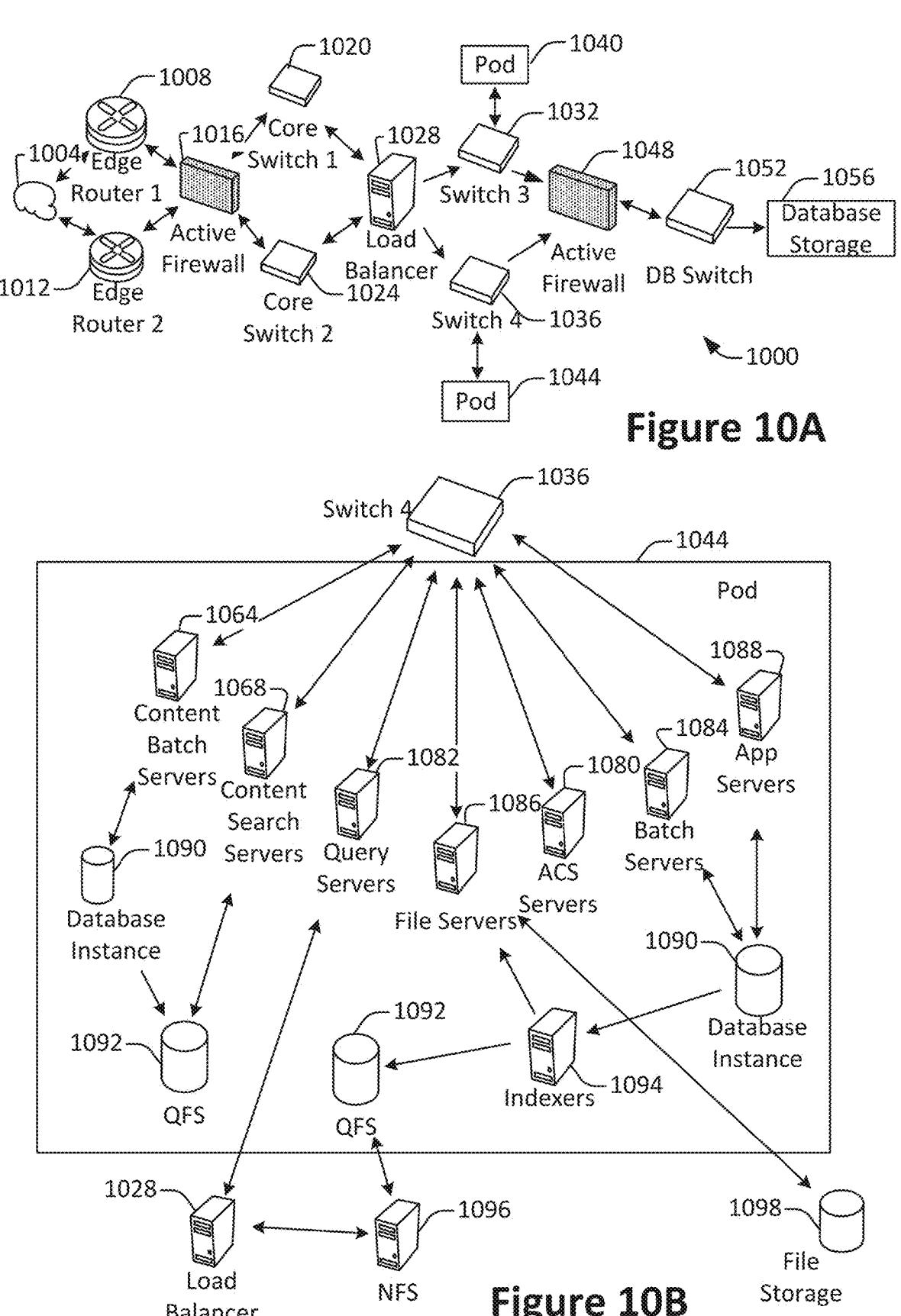
FIG. 10A shows a system diagram of an example of architectural components of an on-demand database service environment, configured in accordance with some implementations.
FIG. 10B shows a system diagram further illustrating an example of architectural components of an on-demand database service environment, in accordance with some implementations.

FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems 912 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process generative language model information.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the internet.

In one or more implementations, the firewall 1016 may protect the inner components of the environment 1000 from internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBs), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
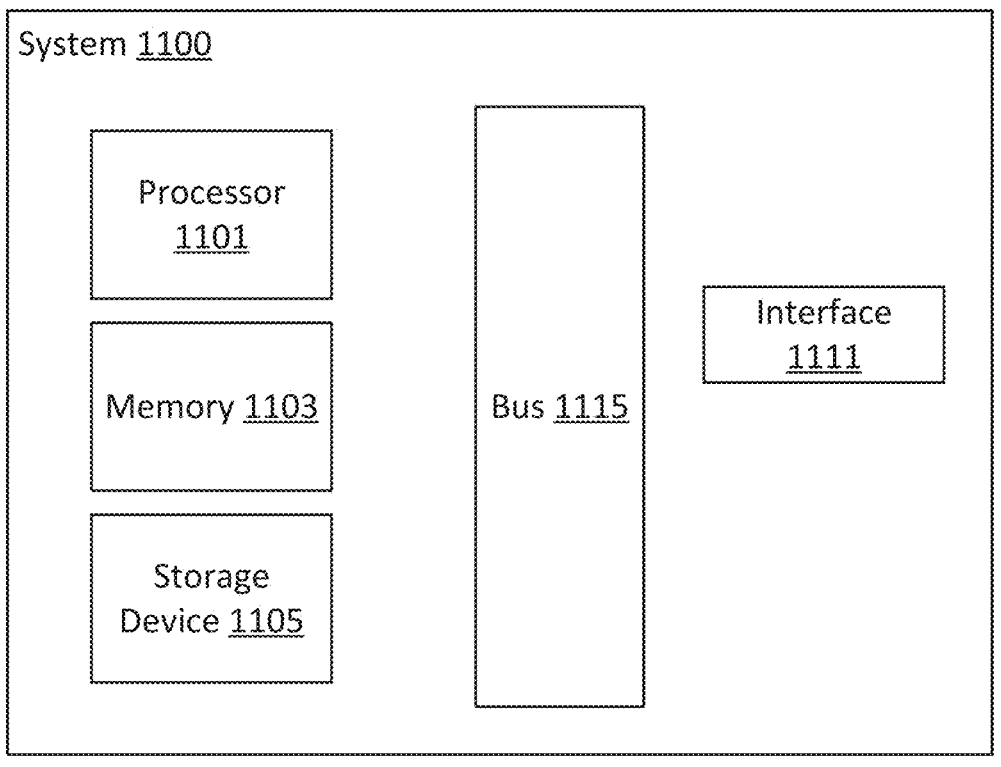
FIG. 11 illustrates one example of a computing device, configured in accordance with one or more embodiments.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as a variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Action Configuration

Figure 12:
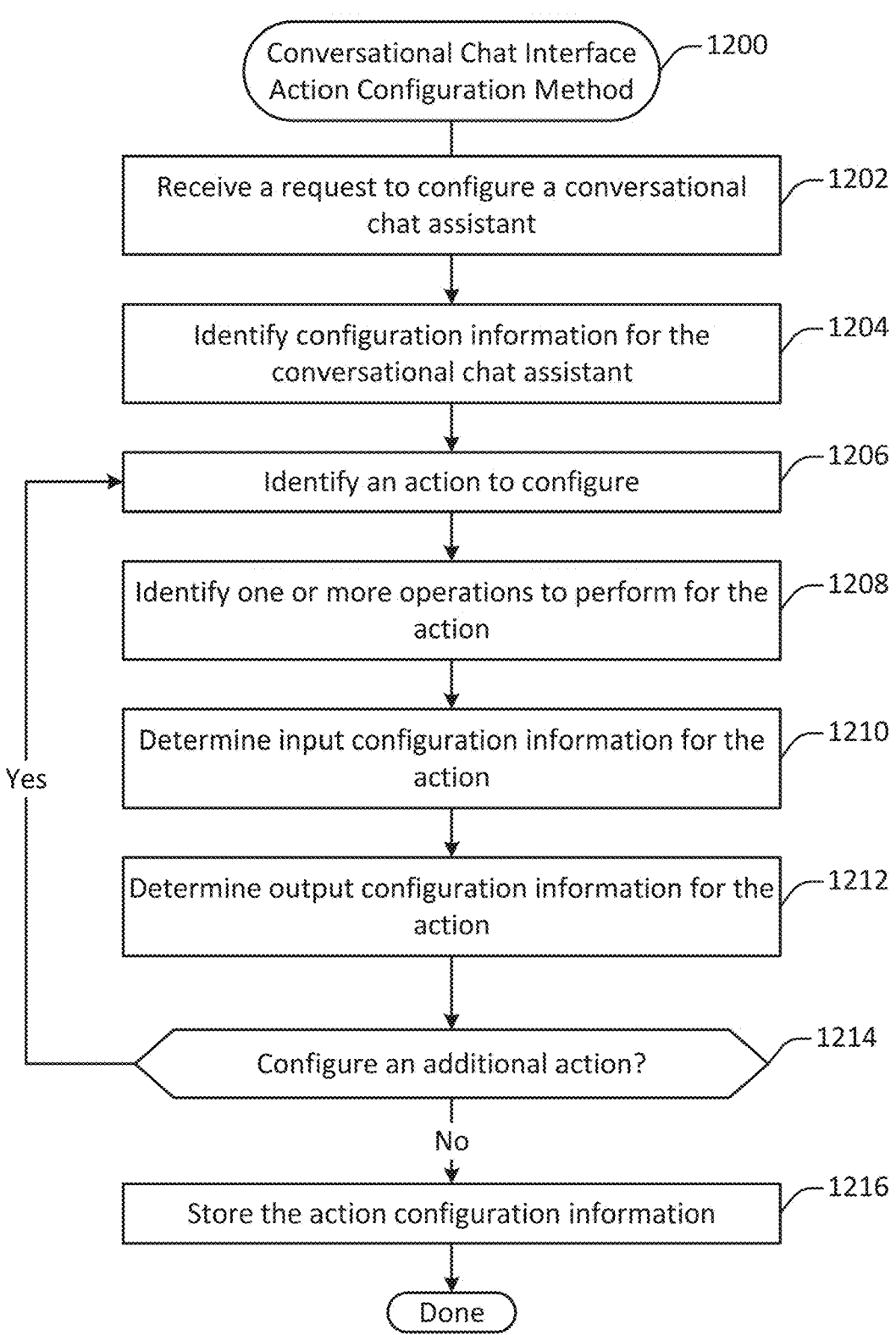
FIG. 12 illustrates a method for configuring a conversational chat assistant, performed in accordance with one or more embodiments.
Figure 15:
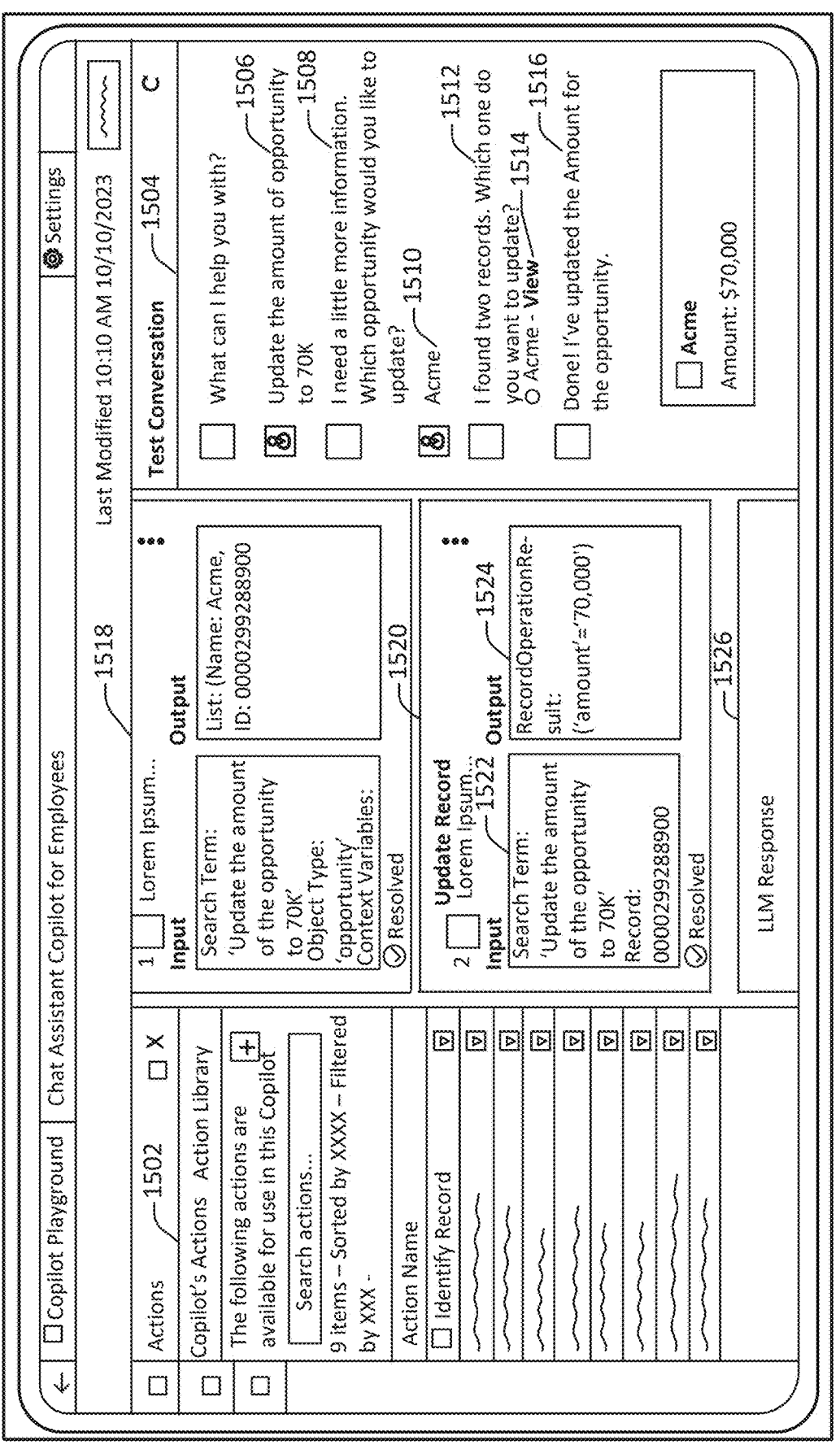
Figure 16:
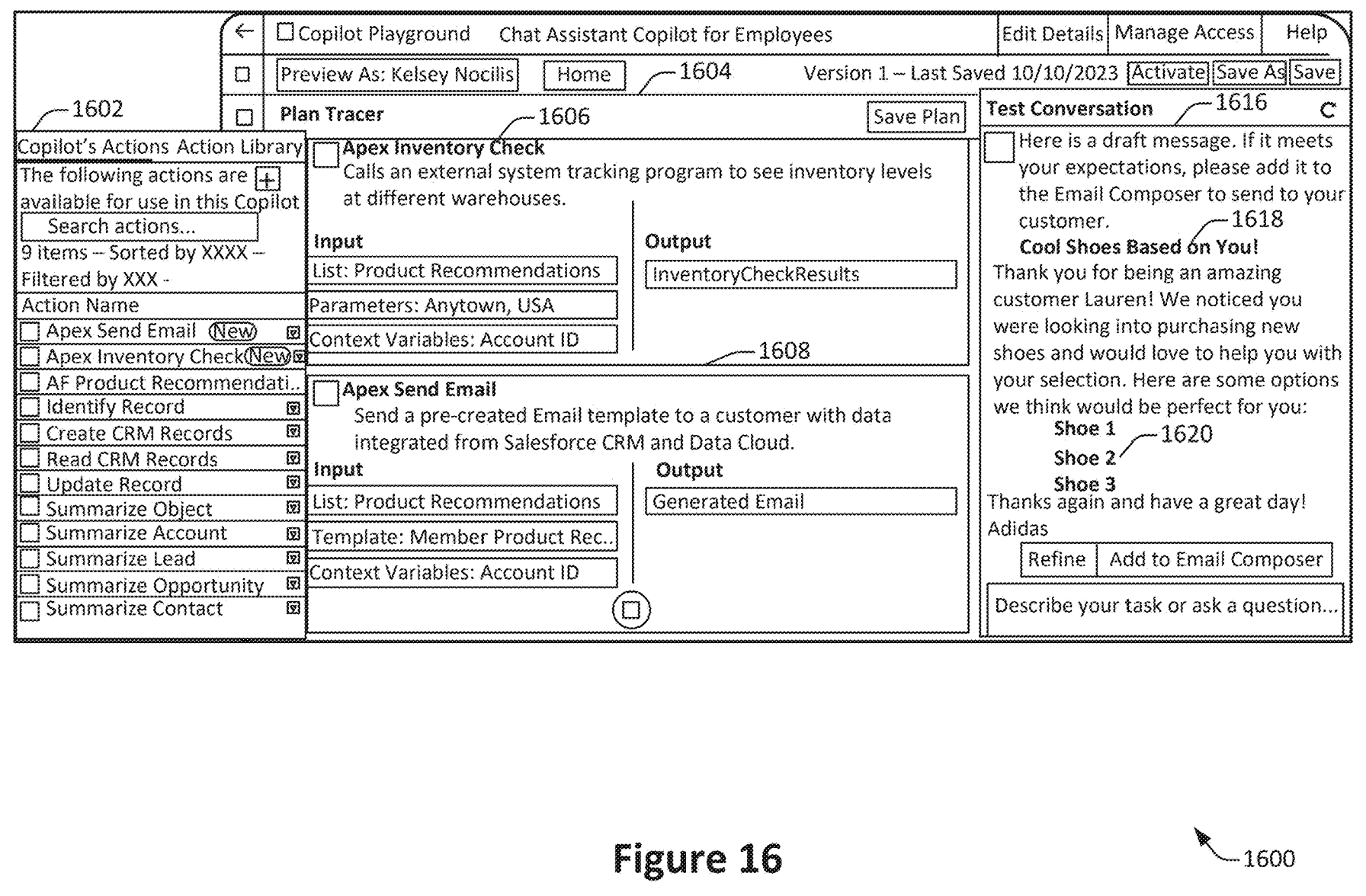

FIG. 12 illustrates a method 1200 for configuring a conversational chat assistant, performed in accordance with one or more embodiments. The method 1200 may be performed at the computing services environment computing services environment 150 shown in FIG. 2. For instance, the method 1200 may be performed at the conversational chat studio 112 in communication with a client machine. Examples of a user interface for testing a conversational chat assistant configured as discussed with respect to FIG. 12 are shown in FIG. 15 and FIG. 16.

A request to configure a conversational chat assistant is received at 1202. In some embodiments, the request may be received from a client machine in communication with the computing services environment 150. In some configurations, the conversational chat assistant may be configured for general use for different parties and contexts within the computing services environment. Alternatively, the conversational chat assistant may be configured for a particular customer organization, product offering, service offering, or other context.

Configuration information for the conversational chat assistant is identified at 1204. In some embodiments, the configuration information may be provided via the user interface. The configuration information may include information such as a name, description, context, and/or other metadata for the conversational chat assistant.

In some implementations, the configuration information may include one or more natural language instructions to be executed by a generative language model. For instance, the configuration information may include overarching natural language instructions governing the generation of novel text in conjunction with the conversational chat assistant. Such instructions may indicate to a generative language model that novel text is to be generated in a manner that is, for example, helpful, clear, professional, and respectful.

An action to configure is identified at 1206. In some embodiments, the action to configure may be identified based on selection by a user via a user interface. The user may identify an existing action to adapt for the conversational chat assistant and/or provide information for creating a new action.

One or more operations to perform for the action are identified at 1208. According to various embodiments, any of various types of operations may be performed when executing an action. For example, a prompt may be created from a prompt template and sent to a generative language model for completion. As another example, information may be retrieved from the database system or another data source. As yet another example, one or more records in a database system or other data source may be updated. As still another example, an API call may be sent via an internal or external API.

An input configuration for the action is determined at 1210, and an output configuration for the action is determined at 1212. In some embodiments, an input configuration and an output configuration may be specified in terms of one or more parameters provided to initiate the action and information returned by the completion of the action, respectively. Such information may be specified in accordance with a metadata-based type system. For instance, as shown in additional detail in FIG. 13 and FIG. 14, an input or output may be associated with an entry in a type registry that defines the input or output as a code object, a data object, a primitive, or another data type.

In some embodiments, the input or output configuration may be determined based on user input. Alternatively, or additionally, the input or output configuration information may be determined based on the one or more operations to perform at 1208. For example, particular types of actions may be linked with particular types of inputs or outputs. For instance, a call to a generative language model may take as input both a prompt template and a source for textual information used to determine a prompt from the prompt template.

A determination is made at 1214 as to whether to configure an additional action. In some embodiments, the determination may be made based on user input. For instance, the user may indicate that the user is finished configuring the conversational chat assistant, at which point the configuration information for the actions and the conversational chat assistant is stored in the database system at 1216.

Figure 24:
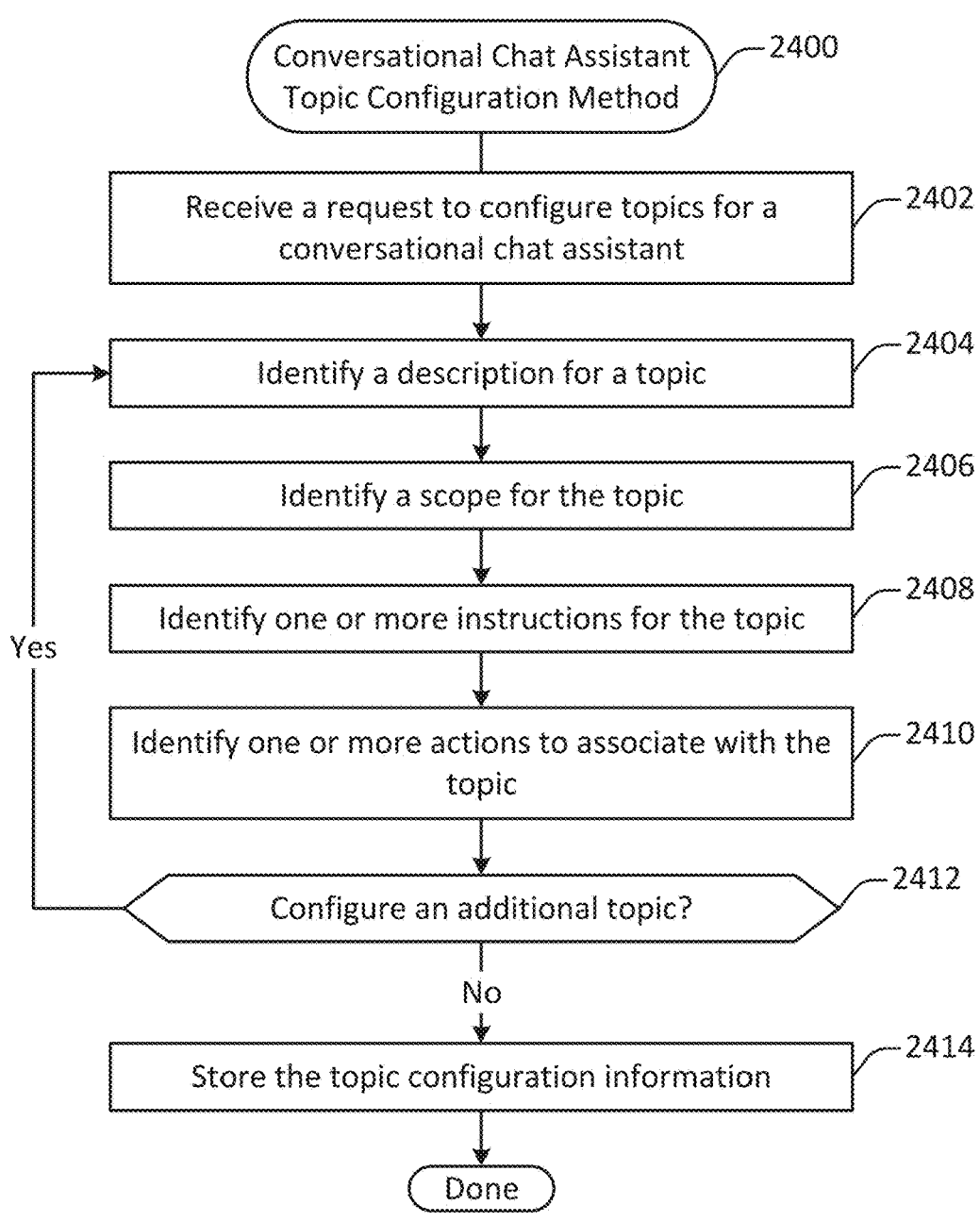
FIG. 24 illustrates a method for configuring a topic, performed in accordance with one or more embodiments.

FIG. 24 illustrates a method 2400 of configuring a topic, performed in accordance with one or more embodiments. In some embodiments, the method 2400 may be used to define a topic based on one or more metadata entries, in a manner similar to the configuration of actions discussed with respect to the method 1200 shown in FIG. 12.

A request to configure one or more topics for a conversational chat assistant is received at 2402. In some embodi-ments, the request may be received at a conversational chat studio such as the conversational chat studio 112 shown in FIG. 2.

A description of a topic is identified at 2404. In some embodiments, the description of the topic may include information such as a name, a context, and/or any other characterization information. Some or all of the description information may be provided to a generative language model as part of an intent evaluation prompt completed by the generative language model to select a topic.

A scope for the topic is identified at 2406. In some embodiments, the scope may identify one or more products, services, customer organizations, industries, and/or other contexts in which the topic may be selected.

One or more instructions for the topic are identified at 2408. In some embodiments, the one or more instructions may include natural language provided to a generative language model for selecting and/or executing actions after a topic has been selected. For instance, the one or more instructions may be provided to the generative language model along with a set of actions that are selectable by the generative language model to fulfill the user's intent as reflected in natural language user input.

One or more actions to associate with the topic are identified at 2410. In some embodiments, the actions may be configured as discussed with respect to the method 1200 shown in FIG. 12, with respect to the metadata diagram 1300 shown in FIG. 13, and throughout the application.

According to various embodiments, some or all of the information identified as discussed with respect to the operations 2404-2410 may be identified based on user input. For instance, user input may be provided in text-based format or another format via the conversational chat studio 112. Alternatively, or additionally, some or all of the information identified as discussed with respect to the operations 2404-2410 may be identified by a generative language model. For instance, a generative language model may determine such information in response to text input provided by a user.

A determination is made at 2412 as to whether to configure an additional topic. In some embodiments, the determination may be made based on user input. Upon determining not to configure an additional topic, the topic configuration information is stored in the database system at 2414.

Figure 13:
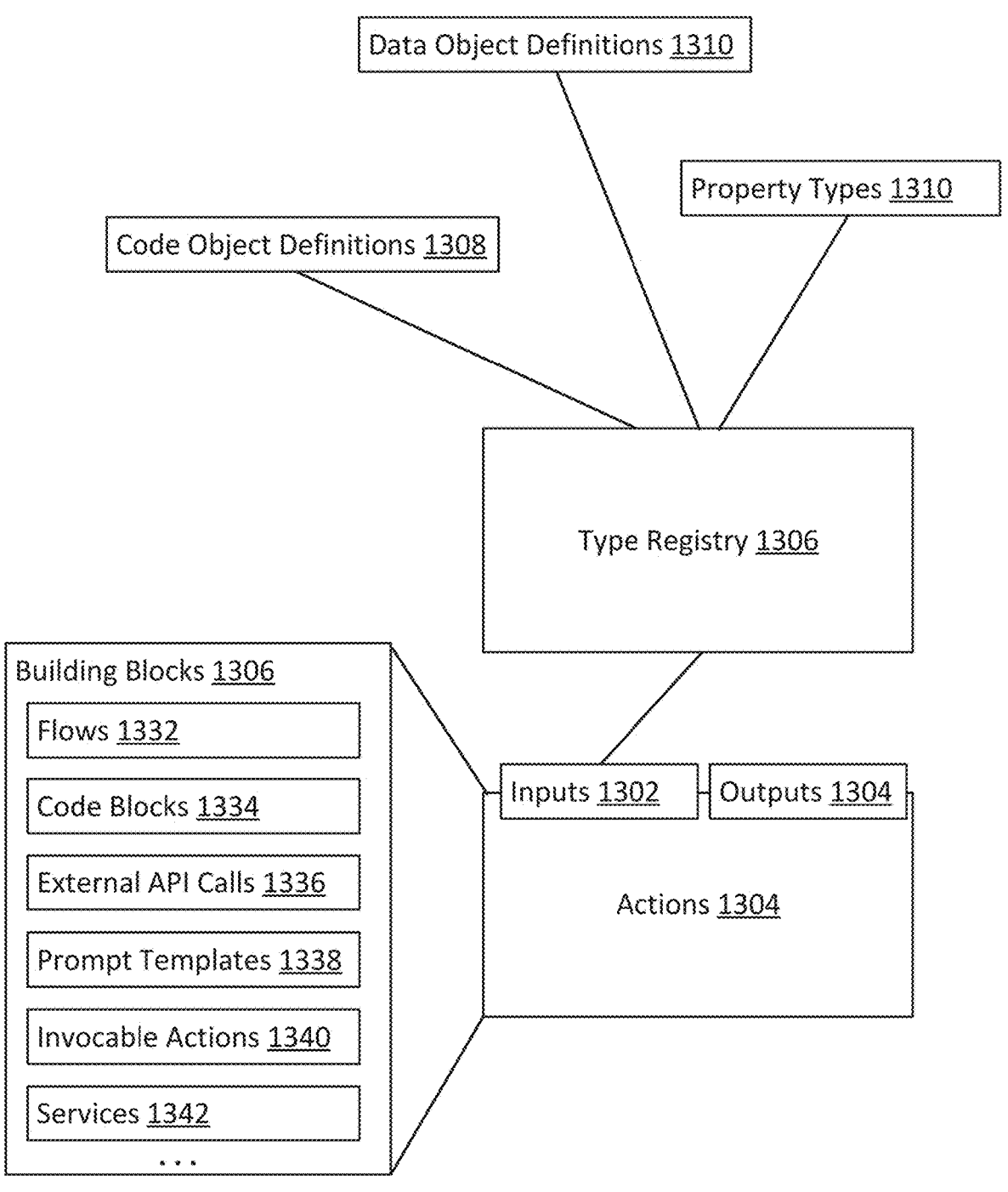
FIG. 13 illustrates a metadata diagram showing relationships between elements for configuring actions, provided in accordance with one or more embodiments.

FIG. 13 illustrates a metadata diagram 1300 showing relationships between elements for configuring actions, provided in accordance with one or more embodiments. The metadata diagram 1300 includes the actions 1304, the building blocks 1306, a type registry 1306, inputs 1302, outputs 1304, code object definitions 1308, data object definitions 1310, and property types 1310.

As shown in FIG. 7, an action may be composed of one or more building blocks. Additionally, an action may optionally include one or more inputs 1302 and outputs 1304. Inputs 1302 and outputs 1304 may be registered in the type registry 1306 to facilitate the integration of actions into the operation of the computing services environment 130.

In some embodiments, an input or output to an action may correspond to a code object definition 1308. A code object definition may be a variable, class, or other object defined in code executable via the computing services environment 130.

In some embodiments, an input or output to an action may correspond to a data object definition 1310. A data object definition may define a data object, such as a database object, accessible via the computing services environment 130.

In some embodiments, an input or output to an action may correspond to a property type 1310. A property type 1310 may be a primitive such as text or a number.

Figure 14:
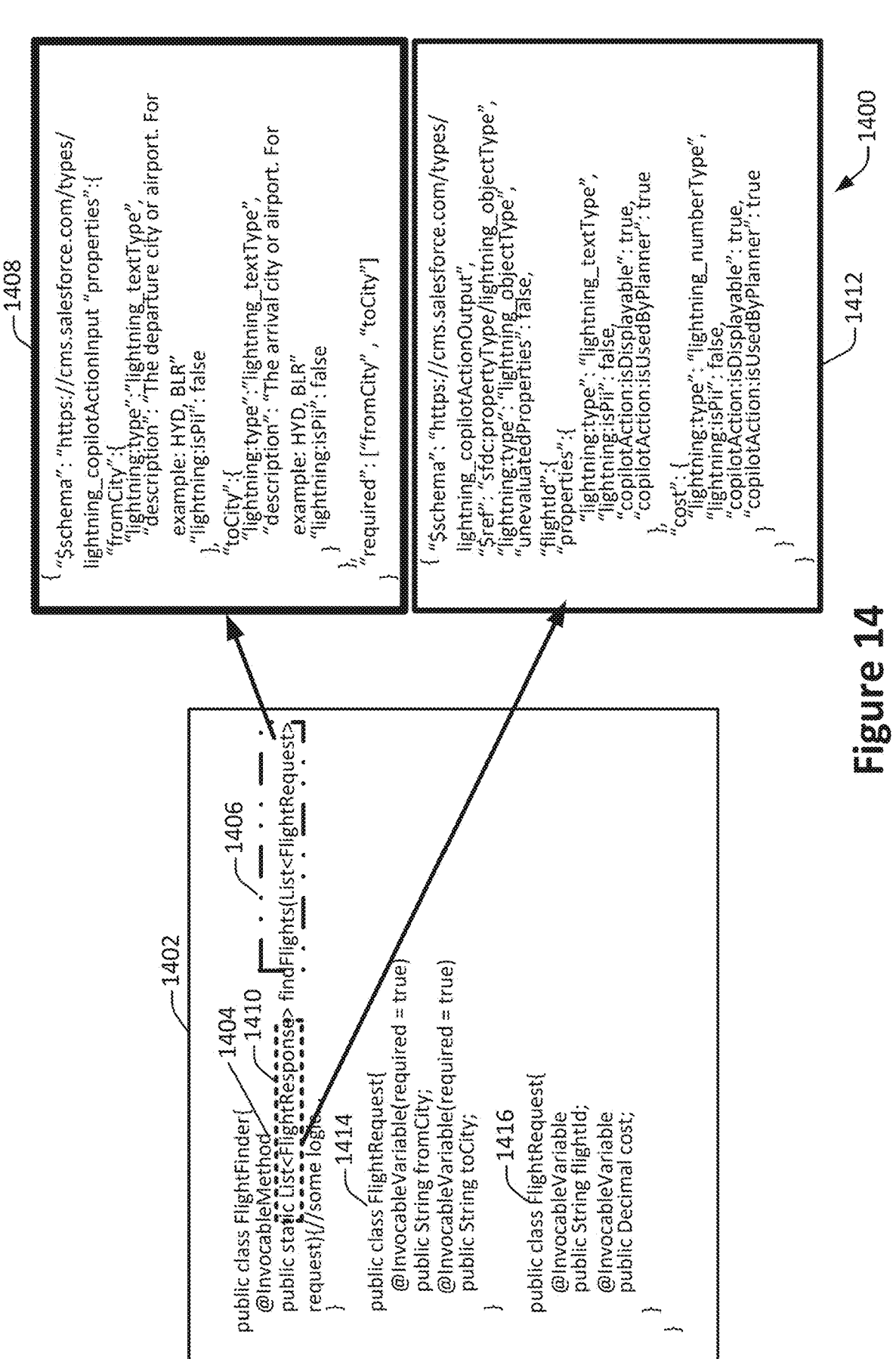
FIG. 14 illustrates an example of markup code corresponding to actions, configured in accordance with one or more embodiments.

FIG. 14 illustrates an example of markup code 1400 corresponding to actions, configured in accordance with one or more embodiments. Markup code such as the markup code 1400 may be used to define actions in terms of their relationships with other elements such as other actions, code blocks, data types, and the like.

For example, the class FlightFinder 1402 corresponds to an action for finding an airplane flight. The class Flight-Finder 1402 includes FlightRequest 1414 and FlightResponse 1416 data values. The FlightFinder class 1402 also includes an invocable method findFlights 1404 that receives as input a FlightRequest object parameter 1406, which is a List. The FlightRequest object parameter 1406 corresponds to a FlightRequest object definition 1408. The FlightRequest object definition 1408 is a schema that defines the types of information that may be included in a FlightRequest object. Such information must include a "fromCity" and a "toCity", which are not personally identifying information and which are both text data. The invocable method findFlights 1404 returns as output a FlightResponse list 1410 which corresponds to a FlightResponse object definition 1412. The FlightResponse object definition 1412 includes a flight identifier and a flight cost. The flight identifier is a text field, while the flight cost is a number. Both are also identified as not including personally identifiable information. Both are identified as being displayable and as being used by the planner, for instance to determine the next action to perform in an orchestration.

According to various embodiments, default actions may be provided in the system, specified as shown in FIG. 14. Additionally, a customer or partner organization may provide additional actions that may be integrated into flows performed based on interactions with a conversational chat interface.

FIG. 15 and FIG. 16 illustrate examples of user interfaces 1500 and 1600 for configuring and testing various elements of a conversational chat assistant, generated in accordance with one or more embodiments. For example, the user interfaces 1500 and 1600 may be generated in the course of providing access to the conversational chat studio 162 shown in FIG. 2. For instance, an administrator may use the user interfaces 1500 and 1600 to configure and test a conversational chat assistant by identifying the specific actions triggered based on test conversation provided via a test conversational chat interface.

At 1502, the user interface 1500 allows for the selection and creation of actions for a conversational chat assistant. The plan tracer 1504 illustrates the output of a test interaction with the conversational chat assistant. For instance, the conversational test interface 1504 includes a text element 1506 in which a user requested to "Update the amount of the opportunity to 70K". The conversational chat assistant asks the user to clarify the record to update at 1508 by generating novel text via a generative language model. When the user specifies "Acme", the conversational chat assistant notes that Acme corresponds to two different records and provides a selectable option at 1514. After the user specifies the record to update at 1514, the conversational chat assistant updates the record and provides a confirmation response at 1516.

The action implementation interface 1508 illustrates the actions performed by the conversational chat assistant in the course of the interaction. For instance, at 1520, the chat assistant executes an "Update Record" action that takes as input 1522 the text input provided by the user and returns output 1524 indicating the result of performing a database system update based on the input in which the amount of the opportunity record that is the focus of the conversation is updated to 70,000. At 1526, the next action generates the confirmation response based on an interaction with a large language model.

A similar flow is shown in the user interface 1600. A set of actions available for the conversational chat assistant is shown at 1602. A test conversation 1616 illustrates an interaction in which the conversational chat assistant has generated a draft email message 1618 based on natural language input received via the chat interface and information retrieved from the database system. The draft email message 1618 includes links 1620 to products based on one or more database records.

The plan tracer 1604 shows the actions performed as part of generating the interaction. As one example, the inventory check action 1604 may be used to call an external system to track the progress to view inventory levels at different warehouses. Each action may be associated with one or more inputs and one or more outputs. For example, the inventory check action 1604 is associated with inputs that include a list of product recommendations, one or more parameters, and one or more context variables. The parameters include a location name associated with the warehouses. The context variables include an account identifier that uniquely identifies the account for which inventory levels are sought. The outputs include a list of inventory check results. The different input and output values may be defined further based on markup, for instance markup that specifies additional characteristics of an input or output value.

As another example, the send email action 1606 may be used to send a pre-created email to a customer with data integrated from the customer relations management data stored in the database for the customer organization and/or data from one or more external sources. The send email action 1606 includes as an input a list of product recommendations, which may be determined based on an internal workflow. The send email action 1606 also includes a template identifying one or more member product recommendations which may be used to retrieve one or more product recommendations dynamically determined based on user input. The context variables include an account identifier that uniquely identifies the account for which the email is being created. The outputs include an email generated by executing the action.

Recommended Action Configuration and Selection

FIG. 17 illustrates a method 1700 for configuring a next action for a conversational chat assistant, performed in accordance with one or more embodiments. The method 1700 may be performed at the computing services environment 150 shown in FIG. 2. For instance, the method 1700 may be performed at a conversational chat studio 112 in communication with a client machine.

According to various embodiments, the method 1700 may be used to configure an action for recommendation in a conversational chat interface. For instance, as shown in FIG. 19, the completion of an action to summarize a record at 1906 triggers the automatic recommendation of an action to summarize a contact associated with the record at 1904 and an action to draft an email at 2012. As another example, in a different context, the presentation of a top opportunity at 1404 in FIG. 20 leads to the recommendation at 2006 of an action to edit the record that was presented.

In some embodiments, the method 1700 may be used to adapt a conversational chat assistant for use in different contexts, such as by different users or organizations. For instance, one user or organization may prefer to receive a recommendation to email a contact when a record summary is generated, while another user or organization may prefer to receive a recommendation to edit the record when a record summary is generated.

A request to configure a next action for a communication channel is received at 1702. In some embodiments, the request may be received from a client machine. For instance, an administrator associated with a client organization may configure a conversational chat assistant to automatically present a next action within a conversational chat interface when a triggering condition is met.

An action to configure is identified at 1704. In some embodiments, the action may be selected from within the user interface. For instance, the action may be selected from within a studio for configuring a conversational assistant.

One or more channels in which to present the action are identified at 1706. In some embodiments, a subset of available channels in which to present the action may be identified. Alternatively, the action may be presented on all channels through which interactions with the conversational chat assistant are conducted.

A condition for triggering presentation of the action is identified at 1708. According to various embodiments, any of a variety of triggering conditions may be specified. For example, one action may be triggered when another action is performed. As one example, when an action updating a database object is performed, the conversational chat assistant may automatically provide a recommendation to generate a summary of the database object. As another example, an action may be triggered when a value associated with a database object reaches a designated threshold. For instance, in an interaction with a conversational chat assistant that focuses on an opportunity object, an action to generate an email to a contact for the opportunity may be recommended if the value of the opportunity exceeds a designated amount.

A determination is made at 1710 as to whether to configure an additional action. In some embodiments, the determination may be made based on user input. Upon determining not to configure an additional action, the configuration information is stored in the database system at 1712. The configuration information may be used to trigger recommendation of the configured actions or actions, as discussed in the method 1800 shown in FIG. 18.

In some embodiments, one or more of the operations shown in FIG. 17 may be performed automatically or dynamically by the system itself. For instance, the system may observe that for a particular organization or user, or across the system, a particular action is often selected when a particular condition is met. The system may then infer that the action should be recommended as a next action when the condition is met.

Figure 18:
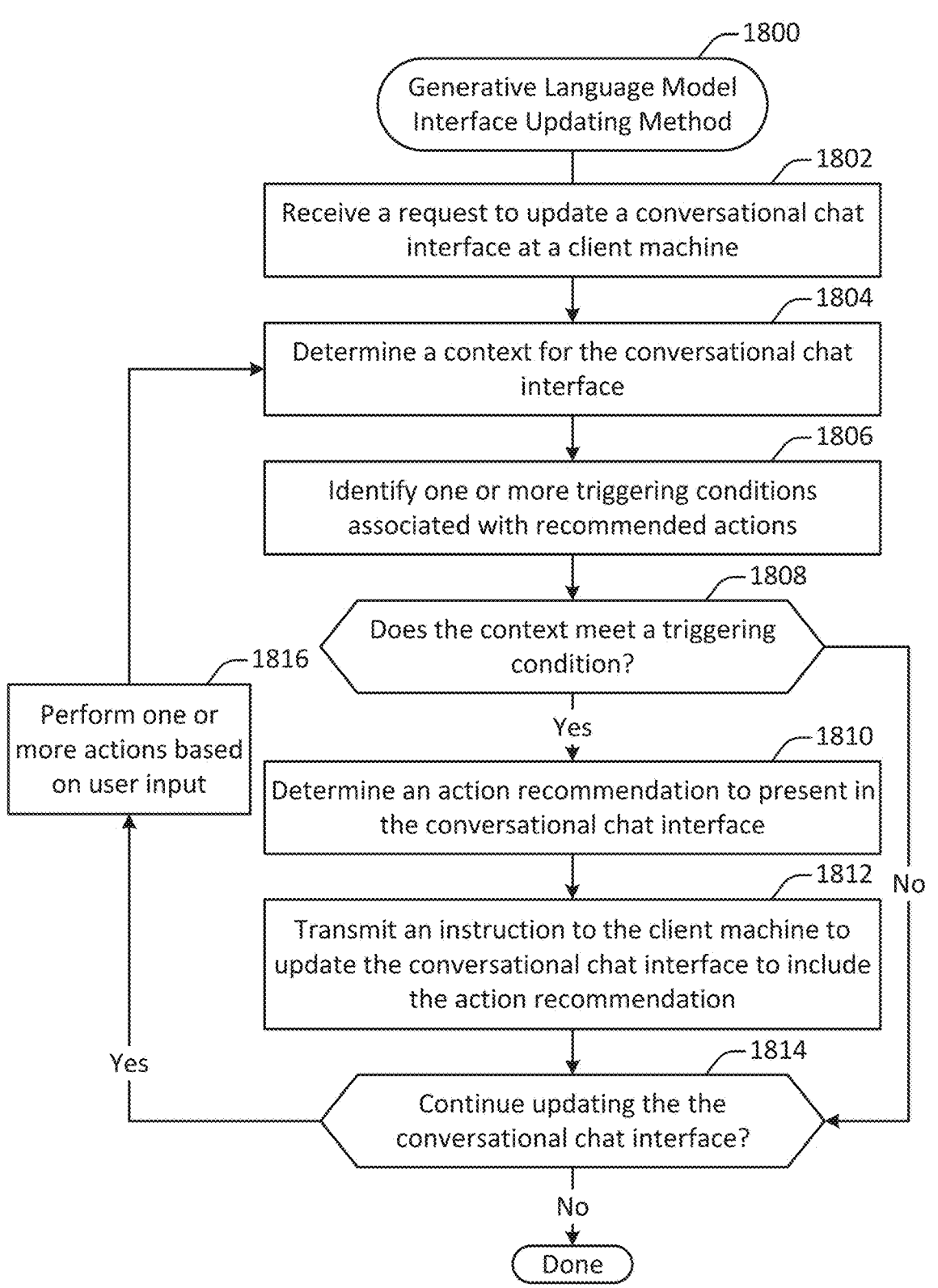
FIG. 18 illustrates a method for updating a conversational chat interface, performed in accordance with one or more embodiments.
Figure 21:
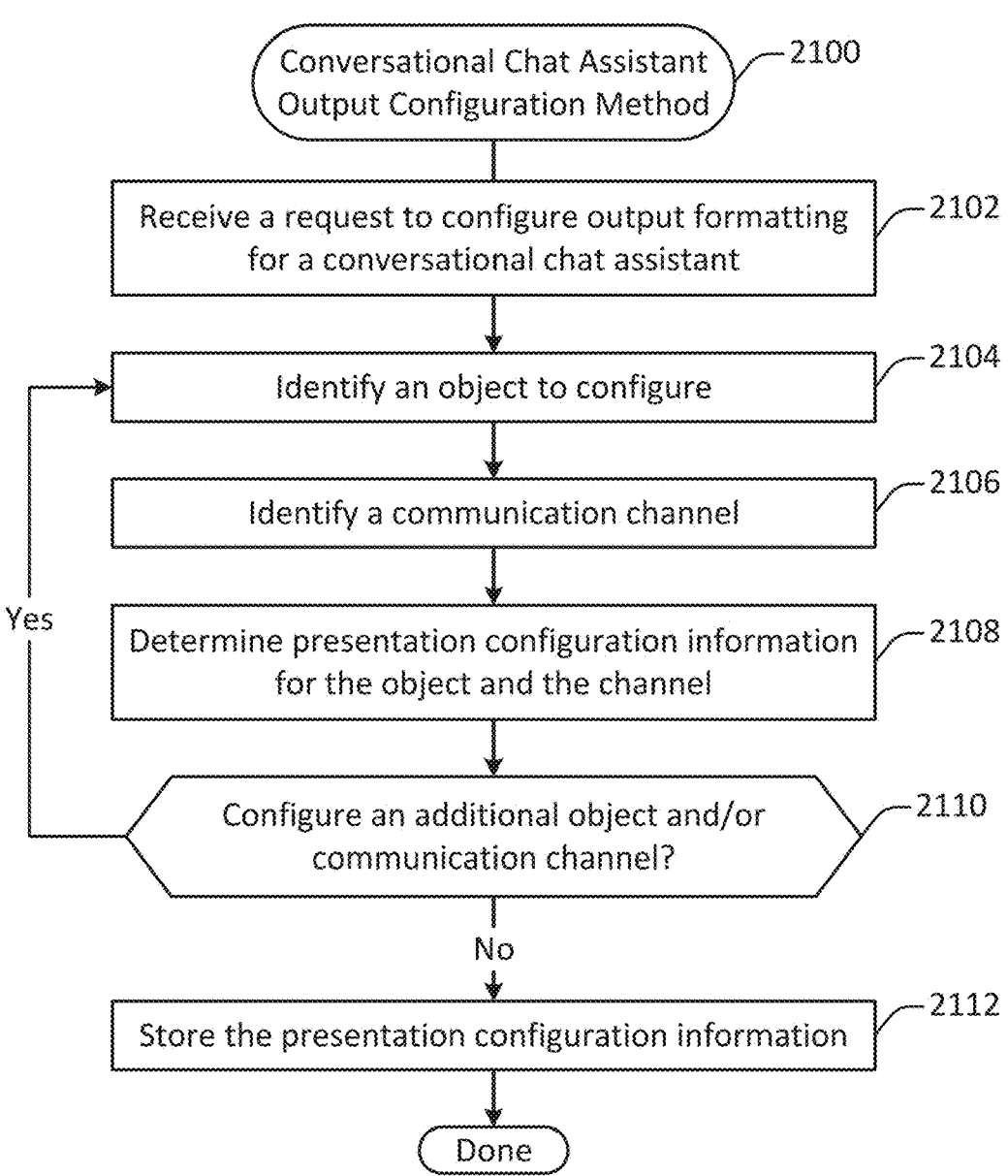
FIG. 21 illustrates a method for configuring output for a conversational chat assistant, performed in accordance with one or more embodiments.
Figure 22:
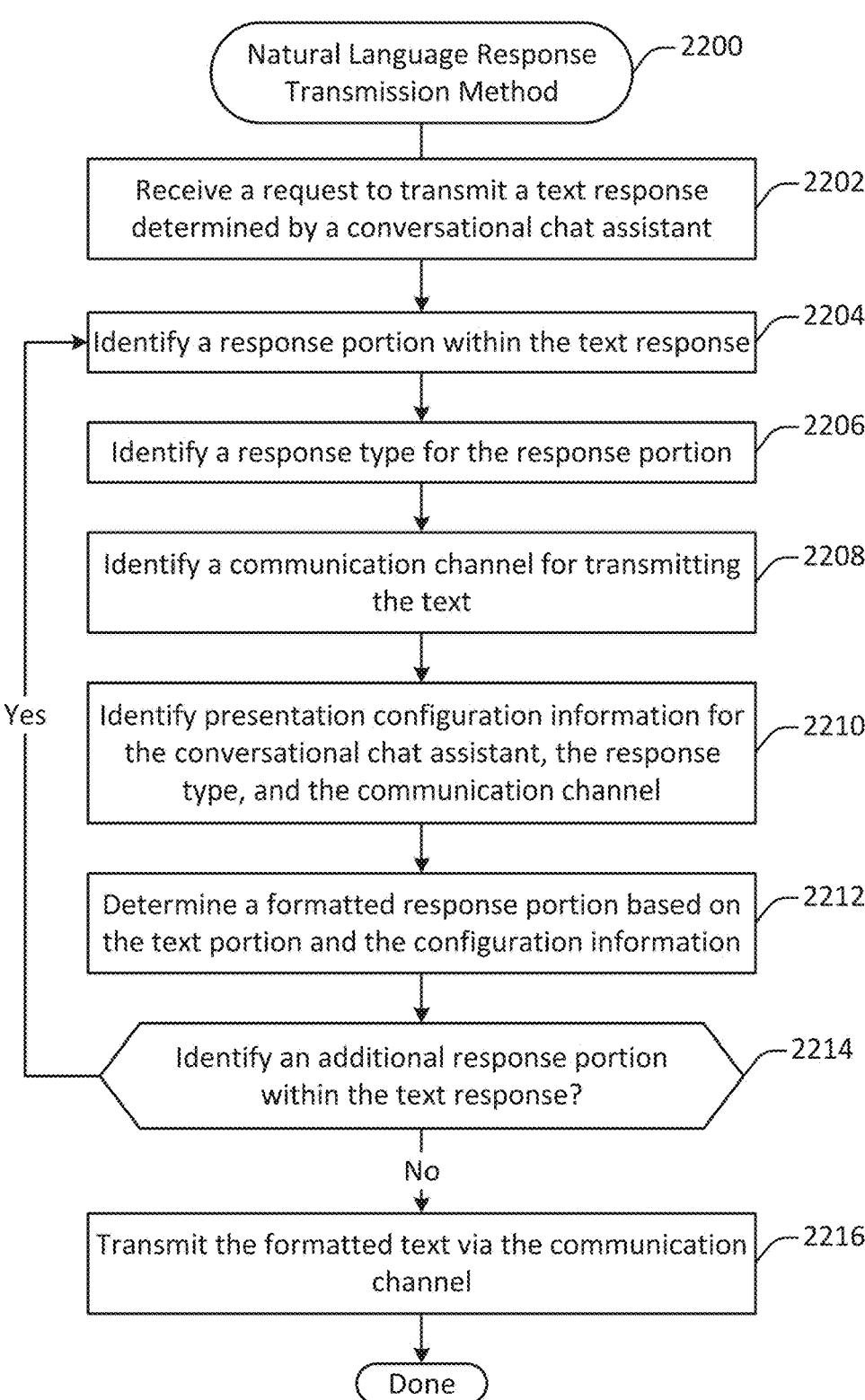
FIG. 22 illustrates a method for outputting a natural language response generated by a conversational chat assistant, performed in accordance with one or more embodiments.
Figures 23A, 23B:
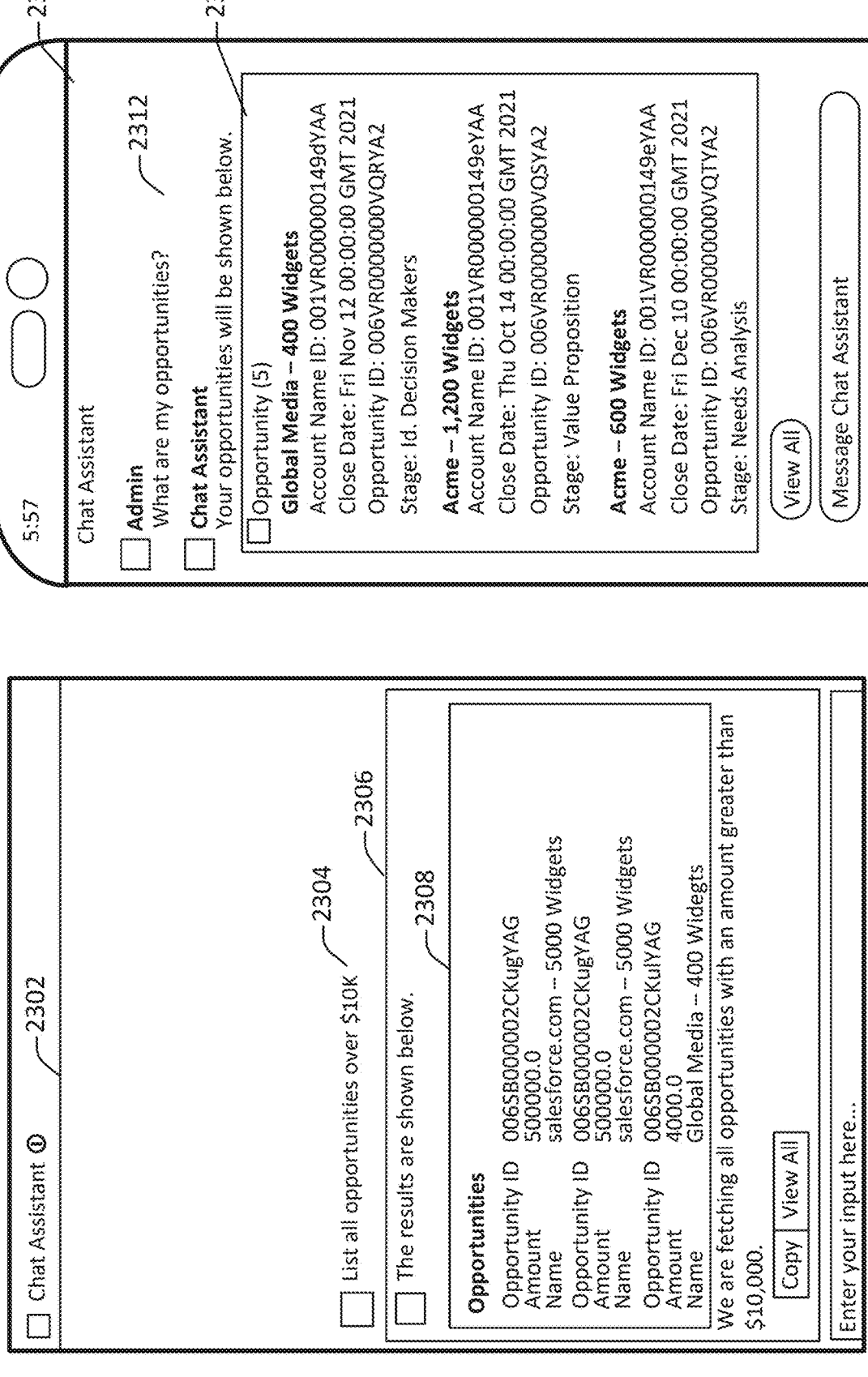
FIGS. 23A and 23B illustrate configurable user interfaces, provided in accordance with one or more embodiments.

FIG. 18 illustrates a method 1800 for updating a conversational chat interface, performed in accordance with one or more embodiments. The method 1800 may be used to provide a recommended next action. For instance, the recommended next action may be determined based at least in part on the configuration information determined as discussed with respect to the method 1700 shown in FIG. 18.

A request to update a conversational chat interface is received at 1802. According to various embodiments, the conversational chat interface may be provided in the course of conducting an interaction between a conversational chat assistant operating within the computing services environment 150 and a user of a client machine authenticated to a user account at the computing services environment 150.

In some embodiments, the request may be received at 1802 when, for instance, the conversational chat assistant has determined or is determining a response to provide to the user via the conversational chat interface. For instance, the request may be received when the system is reporting the result of performing an action, providing text generated based on an interaction with a generative language model, or sending some other output to the client machine for presentation in the conversational chat interface.

In some embodiments, the request may be received when a user interface is generated. For instance, a user interface may be generated in a web application, a native application, a mobile application, a web browser plugin, or another type of user interface.

In some embodiments, the request may be received in the course of providing a response to a user. For example, as shown in FIG. 20, a natural language user request at 1402 to identify a top opportunity may be addressed with a response at 2004 identifying an opportunity satisfying the request. As another example, as shown in FIG. 19, a use request to summarize a contact at 1902 may yield a response at 1906 summarizing the record.

A context for the conversational chat interface is determined at 1804. According to various embodiments, the context may include any information that may be used to determine whether a triggering condition is met. For example, the context may include the text of any messages sent by a user to the conversational chat assistant or sent from the conversational chat assistant to the user. As another example, the context may include an indication of one or more actions that were performed in the course of the interaction.

According to various embodiments, the context for the conversational chat interface may include one or more of a variety of factors. For example, the context may include a customer organization for which the conversational chat interface is generated. As another example, the context may include a communication channel (e.g., a web application, a native application, a Slack channel, etc.) for which the conversational chat interface is generated. As still another example, the context may include data related to the generation of the conversational chat interface. For instance, the context may identify a database record such as a contact or account for a customer organization.

In some embodiments, the context may be determined based on the nature of the request received at 1802. For instance, the request may be generated when a user loads a customer relations management web application to access a contact record for a customer organization. The context may then be identified as the combination of the customer organization, the web application, and the contact record.

One or more triggering conditions associated with recommended actions are identified at 1806. In some embodiments, the one or more triggering conditions may include any conditions associated with an action recommendation as discussed with respect to the operation 1708 shown in FIG. 17. Such information may be retrieved from the database system.

In some embodiments, a default action may be presented. The default action may be determined by the customer organization or by the computing services environment provider. For example, a web application for presenting a contact record may be associated with a default action to summarize the contact record.

In some embodiments, a deterministic action may be presented. The deterministic action may be determined based on one or more operations performed in the context of the conversational chat interface. For instance, performing an action such as summarizing a record may lead to the presentation of an action for drafting an email that includes the summary.

In some embodiments, a non-deterministic action may be presented. The non-deterministic action may be determined based on a response provided by an artificial intelligence model such as a generative language model. For instance, a generative language model may be provided with a prompt that includes information such as the context determined 504, natural language input provided by the user, one or more prior actions performed by the user, and/or the identity of the user. As one example, the system may learn that one user typically requests to draft an email after summarizing a contact record, while another user typically asks to view opportunities related to the contact record. As another example, the system may learn that users would typically like to view opportunities related to the record when opportunities exist having a value above a designated threshold, while users would typically like to draft an email when no such opportunities exist.

A determination is made at 1808 as to whether the context determined at 1804 meets a triggering condition identified at 1806. Upon determining that the context meets a triggering condition, an action recommendation to present in the conversational chat interface is determined at 1810. In some embodiments, determining the action may involve identifying which action is associated with the triggering condition, such as the associated action identified at operation 1704 shown in FIG. 17.

An instruction to update the conversational chat interface to include the action recommendation is transmitted to the client machine at 1812. In some embodiments, the instruction may identify the action to present in the conversational chat interface. For instance, the action may be presented as a button, a drop-down menu, or another user interface affordance. The nature of the instruction may depend in significant part on the conversation channel in which the conversational chat interface is being presented.

A determination is made at 1814 as to whether to continue updating the conversational chat interface. In some embodiments, the determination may involve detecting one or more events generated by the client machine. Various types of user input may be received. For example, user input may include natural language text entered in the conversational chat interface. As another example, user input may include the detection of a button click corresponding with an action.

Upon determining to continue updating the conversational chat interface, one or more actions are performed at 1816 based on user input. In some embodiments, the conversational chat interface may continue to be updated so long as additional user input is received. Additional details regarding the types of user input that may be received and the types of actions that may be performed are discussed throughout the application.

In some embodiments, the method 1800 may be used to perform metadata-driven contextual interactions. For example, a user may first select an action to generate a summary of a record, and may then provide input to generate an email based on the summary. The system may generate novel text for both the summary and the email, and may dynamically determine new actions to present in the user interface for future interactions. In this example, the system is determining two different types of outputs: (1) novel text to include in the conversational chat interface, summary, and email, and (2) dynamically determined action buttons for performing new actions via the conversational chat interface. These different types of outputs are dynamically determined based on four different types of inputs: (1) the natural language input provided by the user, (2) the context in which the user input is provided (e.g., a web application), (3) the data the user is interacting with, and (4) metadata associated with the context (e.g., configuration parameters specific to the customer organization). Thus, the system can generate text and action recommendations that are highly customized to the user's context. For instance, when the user issues a natural language instruction to "Add some of our products to it", the system can determine that "it" refers to the email that the system previously drafted, execute a workflow to determine product recommendations based on the content of the email, the user, the customer organization, and the records being accessed, and then call a generative language model to generate an updated email based on the retrieved product recommendations.

FIG. 19 illustrates a conversational chat interface 1900 provided in the context of a communication session with a conversational chat assistant, generated in accordance with one or more embodiments. The conversational chat interface 1900 may be provided in the context of an application used to access database objects stored in a database system accessible via the computing services environment 150. For instance, the conversational chat interface 1900 may be provided in the context of a web application provided via an application server.

User input is shown at 1902. The user input provided at 1902 is not natural language input, but rather indicates the selection of a recommended action 1904 provided via the conversational chat interface.

The user input 1902 triggers the generation of a response at 1906, which includes a record summary at 1908. In some implementations, the record summary may be determined based on an interaction with a generative language model in a context-dependent manner. For instance, the conversational chat interface 1900 may be accessed in the context of a contact record corresponding with Prithvi Padmanabhan.

In some embodiments, to summarize the record, a record summarization input prompt may be sent to a generative language model. The record summarization input prompt may include information selected from the record. The generative language model may then generate the record summary presented at 1908 and formatted in a manner specific to the communication channel.

In some embodiments, a record summary may include one or more links, such as the link 1910. A link included in the output may link to, for instance, another record within a database system accessible via the computing services environment 150.

FIG. 20 illustrates a conversational chat interface 2000 provided in the context of a communication session with a conversational chat assistant, generated in accordance with one or more embodiments. The conversational chat interface 2000 illustrates a conversational interaction between a user and the conversational chat assistant.

At 2002, the user provides natural language input including a request to identify the top opportunity. This natural language input causes the conversational chat assistant to first identify the user's intent, then to retrieve the appropriate information for the corresponding opportunity from the database system, and finally to format the information for presentation at 2004.

Included with the initial output is a button 2006 for triggering an action to edit the record. As discussed herein, such an action may be identified as a recommended next step depending on the context. For example, when a record is presented, a recommended next action may be to edit the presented record.

At 2008, the user provides natural language input stating "Can you tell me more about it?" This natural language input causes the conversational chat assistant to first identify the user's intent. From the context of the chat history, the conversational chat interface infers that "it" refers to the record that was recently returned. Further, a generative language model determines that the request indicates a desire to summarize the record, and indicates that a record summarization action should be performed. Next, the conversational chat assistant triggers the record summarization action to generate the summary at 2008, which is formatted for presentation in the conversational chat interface 2000 in accordance with one or more configuration parameters.

Conversational Chat Assistant Interaction

According to various embodiments, an interaction between a user and a conversational chat assistant may develop in any of various ways. Such complexity may facilitate a more organic, intuitive, natural experience for users, as opposed to an experience that feels to the user as if they are interacting with a computer.

Figure 25:
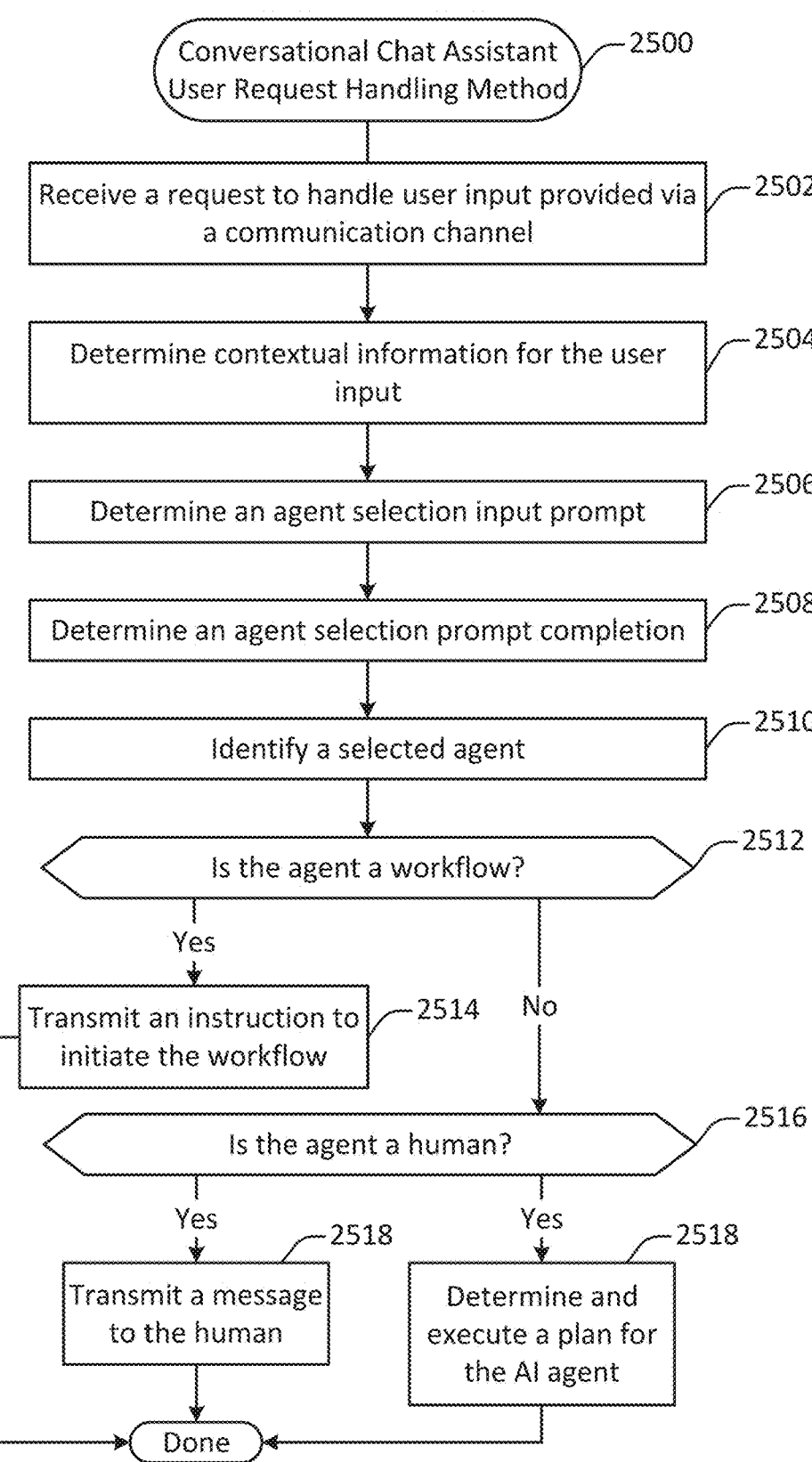
FIG. 25 illustrates a method of handling a user request, performed in accordance with one or more embodiments.

FIG. 25 illustrates a method 2500 of handling a user request, performed in accordance with one or more embodiments. The method 2500 may be performed by a computing services environment such as the computing services environment 150 shown in FIG. 1.

According to various embodiments, the method 2500 provides a more detailed and comprehensive view of the types of operations that may be performed as discussed with respect to the operation 504 shown in FIG. 5. That is, user input may be processed to support operations such as dynamic planner and/or agent selection, entity and/or entity type disambiguation based on additional user input, information enrichment, and plan generation and clarification based on user input.

A request to handle user input provided via a communication channel is received at 2502. According to various embodiments, the user input may be received as discussed with respect to the operation 502 shown in FIG. 5. That is, the input may include natural language text, a selection of an action to perform based on a button provided in a chat interface, a request sent by an application or workflow, and/or any other suitable type of user input.

In some embodiments, the communication channel may be provided in the context of a conversational chat interface. The conversational chat interface may be exposed to a user at a client machine via any of a variety of communication channels. Such channels may include, but are not limited to, web applications, mobile applications, and messaging services (e.g., email, SMS, Slack, WhatsApp, etc.).

Contextual information for the user input is determined at 2504. According to various embodiments, the contextual information may include, for instance, a conversational chat session, an application accessible via the computing services environment, one or more database objects, and/or any other type of information. The context may therefore reflect past interactions between a user and the conversational chat assistant, information related to data stored in the computing services environment, the identity of a tenant associated the conversational chat assistant, and/or any other suitable information. In some configurations, the context may be determined substantially as discussed with respect to operation 604.

An agent selection input prompt is determined at 2504. In some embodiments, the agent selection prompt may include natural language instructions executed by a generative language model to select an agent for carrying out the user's intent reflected in the user input. Additional details regarding the types of agents and planner services that may be selected via an agent selection input prompt are discussed with respect to FIG. 26.

According to various embodiments, to aid the generative language model in making this determination, the agent selection input prompt may include additional elements of information. For example, the agent selection input prompt may include the user input identified in the request received at operation 2502, the contextual information determined at 2504, and/or other supporting information.

In some embodiments, the agent selection input prompt may include metadata characterizing possible selections. For example, the agent selection input prompt may include metadata describing different agents, which may include information such as descriptions of the situations and/or types of user input a particular agent is or is not well suited to handle. As another example, an agent that includes an AI model may potentially be implemented via one or more planner services. Accordingly, information such as descriptions of the situations, types of user input, and/or agent suitable for use with particular planner services may be included in the agent selection input prompt.

An agent selection prompt completion is determined at 2508. In some embodiments, the agent selection prompt completion may be determined by sending the agent selection input prompt to a generative language model and receiving the agent selection prompt completion in a response message. The agent selection prompt completion may be the agent selection input prompt with the addition of novel text generated by a generative language model executing the natural language instructions included in the agent selection input prompt.

In some embodiments, agent metadata may include a description of a reasoning engine. The description may then be provided to a generative language model. The generative language model may then select an agent based on the agent metadata, the user input, the topic, and/or other information.

In some embodiments, a topic, application, tenant, and/or other contextual element for a communication session may be associated with metadata used to guide the selection of an agent. For example, a tenant may indicate that any requests associated with a particular topic or topics is to be analyzed with a particular reasoning engine.

A selected agent is identified at 2510. In some embodiments, the selected agent may be identified by parsing the agent selection prompt completion to determine an identifier selected by the generative language model that uniquely identifies the agent. In the event that the agent is an AI agent, a selected planner for the AI agent may be identified in addition to the AI agent itself.

A determination is made at 2512 as to whether the agent is a workflow. In some embodiments, the determination may be made by evaluating metadata for the agent selected at 2510.

Upon determining that the selected agent is a workflow, an instruction to initiate the workflow is transmitted at 2514. In some embodiments, transmitting the instruction may involve activating an interface within the computing services environment 150 associated with the workflow. For instance, a message may be sent to an application server or other computing component configured to perform the workflow. A response message to the user may be determined by a generative language model or by the workflow itself based on the execution of the workflow.

Upon determining instead that the selected agent is not a workflow, a determination is made at 2516 as to whether the agent is a human. In some embodiments, the determination may be made in a manner similar to that discussed with respect to operation 2510.

Upon determining that the agent is a human, a message is transmitted to the human.

The message may be sent through a web application, a messaging interface, an email interface, or any other suitable communication mechanism. The human may determine a response message to the user, or a response message may be determined by a generative language model.

Figure 27:
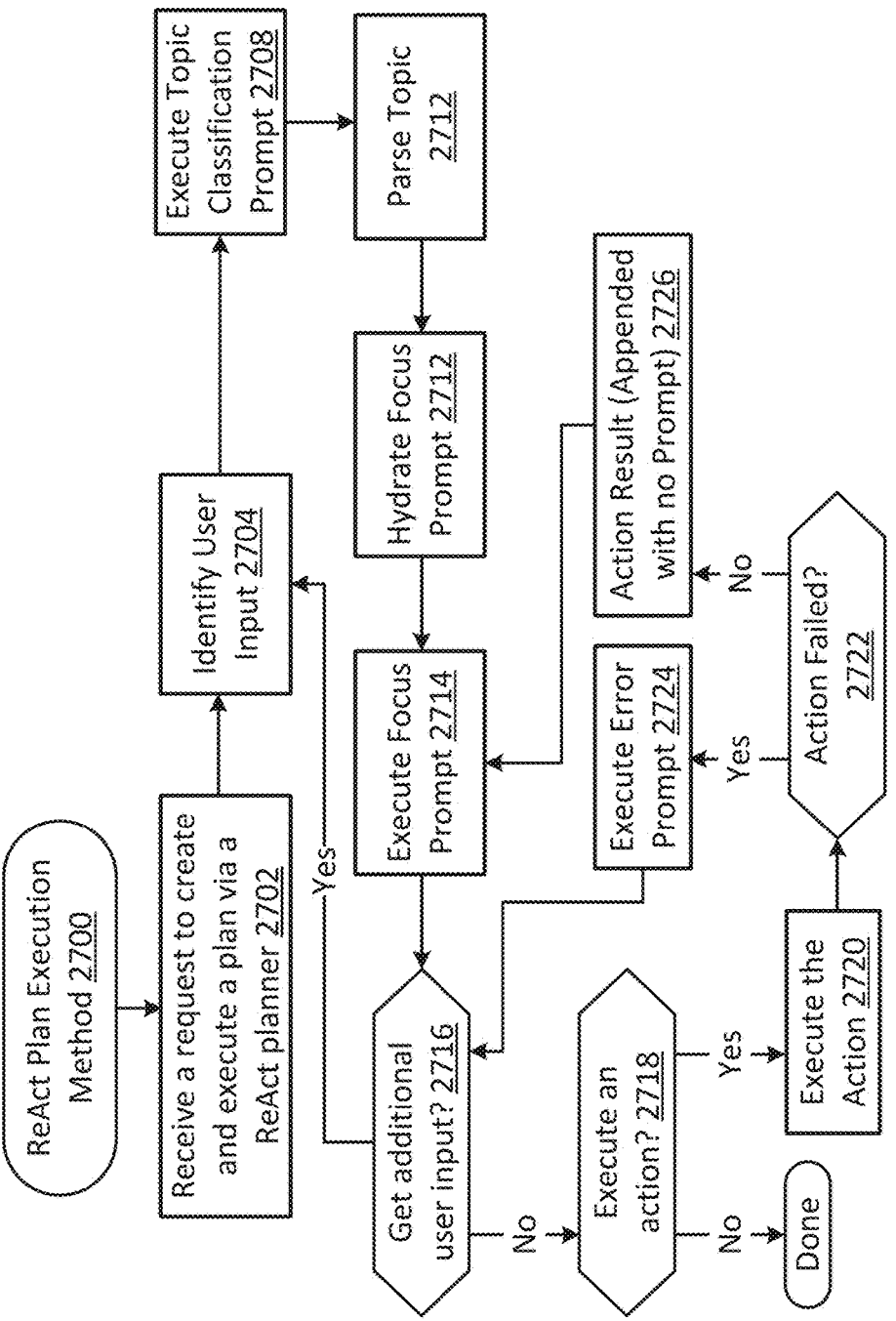
FIG. 27 illustrates a method for executing a plan via a ReAct planner, performed in accordance with one or more embodiments.
Figure 28:
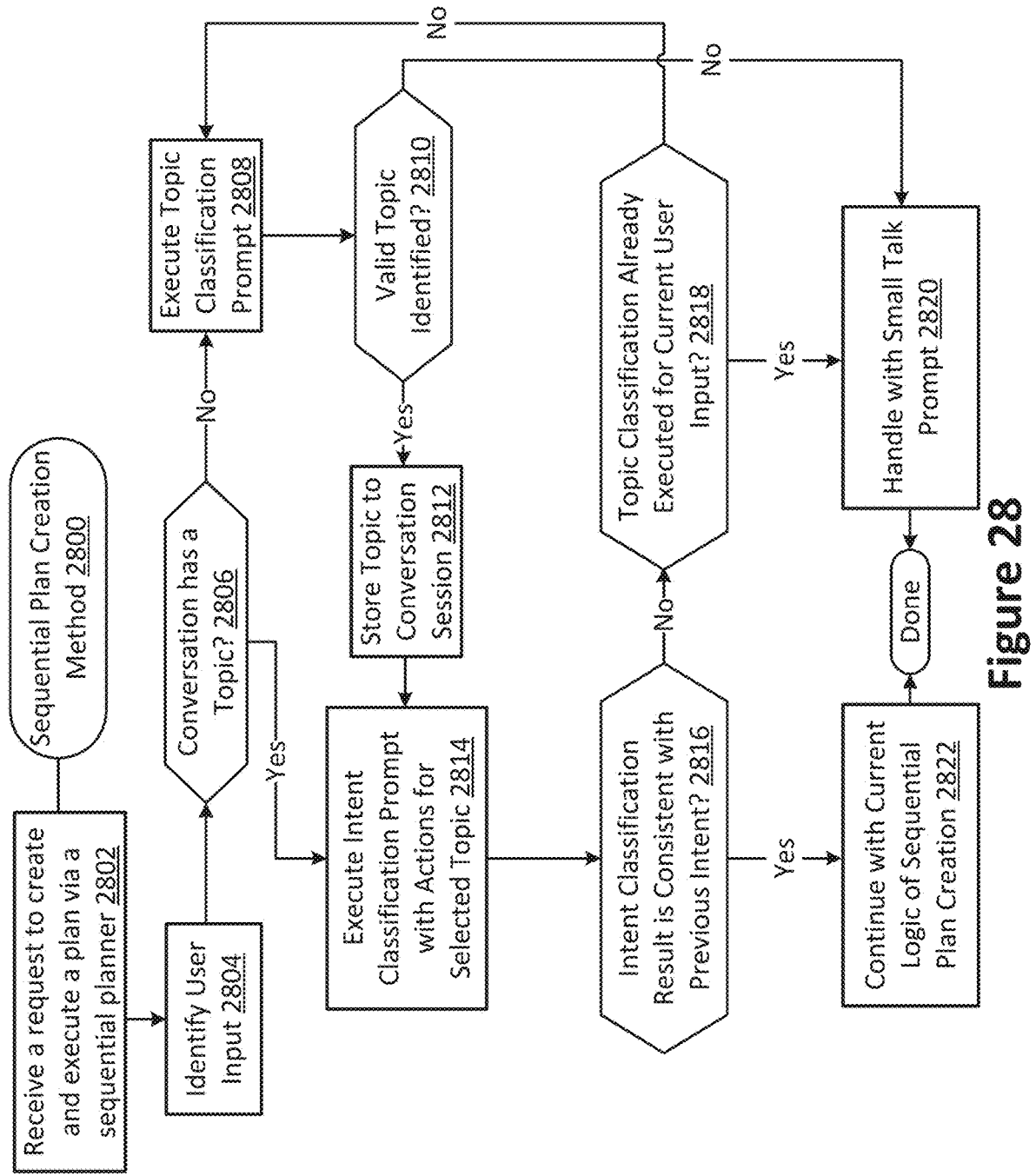
FIG. 28 illustrates a method for creating and executing a plan via a sequential planner, performed in accordance with one or more embodiments.

Upon determining instead that the agent is not a human, a plan for the AI agent is determined and executed at 2518. In some embodiments, the plan may be executed in accordance with the metadata for the AI agent and the selected planner for the AI agent. Examples of such metadata are discussed with respect to FIG. 26. Examples of specific types of workflows that may be performed for particular types of planners are discussed with respect to the methods 2700 and 2800 shown in FIG. 27 and FIG. 28. A more general process for plan determination and execution, which may overlap with the operations performed in FIG. 27 and FIG. 28, is discussed with respect to the method 2900 shown in FIG. 29.

Figure 26:
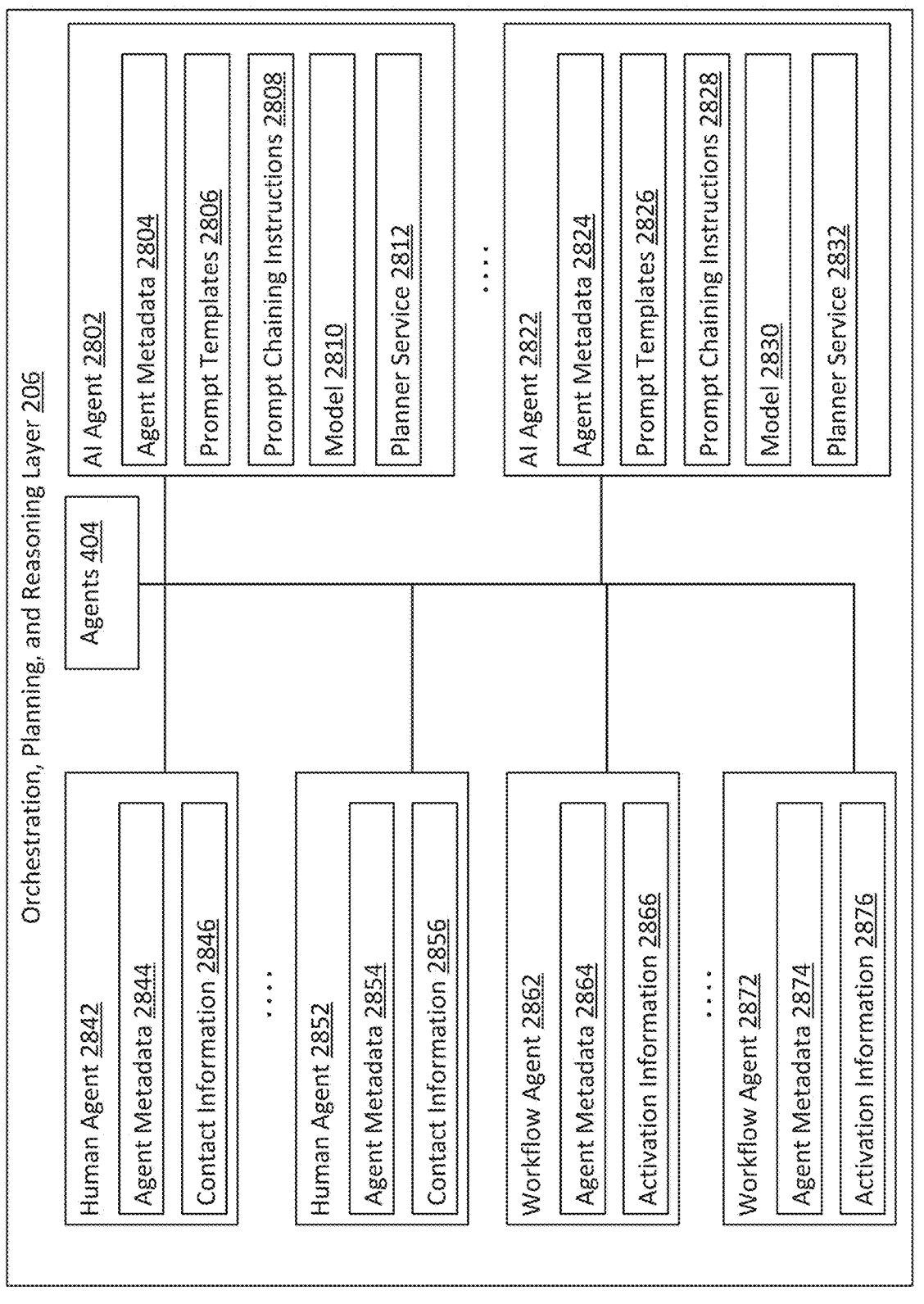
FIG. 26 illustrates a more detailed view of a portion of the orchestration, planning, and reasoning layer, configured in accordance with one or more embodiments.

FIG. 26 illustrates a more detailed view of a portion of the orchestration, planning, and reasoning layer 206, configured in accordance with one or more embodiments. In FIG. 26, the planner service has access to various reasoning agents 404, including the agents 2802 through 2822, 2842 through 2852, and 2862 through 2872.

According to various embodiments, an agent includes metadata such as the agent metadata 2804, 2824, 2844, 2854, 2864, and 2874. The agent metadata includes information characterizing the agent. For instance, the agent metadata may include a textual description describing situations in which the agent may or may not be useful. The agent metadata may also include an identifier that uniquely identifies the agent. In this way, a generative language model may review the metadata in light of the context and user input included in a conversation session and generate text that includes the unique identifier of the agent that the generative language model has selected to fulfill the user's intent.

In some embodiments, a human agent may be associated with contact information such as the contact information 2846 and 2856. The contact information may provide a mechanism for transmitting a message to the human agent letting the human agent know that the human agent has been selected for responding to the user input. For example, the contact information may include one or more computing services environment accounts, email addresses, messaging system accounts, communication channel addresses, or the like.

In some embodiments, a workflow agent may be a workflow executed within the computing services environment or activated from the computing services environment to fulfill the user's intent. A workflow agent may be associated with activation information such as the activation information 2866 through 2876.

According to various embodiments, the activation information may provide a mechanism for activating the workflow. For example, the activation information may include an interface to invoke, a network destination for sending a message, one or more invocation parameters, or the like. Such information may be used by the orchestration, planning, and reasoning layer 206 to invoke the workflow.

According to various embodiments, an AI agent represents a collection of resources for executing a logical plan of steps for accomplishing a goal. For example, an AI agent may include agent metadata, one or more prompt templates 2806 through 2826, one or more prompt chaining instructions 2808 through 2828, a model 2810 through 2830, and an indication of a planner service 2812 through 2832.

According to various embodiments, the model may include one or more of any suitable generative model, predictive model, classification model, or other type of AI model. The model may be executed within the computing services environment or may be located outside the computing services environment. For instance, the model may a version of ChatGPT provided by OpenAI, GoogleBard provided by Google, or any other type of network-accessible AI model.

According to various embodiments, a planner service represents an approach to generating a prompt when determining and executing a logical plan of steps for accomplishing a goal. Various planner services may be used.

In some embodiments, a planner service may represent a Chain-of-Thought (CoT) approach, which is also referred to as a sequential planner. Chain-of-Thought mimics human-style decision making by instructing an LLM to break down a complex problem in a sequence of steps. Chain-of-Thought reasoning can accomplish various commonsense reasoning tasks that a human can solve with language. Chain-of-Thought reasoning instructs the LLM to identify the sequence of steps in a manner that is explainable to a human, allowing the chain of reasoning to be corrected if an incorrect chain of reasoning is recommended.

In some embodiments, a planner service may represent a Tree of Thoughts (TOT) approach. A Tree-of-Thought can generate multiple "thoughts" at an intermediate step. Instead of picking just one reasoning path, it can explore and evaluate the current status of the environment with each step to actively look ahead or backtrack to make more deliberate decisions. Such an approach may be particularly attractive for complex tasks such as more complex math and creative writing exercises. Tree-of-Thought reasoning mimics a human decision-making paradigm that explores multiple options, weighs pros and cons, and then picks the best one.

In some embodiments, a planner service may represent a Reasoning and Acting (ReAct) approach. ReAct allows for accessing real-world information for reasoning in addition to data that the LLM has been trained on or that is included in the prompt. ReAct-based reasoning can provide a human-like task solving ability that involves interactive decision-making and verbal reasoning, potentially leading to better error handling and lower hallucination rates. It synergizes reasoning and action through user action, which increases interpretability and trustworthiness of responses. This strategy is also referred to as a "stepwise planner" because it approaches problem-solving in a step-by-step manner and can also seek user feedback at potentially every step.

In some embodiments, a planner service may represent a Reasoning via Planning (RAP) approach. This strategy uses LLMs as both the reasoning engine and world model to predict the state of the environment and simulate the long-term impact of actions. It integrates multiple concepts, such as exploration of alternative reasoning paths, anticipating future states and rewards, and iteratively refining existing reasoning steps to achieve better reasoning performance. RAP may be particularly applicable for tasks that involve planning, math reasoning, and logical inference.

According to various embodiments, the prompt templates 2806 and 2826 may include fillable prompts with natural language instructions that are specific to the particular AI agent. The prompt chaining instructions 2808 and 2828 may be used to facilitate the determination of a logical flow that includes one or more interactions with an LLM to develop a plan. Some examples of prompt chaining instructions are shown in FIG. 27 and FIG. 28.

FIG. 27 illustrates a method 2700 for executing a plan via a ReAct planner, performed in accordance with one or more embodiments. According to various embodiments, the method 2700 may be executed at the computing services environment 150 shown in FIG. 1.

In some embodiments, the method 2700 includes various operations that overlap with operations shown in other methods described herein. However, the operations shown in FIG. 27 are emphasized so as to highlight how the logic flow of a ReAct planner may, in some configurations, differ from the logic flow for other types of planners and agents. Thus, the method 2700 represents a particular configuration of operations, prompt chaining instructions, and like. However, in practice the generation of a response to user input may include additional, fewer, or different operations, and/or operations may be performed in an order different from that shown.

A request to create and execute a plan via a sequential planner is received at 2702. In some embodiments, the request may be generated as discussed with respect to the operations shown in the method 2700.

User input is identified at 2704. In some embodiments, the user input may be identified as discussed with respect to the operation 2502 shown in FIG. 25. A topic classification prompt is determined and executed at 2708. The completed topic classification prompt is parsed to determine a topic at 2712. Determining and parsing a prompt to identify one or more topics for processing user input is discussed throughout the application, for instance with respect to operations 606 through 610.

The topic is used to hydrate a focus prompt at 2714. The focus prompt is executed at 2716 to determine a focus prompt completion that includes novel text identifying an initial action to complete. A determination is then made at 2716 as to whether to solicit additional user input. Upon determining to solicit additional user input, such user input is solicited at 2702.

Upon determining instead not to solicit additional user input, a determination is made at 2718 as to whether to execute an action. In some embodiments, actions may continue to be executed as long as the plan remains uncompleted.

Upon determining to execute an action, the action is executed at 2720. According to various embodiments, any of a variety of actions may be performed, as discussed in detail throughout the application. Such actions may include determining and sending one or more prompts to a generative language model for completion, performing one or more operations within a database system, executing a workflow within the computing services environment, communicating with one or more external computing devices, querying one or more data sources, or any other type of action executable within the computing services environment.

A determination is made at 2722 as to whether a failure has occurred. In some embodiments, the system may identify the presence of a failure if an action does not complete, completes with an error condition, fails to produce useful information, or the like.

Upon determining that a failure has occurred, an error prompt is determined and executed at 2724 to evaluate the error. In some embodiments, the error prompt may be used to prompt the generative language model to evaluate the error to determine corrective action. The corrective action may involve soliciting additional user input, determining a different action (e.g., a different database query or search query), or another course of action.

Upon determining instead that the action has succeeded, the action result is appended to the focus prompt at 2726. In some embodiments, the focus prompt may include a chain of thoughts and actions generated by the large language model and performed by the computing services environment. Such an approach may provide for more complex reasoning, in which previously generated thoughts and previously executed actions guide the generation of subsequent thoughts and the selection of subsequent actions. For example, the generative language model may be provided with a record of the conversation between the user and the conversational chat assistant, a set of actions that may be performed, and a chain of thoughts and actions determined by previous interactions with the generative language model. In this way, the generative language model may execute the user's intent by successively determining thoughts and corresponding actions, with subsequent thoughts and actions being dependent on previous thoughts and actions.

FIG. 28 illustrates a method 2800 for creating and executing a plan via a sequential planner, performed in accordance with one or more embodiments. According to various embodiments, the method 2800 may be executed at the computing services environment 150 shown in FIG. 1.

In some embodiments, the method 2800 includes various operations that overlap with operations shown in other methods described herein. However, the operations shown in FIG. 28 are emphasized so as to highlight how the logic flow of a sequential planner may, in some configurations, differ from the logic flow for other types of planners and agents. Thus, the method 2800 represents a particular configuration of operations, prompt chaining instructions, and like. However, in practice the generation of a response to user input may include additional, fewer, or different operations, and/or operations may be performed in an order different from that shown.

A request to create and execute a plan via a sequential planner is received at 2802. In some embodiments, the request may be generated as discussed with respect to the operations shown in the method 2700.

User input is identified at 2804. In some embodiments, the user input may be identified as discussed with respect to the operation 2502 shown in FIG. 25.

A determination is made at 2806 as to whether the communication session has a topic. In some embodiments, a communication may be assigned a topic when it is created based on initial user input. Upon determining that communication session lacks a topic, for instance if the user input is not the first in a communication session, then at 2808 a topic classification prompt is determined and executed to determine a topic. The topic may be determined as discussed with respect to the operation 2710 shown in FIG. 27.

According to various embodiments, upon parsing the topic classification prompt to determine a topic, the topic is evaluated at 2810 to determine whether the topic corresponds to a valid topic identified in the system. Upon determining that a valid topic has not been identified, a natural language response is determined via a small talk prompt at 2820. Upon determining instead that a valid topic has been determined, the topic is stored to the conversation session at 2812. In this way, the topic may be made available for access in processing subsequently received user input in the same communication session.

According to various embodiments, upon determining that a communication session is associated with a valid topic, an intent classification prompt with actions for the selected topic is executed at 2814. The intent classification prompt may include a list of actions that may be selected to determine a plan. The list of actions may be determined based on the topic identified at 2808.

In some embodiments, metadata for such actions, such as descriptions of the actions and unique identifiers for the actions, may be incorporated into an intent classification prompt. The generative language model may then select from among the actions to determine a plan that includes one or more of the actions.

In some embodiments, the intent classification prompt may involve any of several operations. For example, the intent classification prompt may determine a topic based on the user's intent. As another example, the intent classification prompt may identify one or more operations to perform to execute the user's intent.

Upon executing the intent classification prompt, a determination is made at 2816 as to whether the intent classification result is different from the existing topic. In some embodiments, if the intent classification result is not different, then the system continues with the current logic of sequential plan creation at 2822. For instance, the system may identify a sequence of actions to include in a plan to realize an intent reflected in the natural language user input.

If instead a new intent is determined, then a determination is made at 2818 as to whether topic classification was already performed for the current utterance. If topic classification has not yet been executed for the user input, then the user input is evaluated at 2806 to determine a topic.

Upon determining instead that topic classification has already been executed for the current user input, then the user input is treated as off topic and handled with a small talk prompt at 2820. According to various embodiments, the small talk prompt may be used to interact with a user in a way that does not require a complex plan. For example, a user may be provided with textual information about the conversational chat assistant, may be assisted with textual responses to simple queries, or may receive other types of interactions from the conversational chat assistant.

Figure 29:
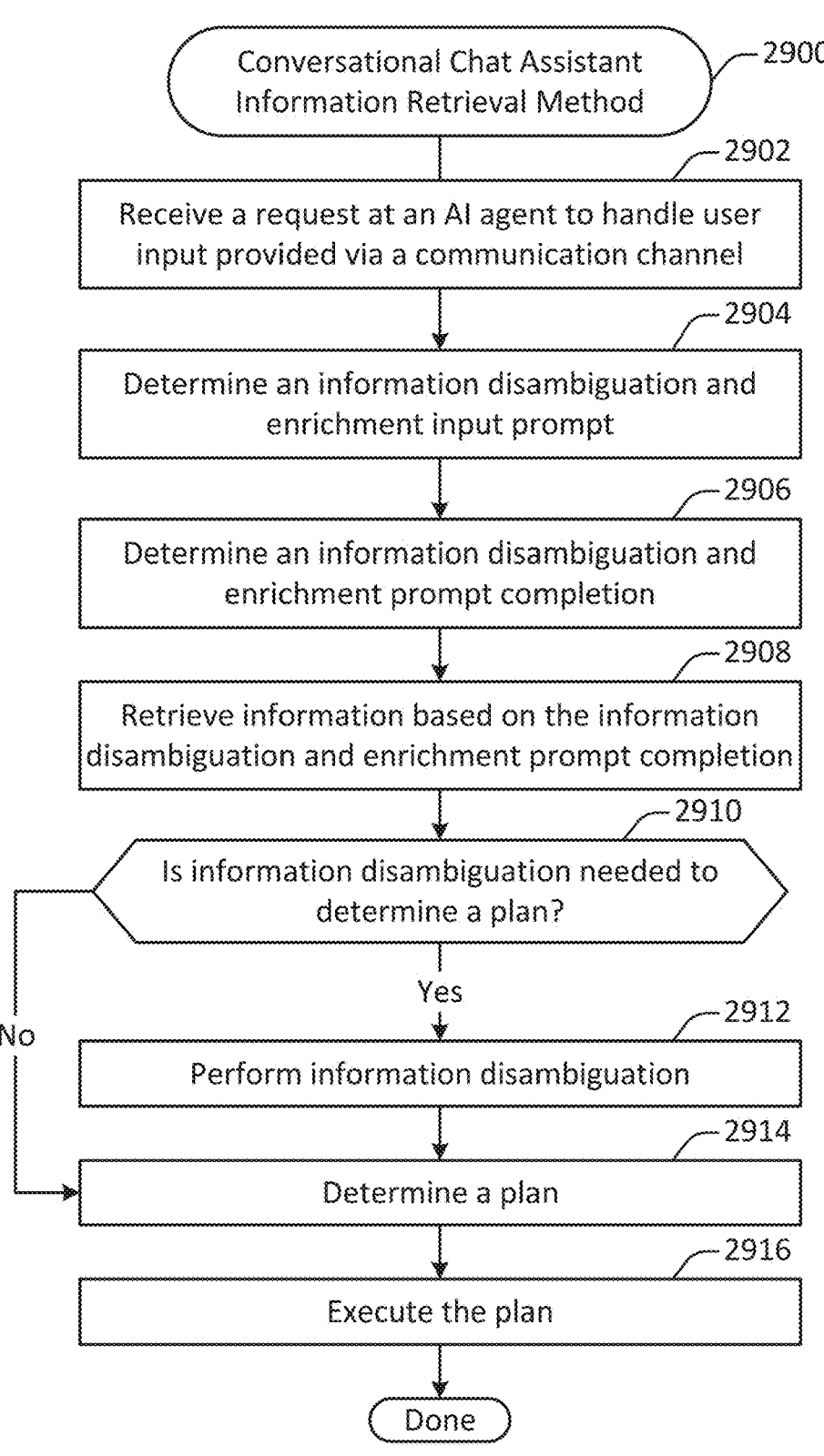
FIG. 29 illustrates a method of retrieving information at a conversational chat assistant, performed in accordance with one or more embodiments.

FIG. 29 illustrates a method 2900 of retrieving information at a conversational chat assistant, performed in accordance with one or more embodiments. In some embodiments, the method 2900 may be performed at the computing services environment 150 shown in FIG. 1.

A request is received to handle, at an AI agent, user input provided via a communication channel. In some embodiments, the request may be generated as discussed with respect to the operation 2518 shown in FIG. 25. The operations shown in FIG. 29 provide an example of the types of operations that may performed within a specific AI agent. For example, the operations shown in FIG. 29 may be performed in the context of the agent workflows shown in FIG. 27 and FIG. 28.

An information disambiguation and enrichment input prompt is determined at 2904. In some embodiments, the information disambiguation and enrichment input prompt may include the user input received at 2902. The information disambiguation and enrichment input prompt may also include one or more natural language instructions to a generative language model to perform data enrichment and/or entity disambiguation. A non-exhaustive list of examples of such instructions are provided in the following paragraphs.

In some embodiments, the generative language model may be instructed to generate a query to identify one or more database types for database records mentioned in the user input. For example, the user input may include statements such as "Draft an email to the main contact for Acme". In this example, the natural language instructions may instruct the generative language model to identify "Acme" in this text as a reference to an object stored in the database. However, the type of database object of which Acme is a member may be unclear. For instance, Acme may be an Opportunity object or an Account object. Thus, the natural language instructions may instruct the generative language model to construct a database query to search for various types of objects named "Acme."

In some embodiments, the generative language model may be instructed to generate a query to identify one or more database records for database records mentioned in the user input. For example, the user input may include statements such as "What is the Acme opportunity worth?" In this example, the natural language instructions may instruct the generative language model to identify "Acme" in this text as a reference to an Opportunity object stored in the database. The natural language instructions may instruct the generative language model to construct a database query to search for an Opportunity object named Acme and return its value.

some embodiments, the generative language model may be instructed to generate a query to determine a query for retrieving data from one or more external sources. For example, the user input may include statements such as "Draft an email to the Acme contact that mentions the rising costs to companies of environmental changes such as global warming. Include statistics." In this example, the natural language instructions may instruct the generative language model to identify statistics related to the rising costs to companies of environmental changes such as global warming as information that would need to be retrieved in order to draft the email. The natural language instructions may instruct the generative language model to determine one or more search queries to identify such information.

In some embodiments, the information disambiguation and enrichment input prompt may include natural language instructions executed by the generative language model to determine whether entity and/or record disambiguation is needed. For example, the information disambiguation and enrichment input prompt may include natural language instructions to indicate whether the determination of a plan depends on identifying an entity and/or a database record that is not clear from and/or included in the plan identification input prompt. As another example, the information disambiguation and enrichment input prompt may include natural language instructions to generate text for transmission to a client machine to elicit clarification regarding the identity of one or more entities and/or database records.

In some embodiments, the information disambiguation and enrichment input prompt may include natural language instructions executed by the generative language model to determine whether updated data is needed. For example, the information disambiguation and enrichment input prompt may include natural language instructions to indicate whether the determination of a plan depends on data that is not clear from and/or included in the information disambiguation and enrichment input prompt. As another example, the information disambiguation and enrichment input prompt may include natural language instructions to generate a search query, text to provide to a user, and/or other output for identifying the data that is needed.

According to various embodiments, a search query generated by the generative language model may be formulated for execution against an Internet search engine, a database, or another source of information. For instance, the search query may be executed against any data source accessible via the flow and vector search interface 334 shown in FIG. 3.

In some embodiments, a query determined as discussed with respect to operation 2906 may include one or more parameters limiting the query to a particular context. For example, a query may be limited to a tenant associated with a user account that provided the user input. As another example, a query may be limited to returning data objects to which the user account has permission to access. Any suitable limitations and preferences may be reflected in the query.

In some embodiments, the information disambiguation and enrichment input prompt determined at 2904 may be incorporated into a prompt for determining a topic or a plan. For instance, the information disambiguation and enrichment input prompt may be incorporated into a prompt determined and completed as discussed with respect to the operation 606 shown in FIG. 6. Alternatively, the information disambiguation and enrichment input prompt may be determined and completed separately. Regardless, the operations shown in FIG. 29 may be performed in conjunction with the operations shown in FIG. 6. Such operations may be performed in sequence, in parallel, or in concert, and in any suitable order.

An information disambiguation and enrichment prompt completion is determined at 2906. According to various embodiments, the determination of the information disambiguation prompt input prompt and the information disambiguation and enrichment prompt completion may be performed by combining the context with the user input and a template to create the input prompt, which may then be provided to a generative language model for completion.

Information is retrieved at 2908 based on the information disambiguation prompt completion. In some embodiments, the information may be retrieved by executing one or more queries determined by the generative language model in response to the information disambiguation input prompt. For example, as discussed with respect to operation 2904, the information disambiguation input prompt may include natural language instructions to determine queries to retrieve information from inside and/or outside of the database system. Such queries may then be extracted from the information disambiguation and enrichment prompt completion and used to retrieve the information at 2908.

In some embodiments, retrieving information may involve executing a database query. For instance, a query may be used to identify and retrieve information from one or more database records referenced in the user input. Alternatively, or additionally, retrieving information may involve accessing a data interface from retrieving information from another source, such as the Internet or a public or private data source residing outside of the database system.

A determination is made at 2910 as to whether information disambiguation is needed to determine a plan. In some embodiments, the determination may be made based on the information disambiguation and enrichment prompt completion determined at 2906. completion. For example, the information disambiguation and enrichment prompt completion may include one or more indicators as to whether information disambiguation is needed. The determination may be made based on the information retrieved at 2908.

In some embodiments, one or more database queries executed at 2908 may include an ambiguous result. For example, a database query executed against the database system may return both an Opportunity object and an Account object for Acme, rendering the user input ambiguous as to the user's intent. As another example, a database query executed against the database system may return two opportunity objects for Acme, an "Acme Inc." and an "Acme Resources Ltd", again rendering the user input ambiguous.

In some embodiments, one or more other data retrieval queries executed at 2908 may include an ambiguous result. For instance, an Internet search to retrieve information identifying "the capital of Georgia", which is needed to draft a message based on user input, may reveal that "Georgia" may refer to a state in the United States or a country in Europe and Asia, again rendering the user input ambiguous and triggering the system to activate a process to resolve the ambiguity.

Upon determining that information disambiguation is needed, information disambiguation is performed at 2912. Additional details regarding a method to facilitate the disambiguation of information such as an entity and/or record are discussed with respect to the method 3000 shown in FIG. 30.

Upon performing information disambiguation, or if no such disambiguation is needed, a plan is determined at 2914. According to various embodiments, the plan may include one or more actions to be performed within the computing services environment. The plan is then executed at 2916. Additional details regarding a method of determining and executing a plan are discussed with respect to the method 3100 shown in FIG. 31.

Figure 30:
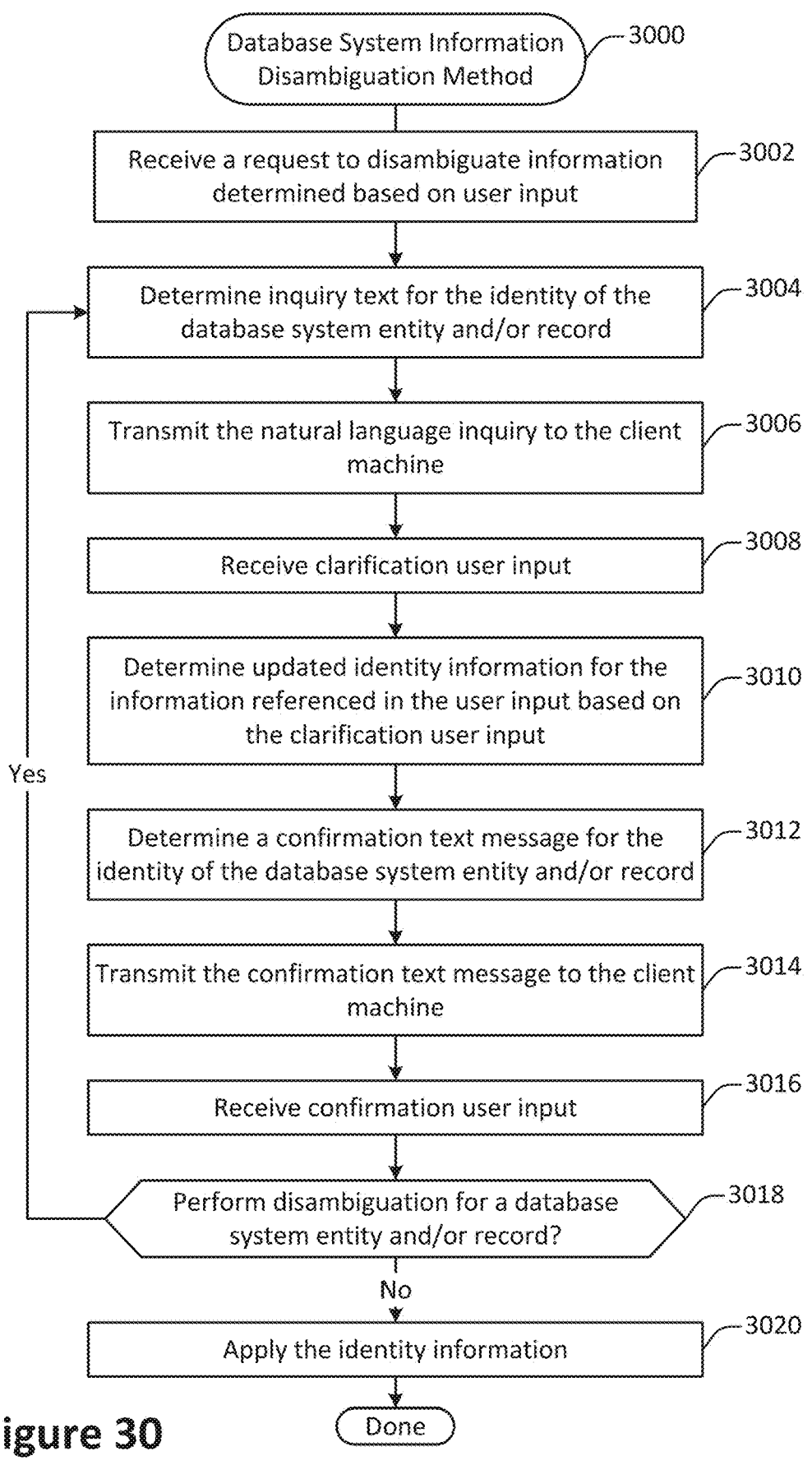
FIG. 30 illustrates a method for disambiguating information, performed in accordance with one or more embodiments.

FIG. 30 illustrates a method 3000 for disambiguating any of various types of information, performed in accordance with one or more embodiments. The method 3000 may be performed by a computing services environment such as the computing services environment 150 shown in FIG. 1.

A request to disambiguate information such as one or more database system object types and/or records is received at 3002. In some embodiments, the request may be generated as discussed with respect to the operation 2512 shown in FIG. 25. The request may be generated by the computing services environment 150, and in some configurations may be based on a message received from the generative language model indicating that the information is ambiguous and/or the result of executing a query that returns ambiguous information.

According to various embodiments, the term database system entity refers to a database system object or other object represented within the metadata system. For example, a user may provide user input asking to "Update the Acme record to $25,000". In such a situation, it may be unclear as to which type of database record the user would like to update. As another example, a user may provide user input asking to "Draft a message to Acme". In such a situation, it may be unclear as to whether to draft an email or some other type of correspondence. As yet another example, a user may provide user input asking to "Update the Acme opportunity record to $25,000". In such a situation, it may be unclear as to which record the user intends, for instance if the database system includes multiple opportunity records for Acme.

Inquiry text for disambiguating the entity is determined at 3004. In some embodiments, the text may include a natural language message inquiring as to the ambiguous information. The text may include additional information, such as a list of possible options and/or a selection affordance that permits a user to select between various options.

In some embodiments, the inquiry text may be determined at least in part by a generative language model. For example, a query result may be provided to a generative language model in an information clarification input prompt. The information clarification input prompt may include some or all of the information returned by executing the query. The information clarification input prompt may also include one or more natural language instructions executed by the generative language model to first determine whether the information is ambiguous and then, if the information is ambiguous, to formulate a natural language message requesting clarification from a user.

In some embodiments, the inquiry text may be determined at least in part by a template at the computing services environment 150. For example, if a database query returns two different records, a template may be used to formulate a message asking the user which of the two database records the user means.

In some embodiments, the inquiry text may include one or more elements other than text. For instance, the inquiry text may include one or more drop down menus, buttons, or other affordances for specifying information. In this way, the user may provide a response more quickly and without the system needing to process the response as text. Such an approach may also reduce the likelihood that the user's clarification response is itself ambiguous.

The natural language inquiry is transmitted to the client machine at 3006. In some embodiments, the natural language inquiry may be transmitted via any suitable communication channel. For instance, the natural language inquiry may be transmitted in the context of an existing communication session with the client machine, via any of a mobile application interface, a web interface, or a messaging interface.

Clarification user input is received at 3008. According to various embodiments, the clarification user input may include natural language text, an indication of a button click or other activation of a user interface affordance, or any other suitable type of input. Depending on the communication channel, the clarification user input may be provided via a mobile application interface, a web interface, or a messaging interface.

Updated identity information for the database entity and/or record is determined at 3010 based on the user input. According to various embodiments, the updated identity information may be determined in various ways. For example, the clarification user input received at 3010 may include an indicator of a button press corresponding with a particular database entity and/or record. As another example, the clarification user input may include natural language text, which may be evaluated by a generative language model to determine information used to identify the database entity or the database record from within the computing services environment 150.

According to various embodiments, some or all of the updated identity information may involve executing a query as discussed with respect to the operation 2508 shown in FIG. 25. For example, an updated database query may be executed once an entity type (e.g., a database object type) is determined. As another example, an updated query may be sent to an external data source once ambiguity about the information being requested is resolved by the computing services environment.

A confirmation text message to confirm the identity of the information is optionally determined at 3012. In some embodiments, the confirmation text may be determined by a generative language model. For instance, the generative language model may determine updated identity information at 3010 and, along with that information, determine confirmation text to transmit to a client machine.

In some embodiments, the confirmation text may be determined by the computing services environment. For instance, the computing services environment 150 may determine the confirmation text based on a confirmation text template that may be filled with an indication of the updated identity information determined at 3010.

The confirmation text message is optionally transmitted to the client machine at 3014. According to various embodiments, the confirmation text message may be transmitted via any suitable communication channel, for instance as discussed with respect to operation 3006.

Confirmation user input is optionally received at 3016. According to various embodiments, the confirmation input may include an indication as to whether the disambiguation was correct. That is, the confirmation user input may indicate whether the updated identity information determined at 3010 accurately reflected the user's intent.

In some embodiments, the confirmation user input may include natural language. For instance, the user may provide text or speech input stating that the information is correct or incorrect. Alternatively, or additionally, the confirmation user input may include an indication of activation of a user interface affordance, such as a button click. For instance, the user may press a "thumbs up" or "thumbs down" button to indicate whether the information is correct.

A determination is made at 3018 as to whether to perform additional information disambiguation. In some embodiments, the determination may be made at least in part based on the confirmation received at 3016. For instance, if the information is correct, then additional disambiguation may not be needed.

In some embodiments, multiple rounds of disambiguation may be needed even if the information determined at 3010 is deemed accurate. For example, the system may need to disambiguate multiple entities and/or records. As another example, the system may first need to disambiguate a database entity and then need to disambiguate a database record corresponding with the database entity. Various complex situations are possible. For instance, once the identity of a database record is confirmed, information selected from the database record may then be used to query an external data source. The information returned by executing the query may in turn be ambiguous and need to be disambiguated.

Upon determining to perform disambiguation again, inquiry text is determined at 3004. Upon determining instead not to perform additional disambiguation, the identity information is applied at 3020. According to various embodiments, applying the identity information may involve, for instance, incorporating the identity information into an action or prompt.

In some embodiments, additional operations may be performed before the identity information is applied. For example, returning to FIG. 29, the system may execute operation 2914 and/or one or more other operations shown in FIG. 29.

FIG. 31 illustrates a method 3100 of determining a plan, performed in accordance with one or more embodiments. In some embodiments, the method 3100 may be performed at a computing services environment such as the computing services environment 150 shown in FIG. 1. The method 3100 may be performed in order to identify one or more actions to perform to execute an intent reflected in user input A request to determine a plan is received at 3102. In some embodiments, the request may be based on natural language user input received via a chat interface. For instance, the request may be generated as discussed with respect to the operation 602 shown in FIG. 6 and/or the operation 2518 shown in FIG. 25. As one example, the user may provide a natural language instruction such as "I'd like to return this item that I purchased" or "draft an email to Acme to describe a new marking opportunity." The system may then respond by executing the method 3100 to identify actions to perform to implement the user's intent.

In some embodiments, the request received at 3102 may be generated by a non-conversational trigger. For example, the creation of a case database object corresponding to a customer support case may trigger the performance of the method 3100 to identify steps to perform to resolve the case. As another example, the updating of a status of an opportunity database object corresponding to a sales opportunity may trigger the determination of a plan to convert the sales opportunity to a sale. As yet another example, a tenant of the computing services environment may configure a trigger to determine a plan to achieve a designated intent, which may be based on any of a variety of conditions within the database system and/or the computing services environment.

One or more topics and descriptions of a subset of actions for determining the plan are identified at 3106. In some embodiments, the request received at 3102 may be received in a context in which a topic has been identified. The topic may be identified as discussed with respect to operations 606 and 608 shown in FIG. 6, whereas descriptions for a subset of available actions may be identified as discussed with respect to operations 610 and 612.

According to various embodiments, providing the generative language model with descriptions of a subset of available actions may aid in the determination of a plan in various ways. For example, the generative language model may be provided with descriptions for only actions that are available to the user account in the context. As another example, such information may be provided to the generative language model to help the model formulate a plan relevant to the user's intent. As yet another example, such information may help to fit the plan identification input prompt within an available context window for the generative language model.

Disambiguation and enrichment information is identified at 3108. In some embodiments, the disambiguation and enrichment information may include information selected from the database system and/or retrieved from an external data source. Such information may be determined as discussed with respect to the methods 2900 and 3000 shown in FIG. 29 and FIG. 30.

AI agent information for formulating and executing a plan is identified at 3110. In some embodiments, the AI agent information may be identified as discussed with respect to operation 2510 shown in FIG. 25. Such information may include, for instance, the information in the agent entries discussed with respect to FIG. 26.

A plan determination input prompt is determined at 3112. In some embodiments, the plan identification prompt may include natural language instructions to identify the plan.

For example, the natural language instructions may include one or more instructions to identify one or more actions to fulfill an intent identified in natural language in the plan identification prompt. The plan determination input prompt may depend in significant part on the AI agent information, since different AI agents may be invoked via different planner services and support different types of prompt chaining, for instance as discussed with respect to FIG. 27 and FIG. 28.

In some embodiments, the plan determination input prompt may be based on a plan determination prompt template. The plan determination prompt template may include fillable portions that may be filled with information such as the context determined at 3104, the description of actions determined at 3106, the disambiguation and enrichment information identified at 3108, and the agent and planner metadata identified at 3110.

In some embodiments, the plan identification prompt may include a description of actions that may be selected by the generative language model to create a plan to execute. The actions may include operations that may be completed within the computing services environment 150. Additional details regarding such a description are discussed with respect to the operation 612 shown in FIG. 6.

A plan determination prompt completion is determined at 3114 based on the plan identification input prompt. In some embodiments, the plan determination prompt completion may be determined by providing the plan determination input prompt to a generative language model via a generative language model interface. The generative language model may then respond with the plan identification prompt completion that includes novel text generated in accordance with the content and natural language instructions included in the plan identification input prompt.

A plan is identified at 3116 based on the plan determination prompt completion. The plan may be identified by parsing the plan determination prompt completion to extract the plan information, which may include any or all of a variety of types of information. For example, the plan information may include a human-readable description of the plan.

In some embodiments, the plan information may include a sequence or set of actions to be performed, which may be specified by identifiers uniquely identifying the actions. The one or more actions may be identified by parsing the plan identification prompt completion. For instance, the plan identification prompt completion may include one or more identifiers corresponding with actions selected by the generative language model to implement the plan.

The plan is evaluated for execution at 3118. Evaluating the plan for execution may involve operations such as eliciting user input confirming or revising the plan. Additional details regarding such a process are discussed with respect to the method 3200 shown in FIG. 32.

Figure 32:
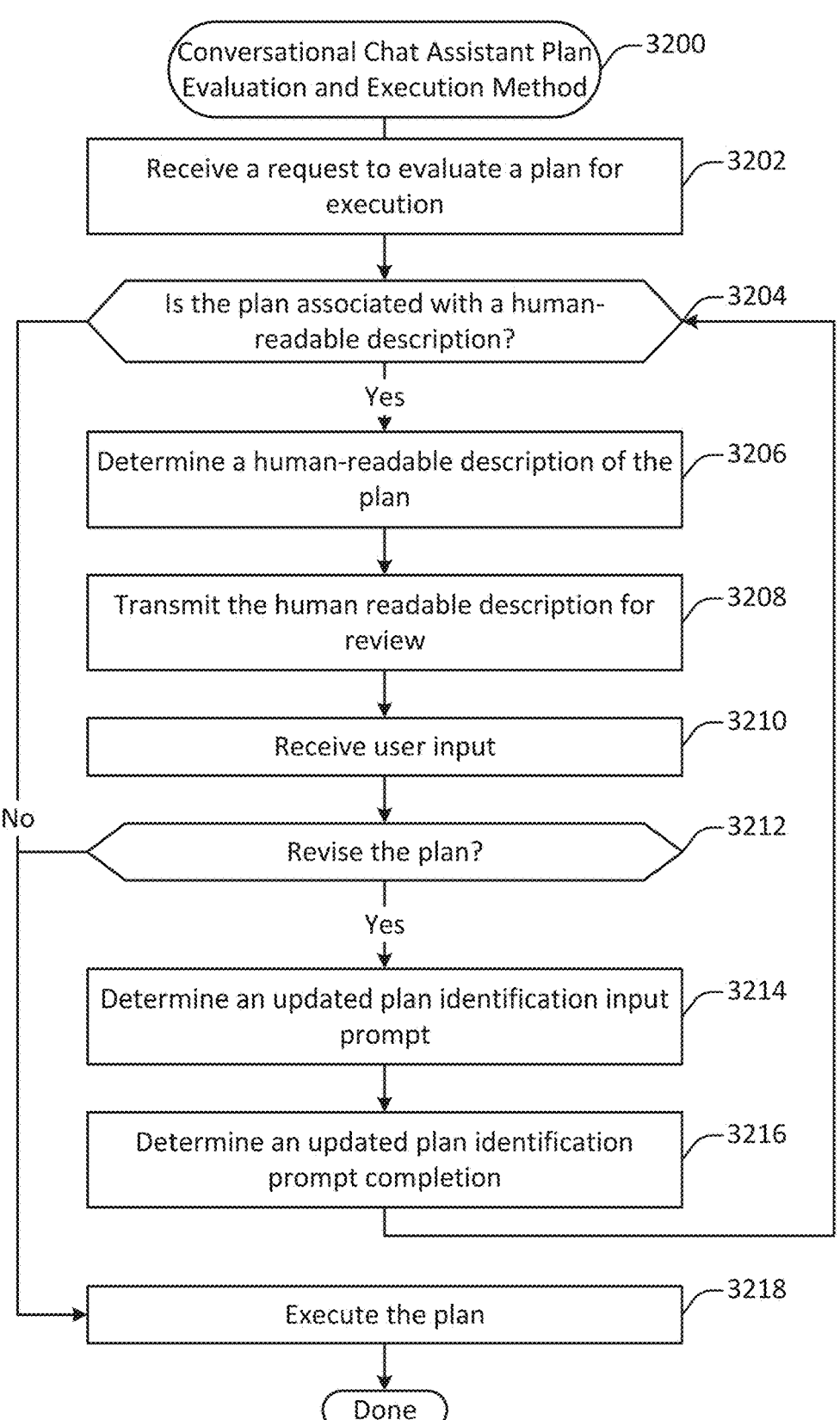
FIG. 32 illustrates a method of evaluating and executing a plan, performed in accordance with one or more embodiments.

FIG. 32 illustrates a method 3200 of evaluating and executing a plan, performed in accordance with one or more embodiments. In some embodiments, the method 3200 may be performed at a computing services environment such as the computing services environment 150 shown in FIG. 1. The method 3200 may be performed in order to identify one or more actions to perform to execute an intent.

According to various embodiments, the method 3200 may be used to conversationally modify a plan determined by a generative language model. For example, an end user may conversationally modify a plan to return an item to a vendor.

As another example, an agent of a tenant may conversationally modify a plan to convert an opportunity, draft an email, or perform any other task.

A request to evaluate a plan for execution is received at 3202. In some embodiments, the request may be generated as discussed with respect to the operation 3118 shown in FIG. 31. As one example, the user may provide a natural language instruction such as "I'd like to return this item that I purchased." The system may then determine a plan that includes actions to perform to implement the user's intent and perform the method 3200 to evaluate the plan for execution.

In some embodiments, the plan may be generated may be generated by a non-conversational trigger. For example, the creation of a case database object corresponding to a customer support case may trigger the performance of the method 3200 to identify steps to perform to resolve the case. As another example, the updating of a status of an opportunity database object corresponding to a sales opportunity may trigger the determination of a plan to convert the sales opportunity to a sale. As yet another example, a tenant of the computing services environment may configure a trigger to determine a plan to achieve a designated intent, which may be based on any of a variety of conditions within the database system and/or the computing services environment.

A determination is made at 3204 as to whether the plan is associated with a human-readable description. In some embodiments, a human-readable description may be generated by the generative language model by executing natural language instructions to generate such a description. Such instructions may make sense in the context of some agents, but not in the context of others. For example, a sequential planner that generates a comprehensive plan with a linear sequence of actions may be more susceptible to the generation of a human-readable description. However, a ReAct planner in which a chain of thought is developed over time to determine the actions may be less susceptible to the generation of a human-readable description. The determination may be made by parsing the plan generation prompt completion.

A human-readable description of the plan is determined at 3206. In some embodiments, the human-readable description of the plan may include a description of the one or more actions and may be parsed from the plan identification prompt completion. For instance, the generative language model may be instructed to generate a human-readable description of the selected action or actions based on the same metadata used by the generative language model to select the one or more actions.

The human-readable description of the one or more actions is transmitted for review at 3208. In some embodiments, the human-readable description may be transmitted via any suitable communication channel, as discussed herein. For instance, the human-readable description may be transmitted via a mobile interface, a web interface, or a messaging interface.

In some embodiments, the human-readable description may be transmitted along with a natural language request that the recipient review the proposed plan of action and provide any necessary feedback. Alternatively, or additionally, the human-readable description may be transmitted with one or more buttons or other user interface affordances for accepting, rejecting, and/or adjusting the plan.

User input is received at 3210. In some embodiments, the user input may indicate a desire to accept or reject the plan. Alternatively, or additionally, the user input may include feedback to adjust the plan.

According to various embodiments, one or more of various types of user input may be received. For example, the user input may include natural language input provided via a text interface. As another example, the user input may include an indication of one or more button clicks or other activation of a user interface affordance. For instance, a user may delete an action, indicate approval of a plan, rearrange an order of actions included in a plan, or provide other such non-textual feedback.

According to various embodiments, various types of natural language feedback may be provided. For example, a user may indicate in natural language that one or more operations should be included, omitted, or re-ordered in the plan. As another example, a user may indicate that the generative language model should consider, re-consider, emphasize, de-emphasize, or ignore particular information when determining the actions to include in the plan.

A determination is made at 3212 as to whether to revise the plan. In some embodiments, the determination may be made based on an evaluation of the user input received at 3210. For instance, the computing services environment 150 may determine whether the user input includes any indication that the user would like to revise the plan. Such input may be reflected in natural language or in another type of input, as discussed with respect to the operation 3210.

Upon determining to revise the plan, an updated plan identification input prompt is determined at 3214. In some embodiments, the updated plan identification input prompt may include any or all of a variety of information. For example, the updated plan identification input prompt may include any or all of the information included in the plan identification input prompt determined in FIG. 31. As another example, the updated plan identification input prompt may include any or all of the user input received at 3210. As yet another example, updated plan identification input prompt may include a natural language instruction to update the plan.

An updated plan identification prompt completion is determined at 3218. For instance, the updated plan identification input prompt may be transmitted to generative language model for completion. The generative language model may then response with the updated plan identification prompt completion. The updated plan identification prompt completion is then re-evaluated at 3204.

Upon determining that the plan does not include a human-readable description or that the plan does not need to be revised, the plan is executed at 3218.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment comprising:
a database system storing a plurality of database records in a storage system for a plurality of client organizations accessing computing services via the computing services environment, the computing services including a conversational chat interface;
an application server including a processor and providing access to the conversational chat interface to a plurality of client machines associated with one or more of the plurality of client organizations; and
an orchestration service including a memory module and being configured to execute an orchestration process based on a natural language request message received from a client machine via the conversational chat interface, wherein executing the orchestration process includes:
executing an information enrichment and disambiguation process to determine candidate information including a plurality of candidate values corresponding to a text portion of the natural language request message, the candidate information including a first database record corresponding to a first database record type and a second database record corresponding to a second database record type,
determining novel clarification text via a generative language model, the novel clarification text requesting clarification of the candidate information, the novel clarification text identifying the first and second database records and database record types,
transmitting the novel clarification text to the client machine via the conversational chat interface,
receiving an indication of the first database record and first database record type from the client machine via the conversational chat interface,
determining updated information based on the candidate information and the first database record,
determining novel response text responsive to the natural language request message based on the updated information,
updating the first database record based on the novel response text, and
transmitting the novel response text to the client machine via the conversational chat interface,
wherein the plurality of candidate values includes a plurality of text values selected from an information source outside of the database system, and wherein determining the updated information includes selecting a text value of the plurality of text values.

2. The computing services environment recited in claim 1, wherein the plurality of candidate values includes a plurality of text values selected from an information source outside of the database system, and wherein determining the updated information includes selecting a text value of the plurality of text values.

3. The computing services environment recited in claim 2, wherein the information source resides outside of the computing services environment and is accessible via a network interface.

4. The computing services environment recited in claim 1, wherein the clarification input includes an indication of a selection of a user interface affordance at the client machine.

5. The computing services environment recited in claim 4, wherein the user interface affordance is a virtual button presented on a display screen.

6. The computing services environment recited in claim 1, wherein executing an information enrichment and disambiguation process comprises transmitting an information enrichment and disambiguation input prompt to a generative language model and receiving from the generative language model an information enrichment and disambiguation prompt completion.

7. The computing services environment recited in claim 6, wherein the information enrichment and disambiguation prompt completion includes a query for retrieving the candidate information, and wherein the candidate information is determined by executing the query.

8. The computing services environment recited in claim 7, wherein the query is a database query, and wherein executing the query includes accessing the database system.

9. The computing services environment recited in claim 1, wherein the novel response text is determined based on an interaction with a generative language model.

10. The computing services environment recited in claim 1, wherein determining the novel response text comprises:
determining a topic identification input prompt that includes the natural language request message and one or more natural language instructions executable by the generative language model to identify a topic based on the natural language request message;
transmitting the topic identification input prompt to the generative language model for completion;
receiving a topic identification prompt completion from the generative language model; and
identifying one or more topics of a plurality of topics by parsing the topic identification prompt completion, wherein each of the plurality of topics corresponds with a respective topic-based subset of a plurality of actions executable at the computing services environment.

11. The computing services environment recited in claim 10, further comprising a trust layer, wherein the trust layer is configured to mask sensitive data included the topic identification input prompt before the topic identification input prompt is transmitted to a generative language model for completion.

12. The computing services environment recited in claim 11, wherein masking sensitive data includes replacing a text portion with a unique identifier, and wherein the trust layer is further configured to demask the topic identification prompt completion received from the generative language model by replacing the unique identifier with the text portion.

13. The computing services environment recited in claim 1, wherein the generative language model is hosted outside the computing services environment.

14. The computing services environment recited in claim 1, wherein the generative language model is hosted inside the computing services environment.

15. A method implement at a computing services environment, the method comprising:
storing a plurality of database records in a database system for a plurality of client organizations accessing computing services via the computing services environment, the computing services including a conversational chat interface;

providing access to the conversational chat interface via an application server to a plurality of client machines associated with one or more of the plurality of client organizations; and execute an orchestration process via an orchestration service based on a natural language request message received from a client machine via the conversational chat interface, wherein executing the orchestration process includes:

executing an information enrichment and disambiguation process to determine candidate information including a plurality of candidate values corresponding to a text portion of the natural language request message, the candidate information including a first database record corresponding to a first database record type and a second database record corresponding to a second database record type, determining novel clarification text via a generative language model, the novel clarification text requesting clarification of the candidate information, the novel clarification text identifying the first and second database records and database record types, transmitting the novel clarification text to the client machine via the conversational chat interface, receiving an indication of the first database record and first database record type from the client machine via the conversational chat interface, determining updated information based on the candidate information and the first database record, determining novel response text responsive to the natural language request message based on the updated information, updating the first database record based on the novel response text, and transmitting the novel response text to the client machine via the conversational chat interface.

16. The method recited in claim 15, wherein the plurality of candidate values includes a plurality of text values selected from an information source outside of the database system, and wherein determining the updated information includes selecting a text value of the plurality of text values.

17. The method recited in claim 16, wherein the information source resides outside of the computing services environment and is accessible via a network interface.

18. One or more non-transitory computer readable media having instructions stored thereon for performing a method implement at a computing services environment, the method comprising:

storing a plurality of database records in a database system for a plurality of client organizations accessing computing services via the computing services environment, the computing services including a conversational chat interface;

providing access to the conversational chat interface via an application server to a plurality of client machines associated with one or more of the plurality of client organizations; and execute an orchestration process via an orchestration service based on a natural language request message received from a client machine via the conversational chat interface, wherein executing the orchestration process includes:

executing an information enrichment and disambiguation process to determine candidate information including a plurality of candidate values corresponding to a text portion of the natural language request message, the candidate information including a first database record corresponding to a first database record type and a second database record corresponding to a second database record type, determining novel clarification text via a generative language model, the novel clarification text requesting clarification of the candidate information, the novel clarification text identifying the first and second database records and database record types, transmitting the novel clarification text to the client machine via the conversational chat interface, receiving an indication of the first database record and first database record type from the client machine via the conversational chat interface, determining updated information based on the candidate information and the first database record, determining novel response text responsive to the natural language request message based on the updated information, updating the first database record based on the novel response text, and transmitting the novel response text to the client machine via the conversational chat interface.

19. The one or more non-transitory computer readable media recited in claim 18, wherein the plurality of candidate values includes a plurality of text values selected from an information source outside of the database system, and wherein determining the updated information includes selecting a text value of the plurality of text values.

20. The one or more non-transitory computer readable media recited in claim 19, wherein the information source resides outside of the computing services environment and is accessible via a network interface.

* * * * *